United States Patent
Schneider et al.

(10) Patent No.: US 10,785,084 B2
(45) Date of Patent: *Sep. 22, 2020

(54) CODING AND MODULATION APPARATUS USING NON-UNIFORM CONSTELLATION AND DIFFERENT PHY MODES

(71) Applicant: Sony Corporation, Tokyo (JP)

(72) Inventors: Daniel Schneider, Stuttgart (DE); Nabil Sven Loghin, Stuttgart (DE); Lothar Stadelmeier, Stuttgart (DE); Thomas Handte, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,328

(22) Filed: Dec. 5, 2018

(65) Prior Publication Data

US 2019/0109753 A1   Apr. 11, 2019

Related U.S. Application Data

(63) Continuation of application No. 15/564,993, filed as application No. PCT/EP2016/058175 on Apr. 14, 2016, now Pat. No. 10,193,736.

(30) Foreign Application Priority Data

Apr. 14, 2015 (EP) ..................... 15163465

(51) Int. Cl.
  *H04L 27/34* (2006.01)
  *H04L 1/00* (2006.01)
  *H04L 5/00* (2006.01)

(52) U.S. Cl.
  CPC ........ *H04L 27/3444* (2013.01); *H04L 1/0003* (2013.01); *H04L 1/0057* (2013.01); *H04L 27/3405* (2013.01); *H04L 5/0007* (2013.01)

(58) Field of Classification Search
  CPC . H04L 27/3444; H04L 1/0003; H04L 1/0057; H04L 27/3405; H04L 5/0007
  See application file for complete search history.

(56) References Cited

U.S. PATENT DOCUMENTS

2016/0261280 A1* 9/2016 Jeong .................. H03M 13/255
2016/0261281 A1* 9/2016 Kim .................... H03M 13/1148

FOREIGN PATENT DOCUMENTS

WO 2015/005604 A1 1/2015
WO 2015/023123 A1 2/2015

OTHER PUBLICATIONS

Daniel Schneider, "Non-Uniform Constellations for Higher Order QAMs; 11-15-0096-01-ng60-non-uniform-constellations-for-higher-order-qams," IEEE Draft, IEEE-SA Mentor, XP068082636, vol. 802.11 NG60, No. 1, Jan. 12, 2015, (10 pages).

(Continued)

*Primary Examiner* — Janice N Tieu
(74) *Attorney, Agent, or Firm* — Xsensus LLP

(57) ABSTRACT

A coding and modulation apparatus and method are presented, particularly for use in a system according to IEEE 802.11. The apparatus comprises an encoder configured to encode input data into cell words according to a low density parity check code, LDPC, and a modulator configured to modulate said cell words into constellation values of a non-uniform constellation and to assign bit combinations to constellation values of the used non-uniform constellation, wherein said modulator is configured to use, based on the PHY mode, the total number M of constellation points of the constellation and the code rate, a particular non-uniform constellation.

18 Claims, 4 Drawing Sheets

(56) References Cited

OTHER PUBLICATIONS

Catherine Douillard, et al., "The Bit Interleaved Coded Modulation Module for DVB-NGH Enhanced features for mobile reception," IEEE 2012 19th International Conference on Telecommunications, XP032188384, Apr. 23, 2012, (6 pages).
P. Pedrosa, et al., "Iterative Frequency Domain Equalization and Carrier Synchronization for Multi-Resolution Constellations," IEEE Transactions on Broadcasting, XP013318885, vol. 56, No. 4, Dec. 2010, pp. 551-557.
Nabil Loghin, et al., "High Order Non-Uniform Constellations," Digital Video Broadcasting, TM_MIMOxxxx_high_order_nuc_sony_tubs.pdf, XP017844570, Jun. 9, 2014, (57 pages).
International Search Report dated Jul. 21, 2016 in PCT/EP2016/058175 filed Apr. 14, 2016.
Office Action and Search Report issued in Chinese Application 2016800208149 dated Nov. 4, 2019.
Office Action issued in Indian Application 201717030380 dated Jan. 23, 2020.
Extended European Search Report dated Jun. 16, 2020, issued in corresponding European Patent Application No. 19213274.4.

\* cited by examiner

US 10,785,084 B2

CODING AND MODULATION APPARATUS USING NON-UNIFORM CONSTELLATION AND DIFFERENT PHY MODES

CROSS-REFERENCE TO RELATED APPLICATIONS

This application is a continuation of U.S. application Ser. No. 15/564,993, filed on Oct. 6, 2017, which is a National Stage Application based on PCT/EP2016/058175, filed Apr. 14, 2016 and which claims priority to European Patent Application 15163465.6, filed in the European Patent Office on Apr. 14, 2015, the entire contents of each of which are incorporated herein by reference.

BACKGROUND

Field of the Disclosure

The present disclosure relates to a coding and modulation apparatus and method as well as a demodulation and decoding apparatus and method. Further, the present disclosure relates to a transmission apparatus and method as well as a receiving apparatus and method. Still further, the present disclosure relates to a computer program and a non-transitory computer-readable recording medium.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as BPSK (Binary Phase Shift Keying), QPSK (Quaternary Phase Shift Keying), or QAM (Quadrature Amplitude Modulation).

BICM allows for good performance due to the use of the interleaves and/or the FEC encoder. It has a reasonable decoding complexity as opposed to multilevel coding (MEC) coding schemes and is thus used frequently in communications systems, such as in all DVB systems (e.g. DVB-S2x), powerline communications (e.g., Homeplug AV), DAB, LTE, WiFi (IEEE 802.11), ATSC 3.0, etc. The first generation of 60 GHz WLAN is specified in IEEE 802.11ad. Systems in accordance with IEEE 802.11ad use uniform constellations. Several Modulation and Coding Schemes (MCSs) are defined. Currently, there is a study group which investigates possible technologies for the next generation of the specification which will likely be called 802.11ay.

Generally, the coding and modulation capacity, such as the BICM capacity in systems using a BICM apparatus, is considered as a target function, and it is desired to find optimum constellation points such that this capacity is maximized, often subject to a power normalization, i.e., the average power of the constellation points should be normalized to e.g. 1.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a coding and modulation apparatus and method providing an increased or even maximized coding and modulation capacity and a reduced bit error rate and reception with a reduced required SNR (signal-to-noise ratio). It is a further object to provide a demodulation and decoding apparatus and method as well as a corresponding computer program for implementing said methods and a non-transitory computer-readable recording medium for implementing said methods.

According to an aspect there is provided a coding and modulation apparatus comprising
    an encoder configured to encode input data into cell words according to a low density parity check code, LDPC, and
    a modulator configured to modulate said cell words into constellation values of a non-uniform constellation and to assign bit combinations to constellation values of the used non-uniform constellation,
wherein said modulator is configured to use, based on the PHY mode, the total number M of constellation points of the constellation and the code rate, one of the non-uniform constellations as defined in claim 1.

According to a further aspect there is provided a transmission apparatus comprising
    a coding and modulation apparatus as claimed in claim 1 configured to encode and modulate input data into constellation values,
    a converter configured to convert said constellation values into one or more transmission streams to be transmitted, and
    a transmitter configured to transmit said one or more transmission streams.

According to another aspect there is provided a demodulation and decoding apparatus comprising
    a demodulator configured to demodulate constellation values of a non-uniform constellation into cell words and to assign bit combinations to constellation values of the used non-uniform constellation, and
    a decoder configured to decode cell words into output data according to a low density parity check code, LDPC,
wherein said demodulator is configured to use, based on the PHY mode, the total number M of constellation points of the constellation and the code rate, one of the non-uniform constellations as defined in claim 15.

According to a further aspect there is provided a receiving apparatus comprising
    receiving one or more transmission streams,
    deconverting one or more transmission streams into said constellation values, and
    demodulating and decoding said constellation values into output data according to a method as claimed in claim 16.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Preferred embodiments are defined in the dependent claims. It shall be understood that the claimed methods, the claimed computer program and the claimed computer-readable recording medium have similar and/or identical preferred embodiments as the claimed apparatus and as defined in the dependent claims.

One of the aspects of the disclosure is that the constellation points of the used constellations, called non-uniform constellations, are not located on a regular grid with equidistant symbols, but rather on optimized locations, dependent on the channel conditions between the transmission apparatus and a receiving apparatus with which the transmission apparatus wants to communicate (e.g. in a WiFi network). Further, the used constellation is selected (preferably in advance, but generally on the fly in other embodiments) dependent on the code rate and the desired total number of constellation points of the used constellation. The code rate and total number of constellation points (also referred to as "modulation order") depends among other parameters on the channel quality, such as signal-to-noise ratio. A method how to find and optimize these non-uniform constellations (in the following called NUCs) will be explained below. Further, for the proposed non-uniform constellations an optimized bit labelling (i.e. an optimized assignment of bit combinations to constellation values of the used non-uniform constellation) is proposed.

Depending on the capabilities of the transmission apparatus and the receiving apparatus, the transmission apparatus, in an embodiment, is able to select between the use of OFDM or single carrier (SC) mode as PHY (physical layer) mode. The SC mode is simpler and more suited for good channel conditions with mainly line of sight. The OFDM mode usually provides increased performance especially for multi-path channel conditions. The PHY mode may be one criterion for selecting the constellation used by the modulator. In other embodiment the SC mode may be the default mode, but OFDM mode may be optionally used, particularly if both the transmitting apparatus and the receiving apparatus support OFDM, i.e. in this case the transmission apparatus can choose to transmit in OFDM mode. Hence, also apparatus and methods not supporting OFDM may make use of the proposed teaching, even if the use SC mode as PHY mode and if they make use of one of the non-uniform constellations disclosed herein for use with SC mode.

In the tables various constellations are provided for different values of M, for different code rates and for different PHY modes. It should be noted that the code rate R indicated in the tables are not to be understood such that a particular constellation is only valid for exactly this code rate, but also for slightly different code rates. The code rate as indicated in the modulation and coding scheme (MCS) index might differ from the true code rate of the system, e.g. because of padding and other constraints related to the frame structure.

It should also be noted that one or more of the following "invariant transformations" do not affect the properties of the constellations:
1. rotation of all symbols by an arbitrary angle $\varphi$,
2. inversion of m-th bit $y\_m=b\in\{0,1\}$ to $y\_m=\bar{b}$, where the bar indicates inversion,
3. interchanging of bit positions $y\_k1$ and $y\_k2$,
4. reflection on $Re\{x1\}$- and/or $Im\{x1\}$-axis,
5. predistortion,
6. mirroring on any line in the complex plane.

Thus, the modulator may also use a non-uniform constellation obtained from a constellation from anyone of groups A or B through rotation by an angle around the origin, an inversion of bit labels for all constellation points, an interchanging of bit positions for all constellation points and/or a reflection on the real part and/or imaginary part axis. For instance, if one constellation point has bit labels 0010 for 16-QAM, all first bit labels can be inverted such that this point becomes 1010. Further, constellation obtained through any other trivial manipulation, such as rounding of the constellation points' positions shall generally be covered by the claims. Through one or more of these operations an equivalent mapping to the mapping of the constellations defined in the above mentioned groups is achieved.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 2:
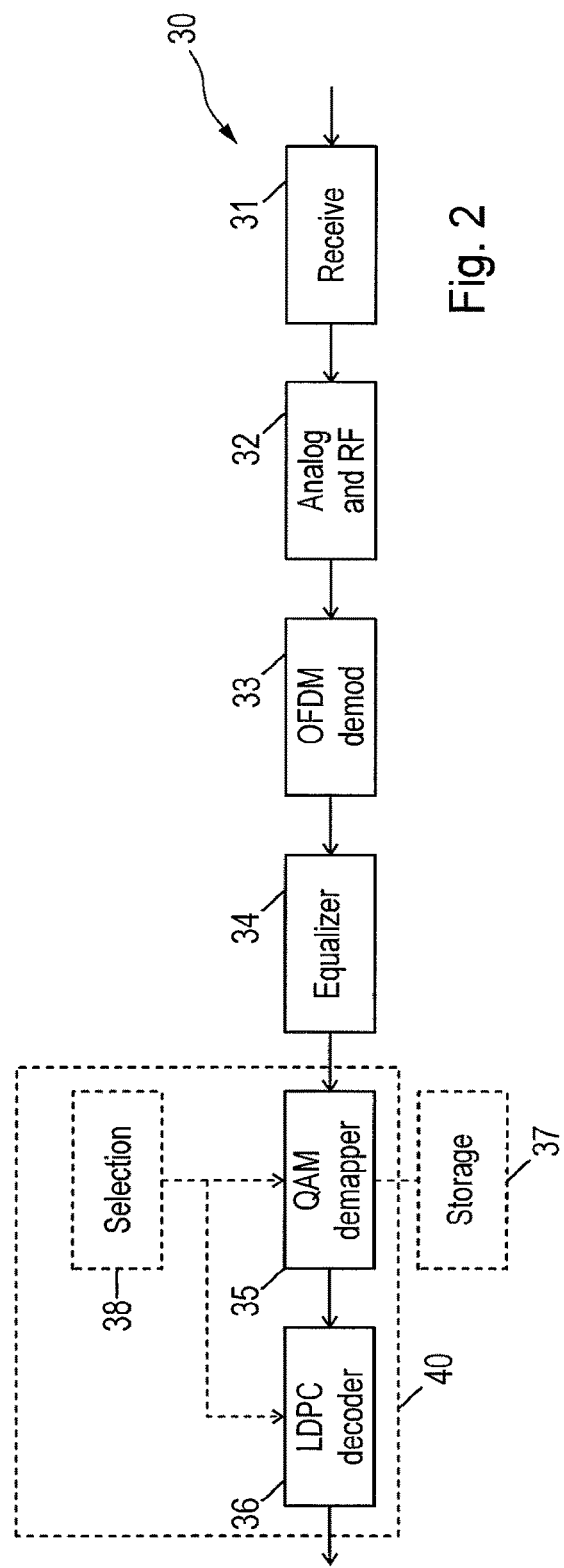
FIG. 2 shows a schematic diagram of an embodiment of a receiving apparatus according to the present disclosure using OFDM as PHY mode.
Figure 3:
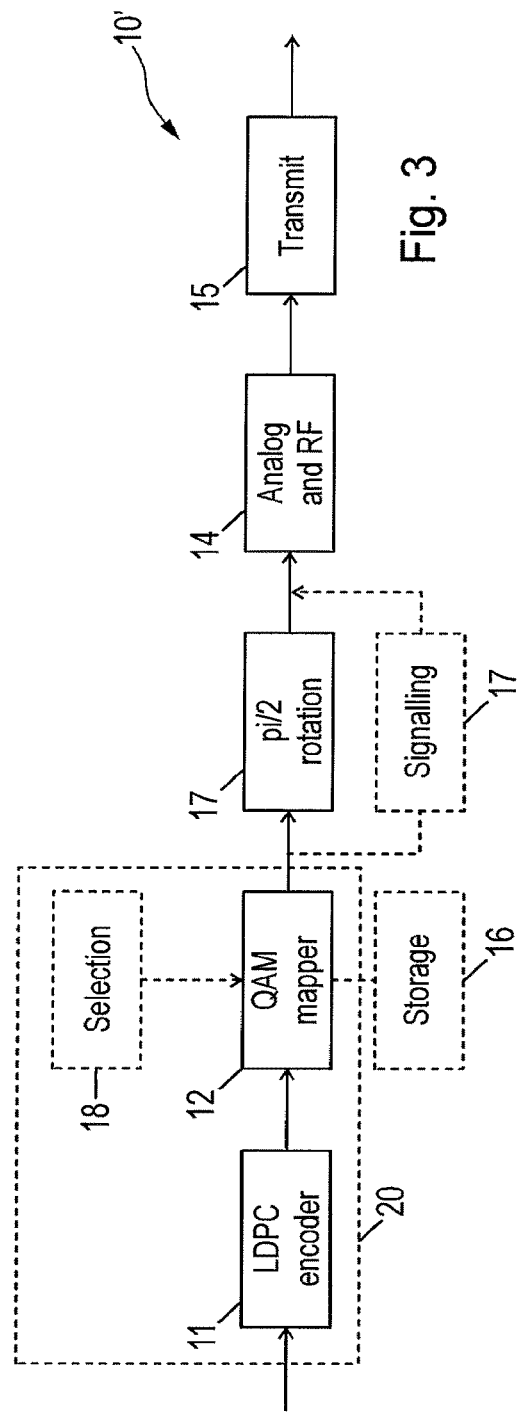
FIG. 3 shows a schematic diagram of an embodiment of a transmission apparatus according to the present disclosure using single carrier mode as PHY mode.
Figure 4:
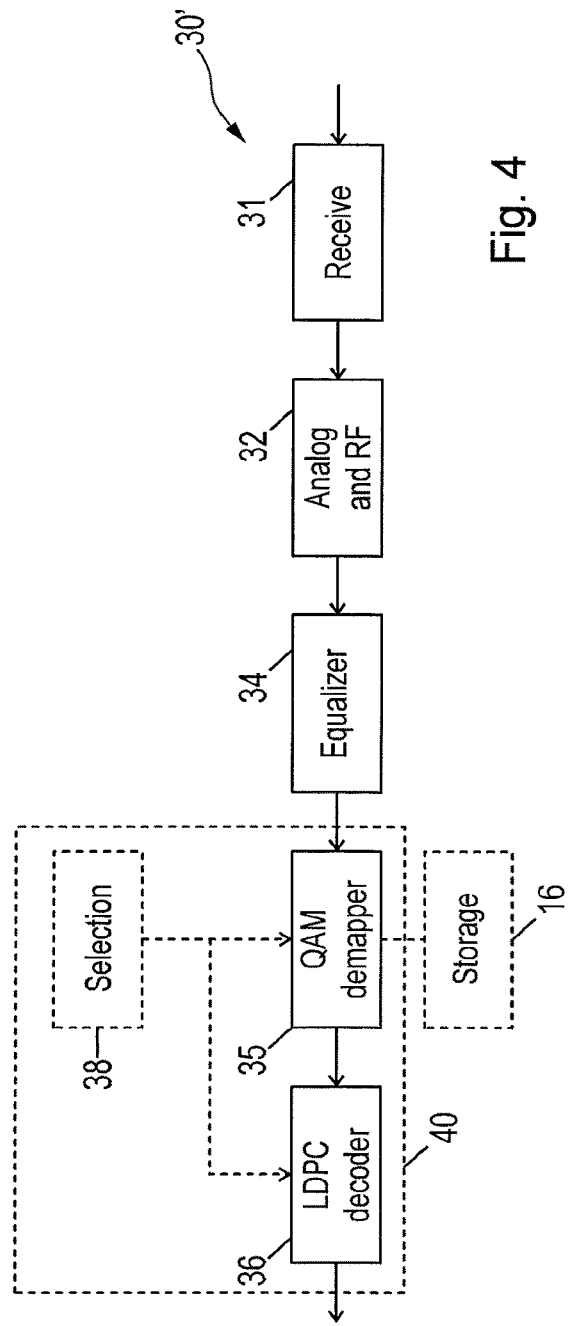
FIG. 4 shows a schematic diagram of an embodiment of a receiving apparatus according to the present disclosure using single carrier mode as PHY mode.

IEEE 802.11ad supports two different PHY modes: Orthogonal Frequency Division Multiplex (OFDM) mode (similar to "classical" WLAN operating in the frequency ranges of 2.4 GHz and 5 GHz) and single carrier (SC) mode. Referring now to the drawings, wherein like reference numerals designate identical or corresponding parts throughout the several views, FIGS. 1 and 2 illustrate a first embodiment for OFDM mode and FIGS. 3 and 4 illustrate a second embodiment for SC mode.

Figure 1:
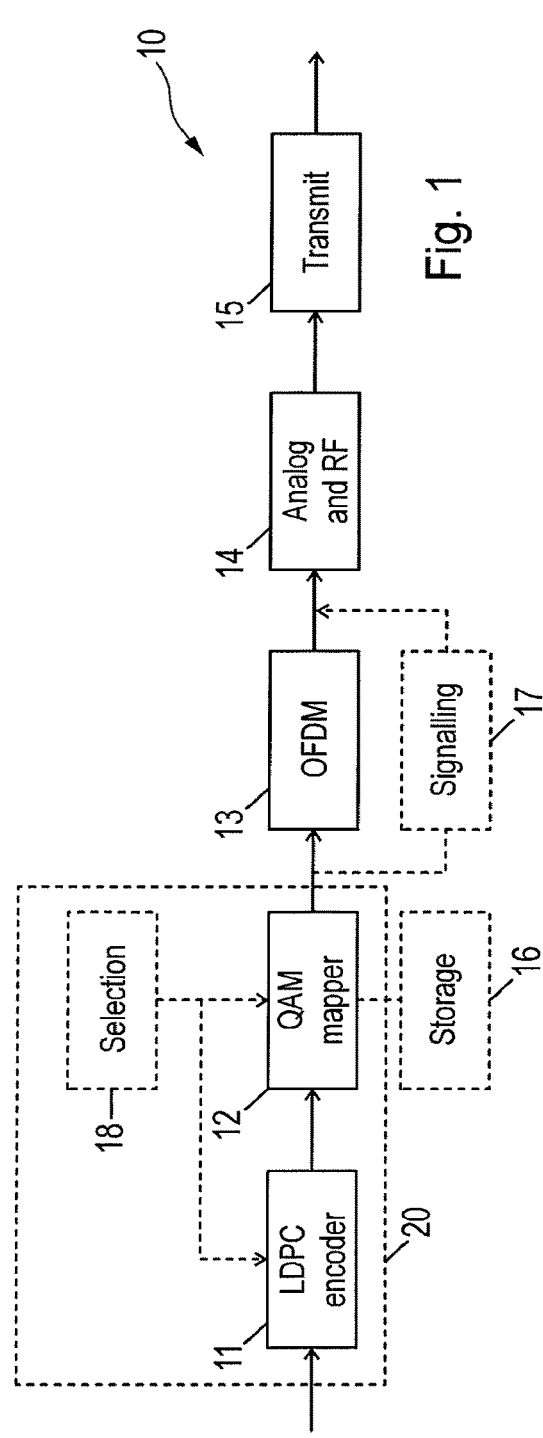
FIG. 1 shows a schematic diagram of an embodiment of a transmission apparatus according to the present disclosure using OFDM as PHY mode.

FIG. 1 shows an embodiment of a transmission apparatus 10 according to the present disclosure including an embodiment of a coding and modulation apparatus 20 according to the present disclosure for use with OFDM as PHY mode. The transmission apparatus 10 comprises an FEC (forward error correction) encoder 11 for encoding the input data by use of an LDPC (low density parity check) code. The code rate may depend on the MCS (modulation and coding scheme) index, which is generally predetermined or selected.

The transmission apparatus 10 further comprises a constellation mapper 12 (generally also called modulator), in particular a QAM (quadrature amplitude modulation) mapper, that maps the encoded bits of the input data to complex symbols (also called constellation points) in a constellation, in particular a QAM constellation. The modulation order (i.e. the number M of constellations points of the constellation) may also depend on the MCS index.

The transmission apparatus 10 further comprises an OFDM unit 13 for OFDM modulation, an RF processing unit 14 for RF processing like frequency up-conversion, power amplifier, transmit filters, digital-to-analog conversion, etc., and a transmit unit 15 for transmitting the finally obtained signals over a channel to a receiving apparatus. In other embodiments of the transmission apparatus 10 additional elements may be provided, such as an input processing unit and/or a frame building unit, or other elements as e.g. conventionally used in a transmission apparatus of a system in accordance with IEEE 802.11ad.

The FEC encoder 11, and the constellation mapper (modulator) 12 are often summarized as BICM (bit-interleaved coded modulation) apparatus and represent the coding and modulation apparatus 20 according to the present disclosure. The FEC encoder 11 generally encodes input data into cell words according to an LDPC code. The modulator 12 generally modulates said cell words into constellation values of a non-uniform constellation and assigns bit combinations to constellation values of the used non-uniform constellation. Generally, the output of the FEC encoder 11 is referred to as a codeword (e.g. a couple of hundred bits), which are then divided into "tuples" (of e.g. 4 bits in case of 16-QAM), referred to also as cell words (of the codeword). These tuples (cell words) are then assigned to the constellations points by the modulator 12.

Based on the PHY mode (OFDM in this embodiment), the total number M of constellation points of the constellation (i.e. the modulation order) and the code rate, one of a selection of non-uniform constellations of different groups is used. Details of those different groups of constellations will be explained in more detail below. The constellations and the constellations values are generally predetermined and e.g. stored in a constellations storage 16 or retrieved from an external source. The MCS parameters may also be stored in the constellations storage 16 or the external source.

FIG. 2 shows an embodiment of a corresponding receiving apparatus 30 according to the present disclosure including an embodiment of a decoding and demodulation apparatus 40 according to the present disclosure for use with OFDM as PHY mode. Basically, the same blocks of the transmitter apparatus are reversed. After reception by a receiving unit 31, RF processing like frequency down-conversion, receive filtering, analog-to-digital conversion, etc. is performed by an RF unit 32 and OFDM demodulation is performed by an OFDM demodulator 33. An equalizer 34 reverses the effect of channel distortions and forwards the equalized. QAM symbols to the QAM demapper 35 (also called demodulator) for QAM demapping. Finally, LDPC decoding is performed in a FEC decoder 36. In other embodiments of the receiving apparatus 30 additional elements may be provided, such as an output processing unit and/or a deframing unit, or other elements as e.g. conventionally used in a receiving apparatus of a system in accordance with IEEE 802.11ad.

The QAM demapper 35 (demodulator) and the FEC decoder 36 are often summarized as BICM demodulation apparatus and represent the decoding and demodulation apparatus 40 according to the present disclosure. The demodulator 35 generally demodulates received constellation values of a non-uniform constellation into cell words, whereby bit combinations are assigned to constellation values of the used non-uniform constellation. Based on a signalling information included in the received data the receiving apparatus 30 knows which one of a selection of non-uniform constellations of different groups has been used by the transmitting apparatus 10 so that the receiving apparatus 30 can use the same non-uniform constellation for demodulation. The FEC decoder 36 generally decodes the cell words according to the used PHY mode into output words. Also in the receiving apparatus 30 the constellations and the constellations values may be stored in a constellations storage 37 or retrieved from an external source.

The preferred demodulation and decoding considers soft values as opposed to hard decided values (0 and 1). Soft values represent the continuously distributed received values (possibly after A/D conversion including quantization) by more than two states (as in the case of binary (hard) decision). The reason is that for hard decision, the non-uniform constellations are generally not optimal. Nowadays, BICM receivers typically are soft receivers anyway.

FIG. 3 shows another embodiment of a transmission apparatus 10' according to the present disclosure for use with SC as PHY mode. Differently from the transmission apparatus 10 shown in FIG. 1, the transmission apparatus 10' comprises a pill rotation unit 17 that introduces a pi/2 rotation, which improves the RF properties of the transmit signal. The pi/2 rotation has no influence on the BICM performance and is therefore generally not relevant to the NUC performance and optimization. Further, no OFDM unit is provided.

FIG. 4 shows an embodiment of a corresponding receiving apparatus 30' according to the present disclosure for use with SC as PHY mode. Differently from the receiving apparatus 30 shown in FIG. 2, the receiving apparatus 30' just omits the OFDM demodulation unit 33.

Figure 5:
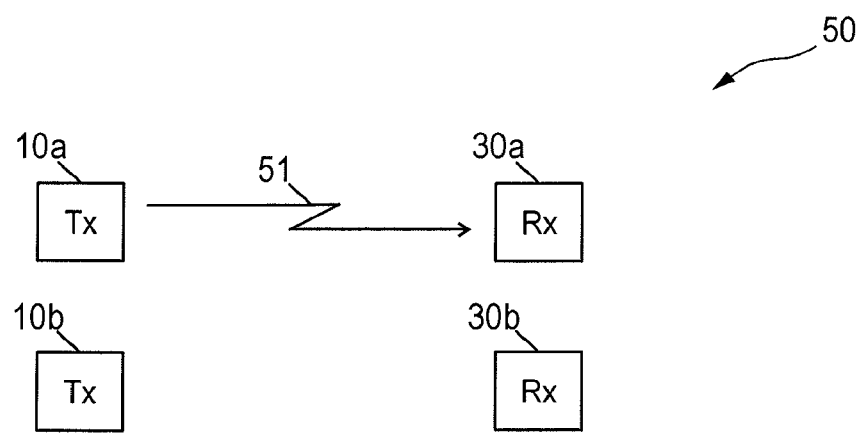
FIG. 5 shows a schematic diagram of an embodiment of a communications system according to the present disclosure.

FIG. 5 shows an embodiment of a communications system 50 according to the present disclosure comprising one (or more) transmission apparatus 10a, 10b (Tx), which—depending on the used PHY mode—may either be transmission apparatus 10 as shown in FIG. 1 or transmission apparatus 10' as shown in FIG. 3, and one or more receiving apparatus 30a, 30b (Rx), which—depending on the used PHY mode—may either be receiving apparatus 30 as shown in FIG. 2 or receiving apparatus 30' as shown in FIG. 4. As an example, the transmission apparatus 10a, which may be a WiFi access point or WiFi router, communicates with a receiving apparatus 30a, which may be a user device like a smartphone, laptop or tablet, via a bi-directional communication channel 51, for instance to provide access to the internet to the receiving apparatus 30a. Both the transmission apparatus 10a, 10b and the receiving apparatus 30a, 30b may use the ideas of the present disclosure in said communication session.

Today's systems in accordance with IEEE 802.11ad (WLAN, WiFi) generally use uniform constellations. Several Modulation and Coding Schemes (MCSs) are defined for use in such systems. According to the present disclosure, non-uniform constellations and their bit labelling are proposed, which are optimized with respect to coding and modulation capacity and which may be used in systems in accordance with IEEE 802.11, particularly in accordance with versions like IEEE 802.11ad or upcoming versions such as IEEE 802.11ay.

The parameters of the basic MCSs for a transmitting apparatus are given in IEEE 802.11ad. The MCS index as described above defines the PHY mode, the QAM modulation order (indicating the value of M) and the used code rate R. The receiver needs to know which MCS index (or, alternatively, which PHY mode, modulation order and code rate R) is used at transmitter side for correct decoding. The transmission apparatus therefore signals the used MCS index (or, alternatively, which PHY mode, modulation order and code rate R). This signalling may be done at the beginning of each transmitted frame. For instance, this signalling information may be carried at the beginning of the frame in a special signal field. An example of a field which may be used is the HEADER field. For inserting such signalling information a signalling unit 17 may be provided in the transmission apparatus 10, 10'.

In case of OFDM as PHY mode, the signalling information is typically carried within a small number (in particular 1 or 2) of OFDM symbols of the Header. This small number of signalling OFDM symbols follows short and long training symbols which form the beginning of each frame (the training symbols and signalling symbols are typically called preamble). In case of SC as PHY mode, the signalling information is typically carried in the Header.

The transmission apparatus 10, 10' may optionally comprise a selection unit 18, shown with dashed lines in FIGS. 1 and 3, which selects the MCS index (or the respective parameters indicated by the MCS index) depending on the channel conditions to the receiving apparatus 30, 30'. For bad channel conditions a small MCS index is selected (lower throughput but also smaller error probability), for good channel conditions a higher MCS index is selected (higher throughput but also more prone to bit errors).

In other embodiments no such selection unit 18 is provided, but the transmission apparatus 10, 10' uses only SC mode as PHY mode and uses one of the disclosed non-uniform constellations for SC mode. This is particularly true if the transmission apparatus and the receiving apparatus do not support OFDM.

The PHY mode generally affects if the OFDM unit 13 or the pi/2 rotation unit 17 is used in the transmission apparatus. In the receiving apparatus it defines if the OFDM demodulator 33 is used/bypassed or not.

The receiving apparatus 30, 30' may optionally comprise a selection unit 38 as well, shown with dashed lines in FIGS. 2 and 4, which selects the MCS index (or the respective parameters indicated by the MCS index) depending on the signalling information signalled by the transmission apparatus 10, 10'.

According to the present disclosure a NUC is proposed for each MCS index separately for OFDM and SC as PHY mode. In particular for MCS index 10-12 and 18-24 of IEEE 802.11ad such NUCs are proposed. Additionally, NUCs are proposed for OFDM with 128-QAM and 256-QAM as well as for SC with 32-QAM, 64-QAM, 128-QAM and 256-QAM, for which no MCS index has been defined (yet) but which may particularly be used in systems in accordance with IEEE 802.11ad or IEEE 802.11ay.

According to the present disclosure the modulator 12 is configured to use, based on the PHY mode, the total number M of constellation points of the constellation and the code rate a predetermined non-uniform constellation and bit labeling. The selection unit 18 may be configured to select the total number M of constellation points of the constellation and the code rate based on channel conditions between a transmission apparatus including said coding and modulation apparatus and a receiving apparatus with which said transmission apparatus seeks to communicate. Preferably, the selection unit 18 selects a constellation with a higher number of M and/or a higher code rate the better the channel conditions are.

If OFDM is used as PHY mode and if M=16, 64, 128 or 256, a non-uniform constellation and bit labeling is used from a group A, the group A comprising constellations as defined in sub-group A1 for 16-QAM with M=16 and code rates of 1/2, 5/8, 3/4 or 13/16, sub-group A2 for 64-QAM with M=64 and code rates of 5/8, 3/4 or 13/16, sub-group A3 for 128-QAM with M=128 and code rates of 1/2, 5/8, 3/4 or 13/16, and sub-group A4 for 256-QAM with M=256 and code rates of 1/2, 5/8, 3/4 or 13/16, wherein the constellation points are defined by a constellation position vector $w_0 \ldots w_{M-1}$ and wherein the constellation position vectors of the different constellations are defined as follows:

A) M-QAM non-uniform constellations of group A for OFDM as PHY mode:

| | | A1) 16-QAM NUC | | | |
|---|---|---|---|---|---|
| w | bit label | R = 1/2 (MCS = 18) (or R = 5/8, 3/4 or 13/16) | R = 5/8 (MCS = 19) (or R = 1/2, 3/4, or 13/16) | R = 3/4 (MCS = 20) (or R = 5/8, 1/2 or 13/16) | R = 13/16 (MCS = 21) (or R = 1/2, 5/8 or 3/4) |
| w0 | 0000 | +0.4925 + 1.2040i | +0.2173 + 0.4189i | +0.2976 − 0.2976i | +0.3018 − 0.3018i |
| w1 | 0001 | +0.2530 + 0.4936i | +0.6578 + 0.2571i | +0.2976 − 0.9547i | −0.3018 − 0.3018i |
| w2 | 0010 | +0.4925 − 1.2040i | +0.4326 + 1.1445i | −0.2976 − 0.2976i | +0.3018 − 0.9534i |
| w3 | 0011 | +0.2530 − 0.4936i | +1.2088 + 0.5659i | −0.2976 − 0.9547i | −0.3018 − 0.9534i |
| w4 | 0100 | +1.2040 + 0.4925i | +0.2173 − 0.4189 | +0.9547 − 0.2976i | +0.3018 + 0.3018i |
| w5 | 0101 | +0.4936 + 0.2530i | +0.6578 − 0.2571i | +0.9547 − 0.9547i | −0.3018 + 0.3018i |
| w6 | 0110 | +1.2040 − 0.4925i | +0.4326 − 1.1445i | −0.9547 − 0.2976i | +0.3018 + 0.9534i |
| w7 | 0111 | +0.4936 − 0.2530i | +1.2088 − 0.5659i | −0.9547 − 0.9547i | −0.3018 + 0.9534i |
| w8 | 1000 | −0.4925 + 1.2040i | −0.2173 + 0.4189i | +0.2976 + 0.2976i | +0.9534 − 0.3018i |
| w9 | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1..2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

| | A2) 64-QAM NUC | | |
|---|---|---|---|
| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
| w0 | 000000 | +1.4730 + 0.3019i | +1.0501 − 0.1676i | +1.0414 − 0.1712i |
| w1 | 000001 | +1.2124 + 0.8333i | +1.4380 − 0.2294i | −1.0414 − 0.1712i |
| w2 | 000010 | −1.4730 + 0.3019i | +0.7233 − 0.1496i | +1.0414 + 0.1712i |
| w3 | 000011 | −1.2124 + 0.8333i | +0.6220 − 1.1896i | −1.0414 + 0.1712i |
| w4 | 000100 | +1.4730 − 0.3019i | −1.0501 − 0.1676i | +1.4058 − 0.2115i |
| w5 | 000101 | +1.2124 − 0.8333i | −1.4380 − 0.2294i | −1.4058 − 0.2115i |
| w6 | 000110 | −1.4730 − 0.3019i | −0.7233 − 0.1496i | +1.4058 + 0.2115i |
| w7 | 000111 | −1.2124 − 0.8333i | −0.6220 − 1.1896i | −1.4058 + 0.2115i |
| w8 | 001000 | +1.0895 + 0.2172i | +0.1398 − 0.1309i | +0.1414 − 0.1379i |
| w9 | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 + 0.1379i |
| w11 | 001011 | −0.8988 + 0.5768i | +0.2326 − 1.3986i | −0.1414 + 0.1379i |
| w12 | 001100 | +1.0895 − 0.2172i | −0.1398 − 0.1309i | +0.1695 − 1.0298i |
| w13 | 001101 | +0.8988 − 0.5768i | −0.1680 − 1.0338i | −0.1695 − 1.0298i |
| w14 | 001110 | −1.0895 − 0.2172i | −0.4246 − 0.1370i | +0.1695 + 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 + 0.1517i |
| w19 | 010011 | −0.7921 + 1.2096i | +0.6220 + 1.1896i | −0.7230 + 0.1517i |
| w20 | 010100 | +0.2775 − 1.4188i | −1.0501 + 0.1676i | +0.5981 − 1.1597i |
| w21 | 010101 | +0.7921 − 1.2096i | −1.4380 + 0.2294i | −0.5981 − 1.1597i |
| w22 | 010110 | −0.2775 − 1.4188i | −0.7233 + 0.1496i | +0.5981 + 1.1597i |
| w23 | 010111 | −0.7921 − 1.2096i | −0.6220 + 1.1896i | −0.5981 + 1.1597i |
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011010 | −0.2177 + 1.0243i | +0.4246 + 0.1370i | +0.4272 + 0.1421i |
| w27 | 011011 | −0.6056 + 0.8481i | +0.2326 + 1.3986i | −0.4272 + 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011110 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 + 0.5419 |
| w35 | 100011 | −0.3733 + 0.1498i | +0.6956 − 0.8095i | −1.0997 + 0.5419i |
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6956 − 0.8095i | −1.0691 + 0.9443i |
| w40 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 + 0.4167i |
| w43 | 101011 | −0.6394 + 0.3211i | +0.4114 − 0.7109i | −0.1440 + 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 + 0.7102i |
| w47 | 101111 | −0.6394 − 0.3211i | −0.4114 − 0.7109i | −0.1426 + 0.7102i |
| w48 | 110000 | +0.1138 + 0.3999i | +1.0725 + 0.5328i | +0.7484 + 0.4663i |
| w49 | 110001 | +0.2891 + 0.3910i | +1.0771 + 0.9315i | −0.7484 + 0.4663i |
| w50 | 110010 | −0.1138 + 0.3999i | +0.7267 + 0.4592i | +0.7484 + 0.4663i |
| w51 | 110011 | −0.2891 + 0.3910i | +0.6956 + 0.8095i | −0.7484 + 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6956 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 + 0.4317i |
| w59 | 111011 | −0.4397 + 0.5853i | +0.4114 + 0.7109i | −0.4369 + 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC for R = 1/2 (or R = 5/8, 3/4 or 13/16):

| w index | bit label | Constellation point | w index | bit label | Constellation point |
|---|---|---|---|---|---|
| w0 | 0000000 | +0.7383 − 1.3947i | w64 | 01000000 | +0.1315 − 0.7332i |
| w1 | 0000000 | +0.2726 − 1.6070i | w65 | 01000001 | +0.1038 − 0.7607i |
| w2 | 0000001 | +0.7383 + 1.3947i | w66 | 01000010 | +0.1315 + 0.7332i |
| w3 | 0000001 | +0.2726 + 1.6070i | w67 | 01000011 | +0.1038 + 0.7607i |
| w4 | 0000010 | +1.5779 − 0.2230i | w68 | 01000100 | +0.1461 − 0.1146i |
| w5 | 0000010 | +1.2114 − 0.1662i | w69 | 01000101 | +0.1573 − 0.1142i |
| w6 | 0000011 | +1.5779 + 0.2230i | w70 | 01000110 | +0.1461 + 0.1146i |
| w7 | 0000011 | +1.2114 + 0.1662i | w71 | 01000111 | +0.1573 + 0.1142i |
| w8 | 0000100 | +0.5286 − 1.0997i | w72 | 01001000 | +0.3255 − 0.9067i |
| w9 | 0000100 | +0.1915 − 1.2689i | w73 | 01001001 | +0.1588 − 1.0122i |
| w10 | 0000101 | +0.5286 + 1.0997i | w74 | 01001010 | +0.3255 + 0.9067i |
| w11 | 0000101 | +0.1915 + 1.2689i | w75 | 01001011 | +0.1588 + 1.0122i |
| w12 | 0000110 | +0.7620 − 0.1121i | w76 | 01001100 | +0.4774 − 0.1074i |
| w13 | 0000110 | +0.9103 − 0.1272i | w77 | 01001101 | +0.4323 − 0.1096i |
| w14 | 0000111 | +0.7620 + 0.1121i | w78 | 01001110 | +0.4774 + 0.1074i |
| w15 | 0000111 | +0.9103 + 0.1272i | w79 | 01001111 | +0.4323 + 0.1096i |
| w16 | 0001000 | +1.0680 − 1.0753i | w80 | 01010000 | +0.1647 − 0.5388i |
| w17 | 0001000 | +1.0389 − 0.7336i | w81 | 01010001 | +0.1629 − 0.5296i |
| w18 | 0001001 | +1.0680 + 1.0753i | w82 | 01010010 | +0.1647 + 0.5388i |
| w19 | 0001001 | +1.0389 + 0.7336i | w83 | 01010011 | +0.1629 + 0.5296i |
| w20 | 0001010 | +1.4915 − 0.6927i | w84 | 01010100 | +0.1535 − 0.3082i |
| w21 | 0001010 | +1.1447 − 0.4719i | w85 | 01010101 | +0.1629 − 0.3084i |
| w22 | 0001011 | +1.4915 + 0.6927i | w86 | 01010110 | +0.1535 + 0.3082i |
| w23 | 0001011 | +1.1447 + 0.4719i | w87 | 01010111 | +0.1629 + 0.3084i |
| w24 | 0001100 | +0.6878 − 0.8578i | w88 | 01011000 | +0.4535 − 0.6452i |
| w25 | 0001100 | +0.7725 − 0.6723i | w89 | 01011001 | +0.4645 − 0.5898i |
| w26 | 0001101 | +0.6878 + 0.8578i | w90 | 01011010 | +0.4535 + 0.6452i |
| w27 | 0001101 | +0.7725 + 0.6723i | w91 | 01011011 | +0.4645 + 0.5898i |
| w28 | 0001110 | +0.7359 − 0.3230i | w92 | 01011100 | +0.4853 − 0.3237i |
| w29 | 0001110 | +0.8236 − 0.3936i | w93 | 01011101 | +0.4637 − 0.3425i |
| w30 | 0001111 | +0.7359 + 0.3230i | w94 | 01011110 | +0.4853 + 0.3237i |
| w31 | 0001111 | +0.8236 + 0.3936i | w95 | 01011111 | +0.4637 + 0.3425i |
| w32 | 0010000 | −0.7383 − 1.3947i | w96 | 01100000 | −0.1315 − 0.7332i |
| w33 | 0010000 | −0.2726 − 1.6070i | w97 | 01100001 | −0.1038 − 0.7607i |
| w34 | 0010001 | −0.7383 + 1.3947i | w98 | 01100010 | −0.1315 + 0.7332i |
| w35 | 0010001 | −0.2726 + 1.6070i | w99 | 01100011 | −0.1038 + 0.7607i |
| w36 | 0010010 | −1.5779 − 0.2230i | w100 | 01100100 | −0.1461 − 0.1146i |
| w37 | 0010010 | −1.2114 − 0.1662i | w101 | 01100101 | −0.1573 − 0.1142i |
| w38 | 0010011 | −1.5779 + 0.2230i | w102 | 01100110 | −0.1461 + 0.1146i |
| w39 | 0010011 | −1.2114 + 0.1662i | w103 | 01100111 | −0.1573 + 0.1142i |
| w40 | 0010100 | −0.5286 − 1.0997i | w104 | 01101000 | −0.3255 − 0.9067i |
| w41 | 0010100 | −0.1915 − 1.2689i | w105 | 01101001 | −0.1588 − 1.0122i |
| w42 | 0010101 | −0.5286 + 1.0997i | w106 | 01101010 | −0.3255 + 0.9067i |
| w43 | 0010101 | −0.1915 + 1.2689i | w107 | 01101011 | −0.1588 + 1.0122i |
| w44 | 0010110 | −0.7620 − 0.1121i | w108 | 01101100 | −0.4774 − 0.1074i |
| w45 | 0010110 | −0.9103 − 0.1272i | w109 | 01101101 | −0.4323 − 0.1096i |
| w46 | 0010111 | −0.7620 + 0.1121i | w110 | 01101110 | −0.4774 + 0.1074i |
| w47 | 0010111 | −0.9103 + 0.1272i | w111 | 01101111 | −0.4323 + 0.1096i |
| w48 | 0011000 | −1.0680 − 1.0753i | w112 | 01110000 | −0.1647 − 0.5388i |
| w49 | 0011000 | −1.0389 − 0.7336i | w113 | 01110001 | −0.1629 − 0.5296i |
| w50 | 0011001 | −1.0680 + 1.0753i | w114 | 01110010 | −0.1647 + 0.5388i |
| w51 | 0011001 | −1.0389 + 0.7336i | w115 | 01110011 | −0.1629 + 0.5296i |
| w52 | 0011010 | −1.4915 − 0.6927i | w116 | 01110100 | −0.1535 − 0.3082i |
| w53 | 0011010 | −1.1447 − 0.4719i | w117 | 01110101 | −0.1629 − 0.3084i |
| w54 | 0011011 | −1.4915 + 0.6927i | w118 | 01110110 | −0.1535 + 0.3082i |
| w55 | 0011011 | −1.1447 + 0.4719i | w119 | 01110111 | −0.1629 + 0.3084i |
| w56 | 0011100 | −0.6878 − 0.8578i | w120 | 01111000 | −0.4535 − 0.6452i |
| w57 | 0011100 | −0.7725 − 0.6723i | w121 | 01111001 | −0.4645 − 0.5898i |
| w58 | 0011101 | −0.6878 + 0.8578i | w122 | 01111010 | −0.4535 + 0.6452i |
| w59 | 0011101 | −0.7725 + 0.6723i | w123 | 01111011 | −0.4645 + 0.5898i |
| w60 | 0011110 | −0.7359 − 0.3230i | w124 | 01111100 | −0.4853 − 0.3237i |
| w61 | 0011110 | −0.8236 − 0.3936i | w125 | 01111101 | −0.4637 − 0.3425i |
| w62 | 0011111 | −0.7359 + 0.3230i | w126 | 01111110 | −0.4853 + 0.3237i |
| w63 | 0011111 | −0.8236 + 0.3936i | w127 | 01111111 | −0.4637 + 0.3425i | for R = 5/8 (or R = 1/2, 3/4, or 13/16):

| w index | bit label | Constellation point | w index | bit label | Constellation point |
|---|---|---|---|---|---|
| w0 | 0000000 | +1.1470 + 0.4332i | w64 | 01000000 | +0.9015 + 0.4159i |
| w1 | 0000000 | +0.5553 + 0.4183i | w65 | 01000001 | +0.6908 + 0.3786i |
| w2 | 0000001 | +1.1804 + 0.7965i | w66 | 01000010 | +0.8996 + 0.6935i |
| w3 | 0000001 | +0.5406 + 0.6294i | w67 | 01000011 | +0.6580 + 0.7616i |
| w4 | 0000010 | +1.1470 − 0.4332i | w68 | 01000100 | +0.9015 − 0.4159i |
| w5 | 0000010 | +0.5553 − 0.4183i | w69 | 01000101 | +0.6908 − 0.3786i |
| w6 | 0000011 | +1.1804 − 0.7965i | w70 | 01000110 | +0.8996 − 0.6935i |
| w7 | 0000011 | +0.5406 − 0.6294i | w71 | 01000111 | +0.6580 − 0.7616i |
| w8 | 0000100 | −1.1470 + 0.4332i | w72 | 01001000 | −0.9015 + 0.4159i |
| w9 | 0000100 | −0.5553 + 0.4183i | w73 | 01001001 | −0.6908 + 0.3786i |
| w10 | 0000101 | −1.1804 + 0.7965i | w74 | 01001010 | −0.8996 + 0.6935i |
| w11 | 0000101 | −0.5406 + 0.6294i | w75 | 01001011 | −0.6580 + 0.7616i |
| w12 | 0000110 | −1.1470 − 0.4332i | w76 | 01001100 | −0.9015 − 0.4159i |
| w13 | 0000110 | −0.5553 − 0.4183i | w77 | 01001101 | −0.6908 − 0.3786i |
| w14 | 0000111 | −1.1804 − 0.7965i | w78 | 01001110 | −0.8996 − 0.6935i |
| w15 | 0000111 | −0.5406 − 0.6294i | w79 | 01001111 | −0.6580 − 0.7616i |
| w16 | 0001000 | +0.1029 + 0.4847i | w80 | 01010000 | +0.1029 + 0.3518i |
| w17 | 0001000 | +0.3416 + 0.4299i | w81 | 01010001 | +0.2989 + 0.3450i |
| w18 | 0001001 | +0.1167 + 0.6847i | w82 | 01010010 | +0.1222 + 0.9046i |
| w19 | 0001001 | +0.3403 + 0.6639i | w83 | 01010011 | +0.3701 + 0.8771i |
| w20 | 0001010 | +0.1029 − 0.4847i | w84 | 01010100 | +0.1029 − 0.3518i |
| w21 | 0001010 | +0.3416 − 0.4299i | w85 | 01010101 | +0.2989 − 0.3450i |
| w22 | 0001011 | +0.1167 − 0.6847i | w86 | 01010110 | +0.1222 − 0.9046i |
| w23 | 0001011 | +0.3403 − 0.6639i | w87 | 01010111 | +0.3701 − 0.8771i |
| w24 | 0001100 | −0.1029 + 0.4847i | w88 | 01011000 | −0.1029 + 0.3518i |
| w25 | 0001100 | −0.3416 + 0.4299i | w89 | 01011001 | −0.2989 + 0.3450i |
| w26 | 0001101 | −0.1167 + 0.6847i | w90 | 01011010 | −0.1222 + 0.9046i |
| w27 | 0001101 | −0.3403 + 0.6639i | w91 | 01011011 | −0.3701 + 0.8771i |
| w28 | 0001110 | −0.1029 − 0.4847i | w92 | 01011100 | −0.1029 − 0.3518i |
| w29 | 0001110 | −0.3416 − 0.4299i | w93 | 01011101 | −0.2989 − 0.3450i |
| w30 | 0001111 | −0.1167 − 0.6847i | w94 | 01011110 | −0.1222 − 0.9046i |
| w31 | 0001111 | −0.3403 − 0.6639i | w95 | 01011111 | −0.3701 − 0.8771i |
| w32 | 0010000 | +1.1636 + 0.1437i | w96 | 01100000 | +0.9136 + 0.1312i |
| w33 | 0010000 | +0.5673 + 0.1212i | w97 | 01100001 | +0.6911 + 0.1387i |
| w34 | 0010001 | +1.4805 + 0.1788i | w98 | 01100010 | +1.5526 + 0.5600i |
| w35 | 0010001 | +0.9781 + 1.1963i | w99 | 01100011 | +0.7165 + 1.0174i |
| w36 | 0010010 | +1.1636 − 0.1437i | w100 | 01100100 | +0.9136 − 0.1312i |
| w37 | 0010010 | +0.5673 − 0.1212i | w101 | 01100101 | +0.6911 − 0.1387i |
| w38 | 0010011 | +1.4805 − 0.1788i | w102 | 01100110 | +1.5526 − 0.5600i |
| w39 | 0010011 | +0.9781 − 1.1963i | w103 | 01100111 | +0.7165 − 1.0174i |
| w40 | 0010100 | −1.1636 + 0.1437i | w104 | 01101000 | −0.9136 + 0.1312i |
| w41 | 0010100 | −0.5673 + 0.1212i | w105 | 01101001 | −0.6911 + 0.1387i |
| w42 | 0010101 | −1.4805 + 0.1788i | w106 | 01101010 | −1.5526 + 0.5600i |
| w43 | 0010101 | −0.9781 + 1.1963i | w107 | 01101011 | −0.7165 + 1.0174i |
| w44 | 0010110 | −1.1636 − 0.1437i | w108 | 01101100 | −0.9136 − 0.1312i |
| w45 | 0010110 | −0.5673 − 0.1212i | w109 | 01101101 | −0.6911 − 0.1387i |
| w46 | 0010111 | −1.4805 − 0.1788i | w110 | 01101110 | −1.5526 − 0.5600i |
| w47 | 0010111 | −0.9781 − 1.1963i | w111 | 01101111 | −0.7165 − 1.0174i |
| w48 | 0011000 | +0.1058 + 0.0889i | w112 | 01110000 | +0.1130 + 0.1512i |
| w49 | 0011000 | +0.3723 + 0.1109i | w113 | 01110001 | +0.3195 + 0.1563i |
| w50 | 0011001 | +0.1939 + 1.4903i | w114 | 01110010 | +0.1450 + 1.1700i |
| w51 | 0011001 | +0.5867 + 1.4162i | w115 | 01110011 | +0.4379 + 1.1192i |
| w52 | 0011010 | +0.1058 − 0.0889i | w116 | 01110100 | +0.1130 − 0.1512i |
| w53 | 0011010 | +0.3723 − 0.1109i | w117 | 01110101 | +0.3195 − 0.1563i |
| w54 | 0011011 | +0.1939 − 1.4903i | w118 | 01110110 | +0.1450 − 1.1700i |
| w55 | 0011011 | +0.5867 − 1.4162i | w119 | 01110111 | +0.4379 − 1.1192i |
| w56 | 0011100 | −0.1058 + 0.0889i | w120 | 01111000 | −0.1130 + 0.1512i |
| w57 | 0011100 | −0.3723 + 0.1109i | w121 | 01111001 | −0.3195 + 0.1563i |
| w58 | 0011101 | −0.1939 + 1.4903i | w122 | 01111010 | −0.1450 + 1.1700i |
| w59 | 0011101 | −0.5867 + 1.4162i | w123 | 01111011 | −0.4379 + 1.1192i |
| w60 | 0011110 | −0.1058 − 0.0889i | w124 | 01111100 | −0.1130 − 0.1512i |
| w61 | 0011110 | −0.3723 − 0.1109i | w125 | 01111101 | −0.3195 − 0.1563i |
| w62 | 0011111 | −0.1939 − 1.4903i | w126 | 01111110 | −0.1450 − 1.1700i |
| w63 | 0011111 | −0.5867 − 1.4162i | w127 | 01111111 | −0.4379 − 1.1192i | for R = 3/4 (or R = 1/2. 5/8 or 13/16):

| w index | bit label | Constellation point | w index | bit label | Constellation point |
|---|---|---|---|---|---|
| w0 | 0000000 | +1.0484 + 0.3435i | w64 | 01000000 | +1.0484 − 0.3435i |
| w1 | 0000000 | +1.1392 + 0.5908i | w65 | 01000001 | +1.1392 − 0.5908i |
| w2 | 0000001 | −1.0484 + 0.3435i | w66 | 01000010 | −1.0484 − 0.3435i |
| w3 | 0000001 | −1.1392 + 0.5908i | w67 | 01000011 | −1.1392 − 0.5908i |
| w4 | 0000010 | +1.0205 + 0.1130i | w68 | 01000100 | +1.0205 − 0.1130i |
| w5 | 0000010 | +1.3137 + 0.1401i | w69 | 01000101 | +1.0205 − 0.1130i |
| w6 | 0000011 | −1.0205 + 0.1130i | w70 | 01000110 | −1.0205 − 0.1130i |
| w7 | 0000011 | −1.3137 + 0.1401i | w71 | 01000111 | −1.0205 − 0.1130i |
| w8 | 0000100 | +0.8050 + 0.3736i | w72 | 01001000 | +0.8050 − 0.3736i |
| w9 | 0000100 | +0.8767 + 0.6075i | w73 | 01001001 | +0.8767 − 0.6075i |
| w10 | 0000101 | −0.8050 + 0.3736i | w74 | 01001010 | −0.8050 − 0.3736i |
| w11 | 0000101 | −0.8767 + 0.6075i | w75 | 01001011 | −0.8767 − 0.6075i |
| w12 | 0000110 | +0.7794 + 0.1239i | w76 | 01001100 | +0.7794 − 0.1239i |
| w13 | 0000110 | +1.4466 + 0.4199i | w77 | 01001101 | +1.4466 − 0.4199i |
| w14 | 0000111 | −0.7794 + 0.1239i | w78 | 01001110 | −0.7794 − 0.1239i |
| w15 | 0000111 | −1.4466 + 0.4199i | w79 | 01001111 | −1.4466 − 0.4199i |

A3) 128-QAM NUC

| w index | bit label | Constellation point | w index | bit label | Constellation point |
|---|---|---|---|---|---|
| w16 | 0001000 | +0.5512 + 0.5784i | w80 | 01010000 | +0.5512 − 0.5784i |
| w17 | 0001000 | +0.5926 + 0.7787i | w81 | 01010001 | +0.5926 − 0.7787i |
| w18 | 0001001 | −0.5512 + 0.5784i | w82 | 01010010 | −0.5512 − 0.5784i |
| w19 | 0001001 | −0.5926 + 0.7787i | w83 | 01010011 | −0.5926 − 0.7787i |
| w20 | 0001010 | +0.4970 + 0.0732i | w84 | 01010100 | +0.4970 − 0.0732i |
| w21 | 0001010 | +1.1801 + 0.9322i | w85 | 01010101 | +1.1801 − 0.9322i |
| w22 | 0001011 | −0.4970 + 0.0732i | w86 | 01010110 | −0.4970 − 0.0732i |
| w23 | 0001011 | −1.1801 + 0.9322i | w87 | 01010111 | −1.1801 − 0.9322i |
| w24 | 0001100 | +0.5773 + 0.3945i | w88 | 01011000 | +0.5773 − 0.3945i |
| w25 | 0001100 | +0.8273 + 0.8515i | w89 | 01011001 | +0.8273 − 0.8515i |
| w26 | 0001101 | −0.5773 + 0.3945i | w90 | 01011010 | −0.5773 − 0.3945i |
| w27 | 0001101 | −0.8273 + 0.8515i | w91 | 01011011 | −0.8273 − 0.8515i |
| w28 | 0001110 | +0.5611 + 0.2103i | w92 | 01011100 | +0.5611 − 0.2103i |
| w29 | 0001110 | +0.9097 + 1.1442i | w93 | 01011101 | +0.9097 − 1.1442i |
| w30 | 0001111 | −0.5611 + 0.2103i | w94 | 01011110 | −0.5611 − 0.2103i |
| w31 | 0001111 | −0.9097 + 1.1442i | w95 | 01011111 | −0.9097 − 1.1442i |
| w32 | 0010000 | +0.1137 + 0.6007i | w96 | 01100000 | +0.1137 − 0.6007i |
| w33 | 0010000 | +0.1177 + 0.7939i | w97 | 01100001 | +0.1177 − 0.7939i |
| w34 | 0010001 | −0.1137 + 0.6007i | w98 | 01100010 | −0.1137 − 0.6007i |
| w35 | 0010001 | −0.1177 + 0.7939i | w99 | 01100011 | −0.1177 − 0.7939i |
| w36 | 0010010 | +0.0988 + 0.0864i | w100 | 01100100 | +0.0988 − 0.0864i |
| w37 | 0010010 | +0.1761 + 1.5225i | w101 | 01100101 | +0.1761 − 1.5225i |
| w38 | 0010011 | −0.0988 + 0.0864i | w102 | 01100110 | −0.0988 − 0.0864i |
| w39 | 0010011 | −0.1761 + 1.5225i | w103 | 01100111 | −0.1761 − 1.5225i |
| w40 | 0010100 | +0.1075 + 0.4242i | w104 | 01101000 | +0.1075 − 0.4242i |
| w41 | 0010100 | +0.1232 + 1.0065i | w105 | 01101001 | +0.1232 − 1.0065i |
| w42 | 0010101 | −0.1075 + 0.4242i | w106 | 01101010 | −0.1075 − 0.4242i |
| w43 | 0010101 | −0.1232 + 1.0065i | w107 | 01101011 | −0.1232 − 1.0065i |
| w44 | 0010110 | +0.1016 + 0.2562i | w108 | 01101100 | +0.1016 − 0.2562i |
| w45 | 0010110 | +0.1403 + 1.2447i | w109 | 01101101 | +0.1403 − 1.2447i |
| w46 | 0010111 | −0.1016 + 0.2562i | w110 | 01101110 | −0.1016 − 0.2562i |
| w47 | 0010111 | −0.1403 + 1.2447i | w111 | 01101111 | −0.1403 − 1.2447i |
| w48 | 0011000 | +0.3358 + 0.5918i | w112 | 01110000 | +0.3358 − 0.5918i |
| w49 | 0011000 | +0.3537 + 0.7995i | w113 | 01110001 | +0.3537 − 0.7995i |
| w50 | 0011001 | −0.3358 + 0.5918i | w114 | 01110010 | −0.3358 − 0.5918i |
| w51 | 0011001 | −0.3537 + 0.7995i | w115 | 01110011 | −0.3537 − 0.7995i |
| w52 | 0011010 | +0.2966 + 0.0872i | w116 | 01110100 | +0.2966 − 0.0872i |
| w53 | 0011010 | +0.4861 + 1.3847i | w117 | 01110101 | +0.4861 − 1.3847i |
| w54 | 0011011 | −0.2966 + 0.0872i | w118 | 01110110 | −0.2966 − 0.0872i |
| w55 | 0011011 | −0.4861 + 1.3847i | w119 | 01110111 | −0.4861 − 1.3847i |
| w56 | 0011100 | +0.3322 + 0.4087i | w120 | 01111000 | +0.3322 − 0.4087i |
| w57 | 0011100 | +0.3791 + 1.0277i | w121 | 01111001 | +0.3791 − 1.0277i |
| w58 | 0011101 | −0.3322 + 0.4087i | w122 | 01111010 | −0.3322 − 0.4087i |
| w59 | 0011101 | −0.3791 + 1.0277i | w123 | 01111011 | −0.3791 − 1.0277i |
| w60 | 0011110 | +0.3142 + 0.2509i | w124 | 01111100 | +0.3142 − 0.2509i |
| w61 | 0011110 | +0.6160 + 1.1277i | w125 | 01111101 | +0.6160 − 1.1277i |
| w62 | 0011111 | −0.3142 + 0.2509i | w126 | 01111110 | −0.3142 − 0.2509i |
| w63 | 0011111 | −0.6160 + 1.1277i | w127 | 01111111 | −0.6160 − 1.1277i | for R = 13/16 (or R = 1/2, 5/8 or 3/4)

| w index | bit label | Constellation point | w index | bit label | Constellation point |
|---|---|---|---|---|---|
| w0 | 0000000 | +1.0422 + 0.3376i | w64 | 01000000 | +0.5556 + 0.6306i |
| w1 | 0000000 | +1.0422 − 0.3376i | w65 | 01000001 | +0.5556 − 0.6306i |
| w2 | 0000001 | −1.0422 + 0.3376i | w66 | 01000010 | −0.5556 + 0.6306i |
| w3 | 0000001 | −1.0422 − 0.3376i | w67 | 01000011 | −0.5556 − 0.6306i |
| w4 | 0000010 | +0.7966 + 0.3496i | w68 | 01000100 | +0.5761 + 0.4286i |
| w5 | 0000010 | +0.7966 − 0.3496i | w69 | 01000101 | +0.5761 − 0.4286i |
| w6 | 0000011 | −0.7966 + 0.3496i | w70 | 01000110 | −0.5761 + 0.4286i |
| w7 | 0000011 | −0.7966 − 0.3496i | w71 | 01000111 | −0.5761 − 0.4286i |

A3) 128-QAM NUC

| w index | bit label | Constellation point | w index | bit label | Constellation point |
|---|---|---|---|---|---|
| w8 | 0000100 | +1.1154 + 0.5839i | w72 | 01001000 | +0.5970 + 0.8482i |
| w9 | 0000100 | +1.1154 − 0.5839i | w73 | 01001001 | +0.5970 − 0.8482i |
| w10 | 0000101 | −1.1154 + 0.5839i | w74 | 01001010 | −0.5970 + 0.8482i |
| w11 | 0000101 | −1.1154 − 0.5839i | w75 | 01001011 | −0.5970 − 0.8482i |
| w12 | 0000110 | +0.8563 + 0.5705i | w76 | 01001100 | +0.8378 + 0.8041i |
| w13 | 0000110 | +0.8563 − 0.5705i | w77 | 01001101 | +0.8378 − 0.8041i |
| w14 | 0000111 | −0.8563 + 0.5705i | w78 | 01001110 | −0.8378 + 0.8041i |
| w15 | 0000111 | −0.8563 − 0.5705i | w79 | 01001111 | −0.8378 − 0.8041i |
| w16 | 0001000 | +1.0010 + 0.1105i | w80 | 01010000 | +0.4942 + 0.0780i |
| w17 | 0001000 | +1.0010 − 0.1105i | w81 | 01010001 | +0.4942 − 0.0780i |
| w18 | 0001001 | −1.0010 + 0.1105i | w82 | 01010010 | −0.4942 + 0.0780i |
| w19 | 0001001 | −1.0010 − 0.1105i | w83 | 01010011 | −0.4942 − 0.0780i |
| w20 | 0001010 | +0.7613 + 0.1187i | w84 | 01010100 | +0.5456 + 0.2367i |
| w21 | 0001010 | +0.7613 − 0.1187i | w85 | 01010101 | +0.5456 − 0.2367i |
| w22 | 0001011 | −0.7613 + 0.1187i | w86 | 01010110 | −0.5456 + 0.2367i |
| w23 | 0001011 | −0.7613 − 0.1187i | w87 | 01010111 | −0.5456 − 0.2367i |
| w24 | 0001100 | +1.2844 + 0.1345i | w88 | 01011000 | +1.1670 + 0.8997i |
| w25 | 0001100 | +1.2844 − 0.1345i | w89 | 01011001 | +1.1670 − 0.8997i |
| w26 | 0001101 | −1.2844 + 0.1345i | w90 | 01011010 | −1.1670 + 0.8997i |
| w27 | 0001101 | −1.2844 − 0.1345i | w91 | 01011011 | −1.1670 − 0.8997i |
| w28 | 0001110 | +1.4001 + 0.4092i | w92 | 01011100 | +0.9031 + 1.0698i |
| w29 | 0001110 | +1.4001 − 0.4092i | w93 | 01011101 | +0.9031 − 1.0698i |
| w30 | 0001111 | −1.4001 + 0.4092i | w94 | 01011110 | −0.9031 + 1.0698i |
| w31 | 0001111 | −1.4001 − 0.4092i | w95 | 01011111 | −0.9031 − 1.0698i |
| w32 | 0010000 | +0.1125 + 0.6269i | w96 | 01100000 | +0.3351 + 0.6308i |
| w33 | 0010000 | +0.1125 − 0.6269i | w97 | 01100001 | +0.3351 − 0.6308i |
| w34 | 0010001 | −0.1125 + 0.6269i | w98 | 01100010 | −0.3351 + 0.6308i |
| w35 | 0010001 | −0.1125 − 0.6269i | w99 | 01100011 | −0.3351 − 0.6308i |
| w36 | 0010010 | +0.1109 + 0.4454i | w100 | 01100100 | +0.3383 + 0.4404i |
| w37 | 0010010 | +0.1109 − 0.4454i | w101 | 01100101 | +0.3383 − 0.4404i |
| w38 | 0010011 | −0.1109 + 0.4454i | w102 | 01100110 | −0.3383 + 0.4404i |
| w39 | 0010011 | −0.1109 − 0.4454i | w103 | 01100111 | −0.3383 − 0.4404i |
| w40 | 0010100 | +0.1155 + 0.8217i | w104 | 01101000 | +0.3510 + 0.8405i |
| w41 | 0010100 | +0.1155 − 0.8217i | w105 | 01101001 | +0.3510 − 0.8405i |
| w42 | 0010101 | −0.1155 + 0.8217i | w106 | 01101010 | −0.3510 + 0.8405i |
| w43 | 0010101 | −0.1155 − 0.8217i | w107 | 01101011 | −0.3510 − 0.8405i |
| w44 | 0010110 | +0.1239 + 1.0311i | w108 | 01101100 | +0.3850 + 1.0724i |
| w45 | 0010110 | +0.1239 − 1.0311i | w109 | 01101101 | +0.3850 − 1.0724i |
| w46 | 0010111 | −0.1239 + 1.0311i | w110 | 01101110 | −0.3850 + 1.0724i |
| w47 | 0010111 | −0.1239 − 1.0311i | w111 | 01101111 | −0.3850 − 1.0724i |
| w48 | 0011000 | +0.0978 + 0.0913i | w112 | 01110000 | +0.2935 + 0.0906i |
| w49 | 0011000 | +0.0978 − 0.0913i | w113 | 01110001 | +0.2935 − 0.0906i |
| w50 | 0011001 | −0.0978 + 0.0913i | w114 | 01110010 | −0.2935 + 0.0906i |
| w51 | 0011001 | −0.0978 − 0.0913i | w115 | 01110011 | −0.2935 − 0.0906i |
| w52 | 0011010 | +0.1038 + 0.2705i | w116 | 01110100 | +0.3172 + 0.2666i |
| w53 | 0011010 | +0.1038 − 0.2705i | w117 | 01110101 | +0.3172 − 0.2666i |
| w54 | 0011011 | −0.1038 + 0.2705i | w118 | 01110110 | −0.3172 + 0.2666i |
| w55 | 0011011 | −0.1038 − 0.2705i | w119 | 01110111 | −0.3172 − 0.2666i |
| w56 | 0011100 | +0.1646 + 1.5274i | w120 | 01111000 | +0.4543 + 1.3933i |
| w57 | 0011100 | +0.1646 − 1.5274i | w121 | 01111001 | +0.4543 − 1.3933i |
| w58 | 0011101 | −0.1646 + 1.5274i | w122 | 01111010 | −0.4543 + 1.3933i |
| w59 | 0011101 | −0.1646 − 1.5274i | w123 | 01111011 | −0.4543 − 1.3933i |
| w60 | 0011110 | +0.1345 + 1.2611i | w124 | 01111100 | +0.6436 + 1.1770i |
| w61 | 0011110 | +0.1345 − 1.2611i | w125 | 01111101 | +0.6436 − 1.1770i |
| w62 | 0011111 | −0.1345 + 1.2611i | w126 | 01111110 | −0.6436 + 1.1770i |
| w63 | 0011111 | −0.1345 − 1.2611i | w127 | 01111111 | −0.6436 − 1.1770i |

A4) 256-QAM NUC

| w index | bit label | Constellation point | w index | bit label | Constellation point |
|---|---|---|---|---|---|
| for R = 1/2 (or R = 5/8, 3/4 or 13/16): | | | | | |
| w0 | 0000000 | −1.2901 + 1.0495i | w64 | 01000000 | −1.2901 − 1.0495i |
| w1 | 0000000 | −0.7273 + 0.6160i | w65 | 01000001 | −0.7273 − 0.6160i |
| w2 | 0000001 | −1.0646 + 1.2876i | w66 | 01000010 | −1.0646 − 1.2876i |
| w3 | 0000001 | −0.5707 + 1.7662i | w67 | 01000011 | −0.5707 − 0.7662i |
| w4 | 0000010 | +1.2901 + 1.0495i | w68 | 01000100 | +1.2901 − 1.0495i |
| w5 | 0000010 | +0.7273 + 0.6160i | w69 | 01000101 | +0.7273 − 0.6160i |

| A4) 256-QAM NUC | | | | | |
|---|---|---|---|---|---|
| w6 | 0000011 | +1.0646 + 1.2876i | w70 | 01000110 | +1.0646 − 1.2876i |
| w7 | 0000011 | +0.5707 + 0.7662i | w71 | 01000111 | +0.5707 − 0.7662i |
| w8 | 0000100 | −1.4625 + 0.7740i | w72 | 01001000 | −1.4625 − 0.7740i |
| w9 | 0000100 | −0.8177 + 0.4841i | w73 | 01001001 | −0.8177 − 0.4841i |
| w10 | 0000101 | −0.7949 + 1.4772i | w74 | 01001010 | −0.7949 − 1.4772i |
| w11 | 0000101 | −0.4490 + 0.8461i | w75 | 01001011 | −0.4490 − 0.8461i |
| w12 | 0000110 | +1.4625 + 0.7740i | w76 | 01001100 | +1.4625 − 0.7740i |
| w13 | 0000110 | +0.8177 + 0.4841i | w77 | 01001101 | +0.8177 − 0.4841i |
| w14 | 0000111 | +0.7949 + 1.4772i | w78 | 01001110 | +0.7949 − 1.4772i |
| w15 | 0000111 | +0.4490 + 0.8461i | w79 | 01001111 | +0.4490 − 0.8461i |
| w16 | 0001000 | −0.2844 + 0.1296i | w80 | 01010000 | −0.2844 − 0.1296i |
| w17 | 0001000 | −0.5902 + 0.4857i | w81 | 01010001 | −0.5902 − 0.4857i |
| w18 | 0001001 | −0.1053 + 0.1494i | w82 | 01010010 | −0.1053 − 0.1494i |
| w19 | 0001001 | −0.4294 + 0.6363i | w83 | 01010011 | −0.4294 − 0.6363i |
| w20 | 0001010 | +0.2844 + 0.1296i | w84 | 01010100 | +0.2844 − 0.1296i |
| w21 | 0001010 | +0.5902 + 0.4857i | w85 | 01010101 | +0.5902 − 0.4857i |
| w22 | 0001011 | +0.1053 + 0.1494i | w86 | 01010110 | +0.1053 − 0.1494i |
| w23 | 0001011 | +0.4294 + 0.6363i | w87 | 01010111 | +0.4294 − 0.6363i |
| w24 | 0001100 | −0.2853 + 0.1309i | w88 | 01011000 | −0.2853 − 0.1309i |
| w25 | 0001100 | −0.6355 + 0.4185i | w89 | 01011001 | −0.6355 − 0.4185i |
| w26 | 0001101 | −0.1052 + 0.1495i | w90 | 01011010 | −0.1052 − 0.1495i |
| w27 | 0001101 | −0.3744 + 0.5744i | w91 | 01011011 | −0.3744 − 0.6744i |
| w28 | 0001110 | +0.2853 + 0.1309i | w92 | 01011100 | +0.2853 − 0.1309i |
| w29 | 0001110 | +0.6355 + 0.4185i | w93 | 01011101 | +0.6355 − 0.4185i |
| w30 | 0001111 | +0.1052 + 0.1495i | w94 | 01011110 | +0.1052 − 0.1495i |
| w31 | 0001111 | +0.3744 + 0.6744i | w95 | 01011111 | +0.3744 − 0.6744i |
| w32 | 0010000 | −1.6350 + 0.1593i | w96 | 01100000 | −1.6350 − 0.1598i |
| w33 | 0010000 | −0.9430 + 0.1100i | w97 | 01100001 | −0.9430 − 0.1100i |
| w34 | 0010001 | −0.1658 + 1.6747i | w98 | 01100010 | −0.1658 − 1.6747i |
| w35 | 0010001 | −0.1088 + 0.9530i | w99 | 01100011 | −0.1088 − 0.9630i |
| w36 | 0010010 | +1.6350 + 0.1593i | w100 | 01100100 | +1.6350 − 0.1593i |
| w37 | 0010010 | +0.9430 + 0.1100i | w101 | 01100101 | +0.9430 − 0.1100i |
| w38 | 0010011 | +0.1658 + 1.6747i | w102 | 01100110 | +0.1658 − 1.6747i |
| w39 | 0010011 | +0.1088 + 0.9530i | w103 | 01100111 | +0.1088 − 0.9530i |
| w40 | 0010100 | −1.5776 + 0.4735i | w104 | 01101000 | −1.5776 − 0.4735i |
| w41 | 0010100 | −0.9069 + 0.2829i | w105 | 01101001 | −0.9069 − 0.2829i |
| w42 | 0010101 | −0.4907 + 1.6084i | w106 | 01101010 | −0.4907 − 1.6084i |
| w43 | 0010101 | −0.2464 + 0.9270i | w107 | 01101011 | −0.2464 − 0.9270i |
| w44 | 0010110 | +1.5776 + 0.4735i | w108 | 01101100 | +1.5776 − 0.4735i |
| w45 | 0010110 | +0.9069 + 0.2829i | w109 | 01101101 | +0.9069 − 0.2829i |
| w46 | 0010111 | +0.4907 + 1.6084i | w110 | 01101110 | +0.4907 − 1.6084i |
| w47 | 0010111 | +0.2464 + 0.9270i | w111 | 01101111 | +0.2464 − 0.9270i |
| w48 | 0011000 | −0.3237 + 0.0849i | w112 | 01110000 | −0.3237 − 0.0849i |
| w49 | 0011000 | −0.7502 + 0.1138i | w113 | 01110001 | −0.7502 − 0.1138i |
| w50 | 0011001 | −0.0872 + 0.1390i | w114 | 01110010 | −0.0872 − 0.1390i |
| w51 | 0011001 | −0.1091 + 0.7656i | w115 | 01110011 | −0.1091 − 0.7656i |
| w52 | 0011010 | +0.3237 + 0.0849i | w116 | 01110100 | +0.3237 − 0.0849i |
| w53 | 0011010 | +0.7502 + 0.1138i | w117 | 01110101 | +0.7502 − 0.1138i |
| w54 | 0011011 | +0.0872 + 0.1390i | w118 | 01110110 | +0.0872 − 0.1390i |
| w55 | 0011011 | +0.1091 + 0.7656i | w119 | 01110111 | +0.1091 − 0.7656i |
| w56 | 0011100 | −0.3228 + 0.0867i | w120 | 01111000 | −0.3228 − 0.0867i |
| w57 | 0011100 | −0.7325 + 0.2088i | w121 | 01111001 | −0.7325 − 0.2088i |
| w58 | 0011101 | −0.0871 + 0.1392i | w122 | 01111010 | −0.0871 − 0.1392i |
| w59 | 0011101 | −0.1699 + 0.7537i | w123 | 01111011 | −0.1699 − 0.7537i |
| w60 | 0011110 | +0.3228 + 0.0867i | w124 | 01111100 | +0.3228 − 0.0867i |
| w61 | 0011110 | +0.7325 + 0.2088i | w125 | 01111101 | +0.7325 − 0.2088i |
| w62 | 0011111 | +0.0871 + 0.1392i | w126 | 01111110 | +0.0871 − 0.1392i |
| w63 | 0011111 | +0.1699 + 0.7537i | w127 | 01111111 | +0.1699 − 0.7537i |
| for R = 5/8 (or R = 1/2, 3/4 or 13/16): | | | | | |
| w0 | 0000000 | −1.2537 + 1.0045i | w64 | 01000000 | −1.4164 + 0.7386i |
| w1 | 0000000 | −0.2443 + 0.2114i | w65 | 01000001 | −0.2508 + 0.2043i |
| w2 | 0000001 | −0.7404 + 0.6074i | w66 | 01000010 | −0.8324 + 0.4499i |
| w3 | 0000001 | −0.6961 + 0.5118i | w67 | 01000011 | −0.6808 + 0.3821i |
| w4 | 0000010 | −1.5761 + 0.1512i | w68 | 01000100 | −1.5251 + 0.4510i |
| w5 | 0000010 | −0.2545 + 0.0723i | w69 | 01000101 | −0.2566 + 0.0761i |
| w6 | 0000011 | −0.9317 + 0.0939i | w70 | 01000110 | −0.8975 + 0.2781i |
| w7 | 0000011 | −0.7729 + 0.0813i | w71 | 01000111 | −0.7412 + 0.2345i |
| w8 | 0000100 | +1.2537 + 1.0045i | w72 | 01001000 | +1.4164 + 0.7386i |
| w9 | 0000100 | +0.2443 + 0.2114i | w73 | 01001001 | +0.2508 + 0.2043i |
| w10 | 0000101 | +0.7404 + 0.6074i | w74 | 01001010 | +0.8324 + 0.4499i |
| w11 | 0000101 | +0.6089 + 0.5118i | w75 | 01001011 | +0.6808 + 0.3821i |
| w12 | 0000110 | +1.5761 + 0.1512i | w76 | 01001100 | +1.5251 + 0.4510i |
| w13 | 0000110 | +0.2545 + 0.0723i | w77 | 01001101 | +0.2566 + 0.0761i |
| w14 | 0000111 | +0.9317 + 0.0939i | w78 | 01001110 | +0.8975 + 0.2781i |
| w15 | 0000111 | +0.7729 + 0.0813i | w79 | 01001111 | +0.7412 + 0.2345i |
| w16 | 0001000 | −1.2537 − 1.0045i | w80 | 01010000 | −1.4164 − 0.7386i |

A4) 256-QAM NUC

| | | | | | |
|---|---|---|---|---|---|
| w17 | 0001000 | −0.2443 − 0.2114i | w81 | 01010001 | −0.2508 − 0.2043i |
| w18 | 0001001 | −0.7404 − 0.6074i | w82 | 01010010 | −0.8324 − 0.4499i |
| w19 | 0001001 | −0.6089 − 0.5118i | w83 | 01010011 | −0.6808 − 0.3821i |
| w20 | 0001010 | −1.5761 − 0.1512i | w84 | 01010100 | −1.5251 − 0.4510i |
| w21 | 0001010 | −0.2545 − 0.0723i | w85 | 01010101 | −0.2566 − 0.0761i |
| w22 | 0001011 | −0.9317 − 0.0939i | w86 | 01010110 | −0.8975 − 0.2781i |
| w23 | 0001011 | −0.7729 − 0.0813i | w87 | 01010111 | −0.7412 − 0.2345i |
| w24 | 0001100 | +1.2537 − 1.0045i | w88 | 01011000 | +1.4164 − 0.7386i |
| w25 | 0001100 | +0.2443 − 0.2114i | w89 | 01011001 | +0.2508 − 0.2043i |
| w26 | 0001101 | +0.7404 − 0.6074i | w90 | 01011010 | +0.8324 − 0.4499i |
| w27 | 0001101 | +0.6089 − 0.5118i | w91 | 01011011 | +0.6808 − 0.3821i |
| w28 | 0001110 | +1.5761 − 0.1512i | w92 | 01011100 | +1.5251 − 0.4510i |
| w29 | 0001110 | +0.2545 − 0.0723i | w93 | 01011101 | +0.2566 − 0.0761i |
| w30 | 0001111 | +0.9317 − 0.0939i | w94 | 01011110 | +0.8975 − 0.2781i |
| w31 | 0001111 | +0.7729 − 0.0813i | w95 | 01011111 | +0.7412 − 0.2345i |
| w32 | 0010000 | −1.0876 + 1.2347i | w96 | 01100000 | −0.7769 + 1.4193i |
| w33 | 0010000 | −0.0940 + 0.2611i | w97 | 01100001 | −0.0898 + 0.2628i |
| w34 | 0010001 | −0.6205 + 0.7476i | w98 | 01100010 | −0.4711 + 0.8645i |
| w35 | 0010001 | −0.5048 + 0.6321i | w99 | 01100011 | −0.3892 + 0.7279i |
| w36 | 0010010 | −0.1632 + 1.6163i | w100 | 01100100 | −0.4813 + 1.5486i |
| w37 | 0010010 | −0.0734 + 0.0858i | w101 | 01100101 | −0.0722 + 0.0860i |
| w38 | 0010011 | −0.1006 + 0.9948i | w102 | 01100110 | −0.2955 + 0.9492i |
| w39 | 0010011 | −0.0848 + 0.8427i | w103 | 01100111 | −0.2443 + 0.8036i |
| w40 | 0010100 | +1.0376 + 1.2347i | w104 | 01101000 | +0.7769 + 1.4193i |
| w41 | 0010100 | +0.0940 + 0.2611i | w105 | 01101001 | +0.0898 + 0.2628i |
| w42 | 0010101 | +0.6205 + 0.7476i | w106 | 01101010 | +0.4711 + 0.8645i |
| w43 | 0010101 | +0.5048 + 0.6321i | w107 | 01101011 | +0.3892 + 0.7279i |
| w44 | 0010110 | +0.1632 + 1.6163i | w108 | 01101100 | +0.4813 + 1.5486i |
| w45 | 0010110 | +0.0734 + 0.0858i | w109 | 01101101 | +0.0722 + 0.0860i |
| w46 | 0010111 | +0.1006 + 0.9948i | w110 | 01101110 | +0.2955 + 0.9492i |
| w47 | 0010111 | +0.0848 + 0.8427i | w111 | 01101111 | +0.2443 + 0.8036i |
| w48 | 0011000 | −1.0376 − 1.2347i | w112 | 01110000 | −0.7769 − 1.4193i |
| w49 | 0011000 | −0.0940 − 0.2611i | w113 | 01110001 | −0.0898 − 0.2628i |
| w50 | 0011001 | −0.6205 − 0.7476i | w114 | 01110010 | −0.4711 − 0.8645i |
| w51 | 0011001 | −0.5048 − 0.6321i | w115 | 01110011 | −0.3892 − 0.7279i |
| w52 | 0011010 | −0.1632 − 1.6163i | w116 | 01110100 | −0.4813 − 1.5486i |
| w53 | 0011010 | −0.0734 − 0.0858i | w117 | 01110101 | −0.0722 − 0.0860i |
| w54 | 0011011 | −0.1006 − 0.9948i | w118 | 01110110 | −0.2955 − 0.9492i |
| w55 | 0011011 | −0.0848 − 0.8427i | w119 | 01110111 | −0.2443 − 0.8036i |
| w56 | 0011100 | +1.0376 − 1.2347i | w120 | 01111000 | +0.7769 − 1.4195i |
| w57 | 0011100 | +0.0940 − 0.2611i | w121 | 01111001 | +0.0898 − 0.2628i |
| w58 | 0011101 | +0.6205 − 0.7476i | w122 | 01111010 | +0.4711 − 0.8645i |
| w59 | 0011101 | +0.5048 − 0.6321i | w123 | 01111011 | +0.3892 − 0.7279i |
| w60 | 0011110 | +0.1632 − 1.6163i | w124 | 01111100 | +0.4813 − 1.5486i |
| w61 | 0011110 | +0.0734 − 0.0858i | w125 | 01111101 | +0.0722 − 0.0860i |
| w62 | 0011111 | +0.1006 − 0.9948i | w126 | 01111110 | +0.2955 − 0.9492i |
| w63 | 0011111 | +0.0848 − 0.8427i | w127 | 01111111 | +0.2443 − 0.8036i | for R = 3/4 (or R = 1/2, 5/8 or 13/16):

| | | | | | |
|---|---|---|---|---|---|
| w0 | 0000000 | −0.5115 + 1.2063i | w64 | 01000000 | −0.6596 + 0.0715i |
| w1 | 0000000 | −0.5115 − 1.2063i | w65 | 01000001 | −0.6596 − 0.0715i |
| w2 | 0000001 | −0.3049 + 1.2378i | w66 | 01000010 | −0.5124 + 0.0667i |
| w3 | 0000001 | −0.3049 − 1.2378i | w67 | 01000011 | −0.5124 − 0.0667i |
| w4 | 0000010 | +0.5115 + 1.2063i | w68 | 01000100 | +0.6596 + 0.0715i |
| w5 | 0000010 | +0.5115 − 1.2063i | w69 | 01000101 | +0.6596 − 0.0715i |
| w6 | 0000011 | +0.3049 + 1.2378i | w70 | 01000110 | +0.5124 + 0.0667i |
| w7 | 0000011 | +0.3049 − 1.2378i | w71 | 01000111 | +0.5124 − 0.0667i |
| w8 | 0000100 | −0.4952 + 1.0059i | w72 | 01001000 | −0.6597 + 0.2116i |
| w9 | 0000100 | −0.4952 − 1.0059i | w73 | 01001001 | −0.6597 − 0.2116i |
| w10 | 0000101 | −0.3032 + 1.0518i | w74 | 01001010 | −0.5095 + 0.2008i |
| w11 | 0000101 | −0.3032 − 1.0518i | w75 | 01001011 | −0.5095 − 0.2008i |
| w12 | 0000110 | +0.4952 + 1.0059i | w76 | 01001100 | +0.6597 + 0.2116i |
| w13 | 0000110 | +0.4952 − 1.0059i | w77 | 01001101 | +0.6597 − 0.2116i |
| w14 | 0000111 | +0.3072 + 1.0518i | w78 | 01001110 | +0.5095 + 0.2008i |
| w15 | 0000111 | +0.3062 − 1.0518i | w79 | 01001111 | +0.5095 − 0.2008i |
| w16 | 0001000 | −1.1670 + 1.1014i | w80 | 01010000 | −1.4366 + 0.1213i |
| w17 | 0001000 | −1.1670 − 1.1014i | w81 | 01010001 | −1.4366 − 0.1213i |
| w18 | 0001001 | −0.1010 + 1.2545i | w82 | 01010010 | −0.0739 + 0.0596i |
| w19 | 0001001 | −0.1010 − 1.2545i | w83 | 01010011 | −0.0739 − 0.0596i |
| w20 | 0001010 | +1.1670 + 1.1014i | w84 | 01010100 | +1.4366 + 0.1213i |
| w21 | 0001010 | +1.1670 − 1.1014i | w85 | 01010101 | +1.4366 − 0.1213i |
| w22 | 0001011 | +0.1010 + 1.2545i | w86 | 01010110 | +0.0739 + 0.0596i |
| w23 | 0001011 | +0.1010 − 1.2545i | w87 | 01010111 | +0.0739 − 0.0596i |
| w24 | 0001100 | −1.2421 + 0.8557i | w88 | 01011000 | −1.2098 + 0.1077i |
| w25 | 0001100 | −1.2421 − 0.8557i | w89 | 01011001 | −1.2098 − 0.1077i |
| w26 | 0001101 | −0.0956 + 1.0676i | w90 | 01011010 | −0.0731 + 0.1767i |
| w27 | 0001101 | −0.0956 − 1.0676i | w91 | 01011011 | −0.0731 − 0.1767i |

| A4) 256-QAM NUC | | | | | |
|---|---|---|---|---|---|
| w28 | 0001110 | +1.2421 + 0.8557i | w92  | 01011100 | +1.2098 + 0.1077i |
| w29 | 0001110 | +1.2421 − 0.8557i | w93  | 01011101 | +1.2098 − 0.1077i |
| w30 | 0001111 | +0.0956 + 1.0676i | w94  | 01011110 | +0.0731 + 0.1767i |
| w31 | 0001111 | +0.0956 − 1.0676i | w95  | 01011111 | +0.0731 − 0.1767i |
| w32 | 0010000 | −0.6286 + 0.6639i | w96  | 01100000 | −0.6467 + 0.5036i |
| w33 | 0010000 | −0.6286 − 0.6639i | w97  | 01100001 | −0.6467 − 0.5036i |
| w34 | 0010001 | −0.4729 + 0.6321i | w98  | 01100010 | −0.4946 + 0.4818i |
| w35 | 0010001 | −0.4729 − 0.6321i | w99  | 01100011 | −0.4946 − 0.4818i |
| w36 | 0010010 | +0.6286 + 0.6639i | w100 | 01100100 | +0.6467 + 0.5036i |
| w37 | 0010010 | +0.6286 − 0.6639i | w101 | 01100101 | +0.6467 − 0.5036i |
| w38 | 0010011 | +0.4729 + 0.6321i | w102 | 01100110 | +0.4946 + 0.4818i |
| w39 | 0010011 | +0.4729 − 0.6321i | w103 | 01100111 | +0.4946 − 0.4818i |
| w40 | 0010100 | −0.5851 + 0.8353i | w104 | 01101000 | −0.6572 + 0.3526i |
| w41 | 0010100 | −0.5851 − 0.8353i | w105 | 01101001 | −0.6572 − 0.3526i |
| w42 | 0010101 | −0.4392 + 0.7880i | w106 | 01101010 | −0.5050 + 0.3380i |
| w43 | 0010101 | −0.4392 − 0.7880i | w107 | 01101011 | −0.5050 − 0.3380i |
| w44 | 0010110 | +0.5851 + 0.8353i | w108 | 01101100 | +0.6572 + 0.3526i |
| w45 | 0010110 | +0.5851 − 0.8353i | w109 | 01101101 | +0.6572 − 0.3526i |
| w46 | 0010111 | +0.4392 + 0.7880i | w110 | 01101110 | +0.5050 + 0.3380i |
| w47 | 0010111 | +0.4392 − 0.7880i | w111 | 01101111 | +0.5050 − 0.3380i |
| w48 | 0011000 | −1.2110 + 0.5795i | w112 | 01110000 | −1.4264 + 0.3764i |
| w49 | 0011000 | −1.2110 − 0.5795i | w113 | 01110001 | −1.4264 − 0.3764i |
| w50 | 0011001 | −0.0690 + 0.5518i | w114 | 01110010 | −0.0715 + 0.4218i |
| w51 | 0011001 | −0.0690 − 0.5518i | w115 | 01110011 | −0.0715 − 0.4218i |
| w52 | 0011010 | +1.2110 + 0.5795i | w116 | 01110100 | +1.4264 + 0.3764i |
| w53 | 0011010 | +1.2110 − 0.5795i | w117 | 01110101 | +1.4264 − 0.3764i |
| w54 | 0011011 | +0.0690 + 0.5518i | w118 | 01110110 | +0.0715 + 0.4218i |
| w55 | 0011011 | +0.0690 − 0.5518i | w119 | 01110111 | +0.0715 − 0.4218i |
| w56 | 0011100 | −1.4215 + 0.6637i | w120 | 01111000 | −1.2130 + 0.3237i |
| w57 | 0011100 | −1.4215 − 0.6637i | w121 | 01111001 | −1.2130 − 0.3237i |
| w58 | 0011101 | −0.0552 + 0.6903i | w122 | 01111010 | −0.0725 + 0.2978i |
| w59 | 0011101 | −0.0552 − 0.6903i | w123 | 01111011 | −0.0725 − 0.2978i |
| w60 | 0011110 | +1.4215 + 0.6637i | w124 | 01111100 | +1.2130 + 0.3237i |
| w61 | 0011110 | +1.4215 − 0.6637i | w125 | 01111101 | +1.2130 − 0.3237i |
| w62 | 0111111 | +0.0552 + 0.6903i | w126 | 01111110 | +0.0725 + 0.2978i |
| w63 | 0011111 | +0.0552 − 0.6903i | w127 | 01111111 | +0.0725 − 0.2978i |
| for R = 13/16 (or R = 1/2, 5/8 or 3/4): | | | | | |
| w0  | 0000000 | −0.4934 + 1.1976i | w64 | 01000000 | −0.4934 − 1.1976i |
| w1  | 0000000 | −0.6474 + 0.6881i | w65 | 01000001 | −0.6474 − 0.6881i |
| w2  | 0000001 | −0.6614 + 0.0730i | w66 | 01000010 | −0.6614 − 0.0730i |
| w3  | 0000001 | −0.6545 + 0.5220i | w67 | 01000011 | −0.6545 − 0.5220i |
| w4  | 0000010 | −0.4787 + 1.0113i | w68 | 01000100 | −0.4787 − 1.0113i |
| w5  | 0000010 | −0.6010 + 0.8566i | w69 | 01000101 | −0.6010 − 0.8566i |
| w6  | 0000011 | −0.6676 + 0.2192i | w70 | 01000110 | −0.6676 − 0.2192i |
| w7  | 0000011 | −0.6674 + 0.3672i | w71 | 01000111 | −0.6674 − 0.3672i |
| w8  | 0000100 | −1.1592 + 1.0404i | w72 | 01001000 | −1.1592 − 1.0404i |
| w9  | 0000100 | −1.1898 + 0.5538i | w73 | 01001001 | −1.1898 − 0.5538i |
| w10 | 0000101 | −1.3908 + 0.1102i | w74 | 01001010 | −1.3908 − 0.1102i |
| w11 | 0000101 | −1.4061 + 0.3370i | w75 | 01001011 | −1.4081 − 0.3370i |
| w12 | 0000110 | −1.2410 + 0.8061i | w76 | 01001100 | −1.2410 − 0.8061i |
| w13 | 0000110 | −1.3911 + 0.5975i | w77 | 01001101 | −1.3911 − 0.5975i |
| w14 | 0000111 | −1.1855 + 0.1041i | w78 | 01001110 | −1.1855 − 0.1041i |
| w15 | 0000111 | −1.2043 + 0.3138i | w79 | 01001111 | −1.2043 − 0.3138i |
| w16 | 0001000 | −0.2985 + 1.2655i | w80 | 01010000 | −0.2985 − 1.2655i |
| w17 | 0001000 | −0.4920 + 0.6512i | w81 | 01010001 | −0.4920 − 0.6512i |
| w18 | 0001001 | −0.5130 + 0.0697i | w82 | 01010010 | −0.5130 − 0.0697i |
| w19 | 0001001 | −0.5045 + 0.4981i | w83 | 01010011 | −0.5045 − 0.4981i |
| w20 | 0001010 | −0.2876 + 1.0856i | w84 | 01010100 | −0.2876 − 1.0856i |
| w21 | 0001010 | −0.4556 + 0.8064i | w85 | 01010101 | −0.4556 − 0.8064i |
| w22 | 0001011 | −0.5147 + 0.2097i | w86 | 01010110 | −0.5147 − 0.2097i |
| w23 | 0001011 | −0.5132 + 0.3515i | w87 | 01010111 | −0.5132 − 0.3515i |
| w24 | 0001100 | −0.0980 + 1.2511i | w88 | 01011000 | −0.0980 − 1.2511i |
| w25 | 0001100 | −0.0701 + 0.5794i | w89 | 01011001 | −0.0701 − 0.5794i |
| w26 | 0001101 | −0.0734 + 0.0629i | w90 | 01011010 | −0.0734 − 0.0629i |
| w27 | 0001101 | −0.0724 + 0.4460i | w91 | 01011011 | −0.0724 − 0.4460i |
| w28 | 0001110 | −0.0934 + 1.0735i | w92 | 01011100 | −0.0934 − 1.0735i |
| w29 | 0001110 | −0.0582 + 0.7208i | w93 | 01011101 | −0.0582 − 0.7208i |
| w30 | 0001111 | −0.0734 + 0.1890i | w94 | 01011110 | −0.0734 − 0.1890i |
| w31 | 0001111 | −0.0731 + 0.3164i | w95 | 01011111 | −0.0731 − 0.3164i |
| w32 | 0010000 | −0.5534 + 1.3936i | w96 | 01100000 | −0.5534 − 1.3936i |
| w33 | 0010000 | −0.8188 + 0.7082i | w97 | 01100001 | −0.8188 − 0.7082i |
| w34 | 0010001 | −0.8139 + 0.0752i | w98 | 01100010 | −0.8139 − 0.0752i |
| w35 | 0010001 | −0.8095 + 0.5376i | w99 | 01100011 | −0.8095 − 0.5376i |
| w36 | 0010010 | −0.6787 + 1.0583i | w100 | 01100100 | −0.6787 − 1.0583i |
| w37 | 0010010 | −0.7729 + 0.8860i | w101 | 01100101 | −0.7729 − 0.8860i |
| w38 | 0010011 | −0.8305 + 0.2250i | w102 | 01100110 | −0.8305 − 0.2250i |

-continued

| A4) 256-QAM NUC | | | | | |
|---|---|---|---|---|---|
| w39 | 0010011 | −0.8315 + 0.3759i | w103 | 01100111 | −0.8315 − 0.3759i |
| w40 | 0010100 | −0.7567 + 1.2808i | w104 | 01101000 | −0.7567 − 1.2808i |
| w41 | 0010100 | −1.0161 + 0.7012i | w105 | 01101001 | −1.0161 − 0.7012i |
| w42 | 0010101 | −0.9757 + 0.0702i | w106 | 01101010 | −0.9757 − 0.0702i |
| w43 | 0010101 | −0.9739 + 0.5345i | w107 | 01101011 | −0.9739 − 0.5345i |
| w44 | 0010110 | −0.8952 + 1.0953i | w108 | 01101100 | −0.8952 − 1.0953i |
| w45 | 0010110 | −0.9646 + 0.8865i | w109 | 01101101 | −0.9646 − 0.8865i |
| w46 | 0010111 | −1.0091 + 0.2141i | w110 | 01101110 | −1.0091 − 0.2141i |
| w47 | 0010111 | −1.0164 + 0.3745i | w111 | 01101111 | −1.0164 − 0.3745i |
| w48 | 0011000 | −0.3350 + 1.4701i | w112 | 01110000 | −0.3350 − 1.4701i |
| w49 | 0011000 | −0.3446 + 0.6254i | w113 | 01110001 | −0.3446 − 0.6254i |
| w50 | 0011001 | −0.3664 + 0.0666i | w114 | 01110010 | −0.3664 − 0.0666i |
| w51 | 0011001 | −0.3586 + 0.4775i | w115 | 01110011 | −0.3586 − 0.4775i |
| w52 | 0011010 | −0.2713 + 0.9300i | w116 | 01110100 | −0.2713 − 0.9300i |
| w53 | 0011010 | −0.3149 + 0.7791i | w117 | 01110101 | −0.3149 − 0.7791i |
| w54 | 0011011 | −0.3666 + 0.2005i | w118 | 01110110 | −0.3666 − 0.2005i |
| w55 | 0011011 | −0.3649 + 0.3365i | w119 | 01110111 | −0.3649 − 0.3365i |
| w56 | 0011100 | −0.1095 + 1.4559i | w120 | 01111000 | −0.1095 − 1.4559i |
| w57 | 0011100 | −0.2067 + 0.6018i | w121 | 01111001 | −0.2067 − 0.6018i |
| w58 | 0011101 | −0.2200+ 0.0642i | w122 | 01111010 | −0.2200 − 0.0642i |
| w59 | 0011101 | −0.2160 + 0.4587i | w123 | 01111011 | −0.2160 − 0.4587i |
| w60 | 0011110 | −0.0910 + 0.9104i | w124 | 01111100 | −0.0910 − 0.9104i |
| w61 | 0011110 | −0.1761 + 0.7590i | w125 | 01111101 | −0.1761 − 0.7590i |
| w62 | 0011111 | −0.2199 + 0.1932i | w126 | 01111110 | −0.2199 − 0.1932i |
| w63 | 0011111 | −0.2191 + 0.3239i | w127 | 01111111 | −0.2191 − 0.3239i |

| w index | bit label | Constellation point | w index | bit label | Constellation point |
|---|---|---|---|---|---|
| for R = 1/2 (or R = 5/8, 3/4 or 13/16): | | | | | |
| w128 | 10000000 | −1.0382 + 0.8623i | w192 | 11000000 | −1.0382 − 0.8623i |
| w129 | 10000001 | −0.8504 + 0.7217i | w193 | 11000001 | −0.8504 − 0.7217i |
| w130 | 10000010 | −0.8555 + 1.0542i | w194 | 11000010 | −0.8555 − 1.0542i |
| w131 | 10000011 | −0.6961 + 0.8850i | w195 | 11000011 | −0.6961 − 0.8850i |
| w132 | 10000100 | +1.0382 + 0.8623i | w196 | 11000100 | +1.0382 − 0.8623i |
| w133 | 10000101 | +0.8504 + 0.7217i | w197 | 11000101 | +0.8504 − 0.7217i |
| w134 | 10000110 | +0.8555 + 1.0542i | w198 | 11000110 | +0.8555 − 1.0542i |
| w135 | 10000111 | +0.6961 + 0.8850i | w199 | 11000111 | +0.6961 − 0.8850i |
| w136 | 10001000 | −1.1794 + 0.6376i | w200 | 11001000 | −1.1794 − 0.6376i |
| W137 | 10001001 | −0.9638 + 0.5407i | w201 | 11001001 | −0.9638 − 0.5407i |
| w138 | 10001010 | −0.6363 + 1.2064i | w202 | 11001010 | −0.6363 − 1.2064i |
| w139 | 10001011 | −0.5229 + 1.0037i | w203 | 11001011 | −0.5229 − 1.0037i |
| w140 | 10001100 | +1.1794 + 0.6376i | w204 | 11001100 | +1.1794 − 0.6376i |
| w141 | 10001101 | +0.9638 + 0.5407i | w205 | 11001101 | +0.9638 − 0.5407i |
| w142 | 10001110 | +0.6363 + 1.2064i | w206 | 11001110 | +0.6363 − 1.2064i |
| w143 | 10001111 | +0.5229 + 1.0087i | w207 | 11001111 | +0.5229 − 1.0087i |
| w144 | 10010000 | −0.3734 + 0.2560i | w208 | 11010000 | −0.3734 − 0.2560i |
| w145 | 10010001 | −0.4968 + 0.3947i | w209 | 11010001 | −0.4968 − 0.3947i |
| w146 | 10010010 | −0.1938 + 0.3621i | w210 | 11010010 | −0.1938 − 0.3621i |
| w147 | 10010011 | −0.3224 + 0.5236i | w211 | 11010011 | −0.3224 − 0.5236i |
| w148 | 10010100 | +0.3734 + 0.2560i | w212 | 11010100 | +0.3734 − 0.2560i |
| w149 | 10010101 | +0.4968 + 0.3947i | w213 | 11010101 | +0.4968 − 0.3947i |
| w150 | 10010110 | +0.1938 + 0.3621i | w214 | 11010110 | +0.1938 − 0.3621i |
| w151 | 10010111 | +0.3224 + 0.5236i | w215 | 11010111 | +0.3224 − 0.5236i |
| w152 | 10011000 | −0.3799 + 0.2517i | w216 | 11011000 | −0.3799 − 0.2517i |
| w153 | 10011001 | −0.5231 + 0.3644i | w217 | 11011001 | −0.5231 − 0.3644i |
| w154 | 10011010 | −0.1909 + 0.3627i | w218 | 11011010 | −0.1909 − 0.3627i |
| w155 | 10011011 | −0.3016 + 0.5347i | w219 | 11011011 | −0.3016 − 0.5347i |
| w156 | 10011100 | +0.3799 + 0.2517i | w220 | 11011100 | +0.3799 − 0.2517i |
| w157 | 10011101 | +0.5231 + 0.3644i | w221 | 11011101 | +0.5231 − 0.3644i |
| w158 | 10011110 | +0.1909 + 0.3627i | w222 | 11011110 | +0.1909 − 0.3627i |
| w159 | 10011111 | +0.3016 + 0.5347i | w223 | 11011111 | +0.3016 − 0.5347i |
| w160 | 10100000 | −1.3225 + 0.1320i | w224 | 11100000 | −1.3225 − 0.1320i |
| w161 | 10100001 | −1.0854 + 0.1139i | w225 | 11100001 | −1.0854 − 0.1139i |
| w162 | 10100010 | −0.1322 + 1.3631i | w226 | 11100010 | −0.1322 − 1.3631i |
| w163 | 10100011 | −0.1124 + 1.1327i | w227 | 11100011 | −0.1124 − 1.1327i |
| w164 | 10100100 | +1.3222 + 0.1320i | w228 | 11100100 | +1.3222 − 0.1320i |
| w165 | 10100101 | +1.0854 + 0.1139i | w229 | 11100101 | +1.0854 − 0.1139i |
| w166 | 10100110 | +0.1322 + 1.3631i | w230 | 11100110 | +0.1322 − 1.3631i |
| w167 | 10100111 | +0.1124 + 1.1327i | w231 | 11100111 | +0.1124 − 1.1327i |
| w168 | 10101000 | −1.2742 + 0.3922i | w232 | 11101000 | −1.2742 − 0.3922i |
| w169 | 10101001 | −1.0441 + 0.3296i | w233 | 11101001 | −1.0441 − 0.3296i |
| w170 | 10101010 | −0.3929 + 1.3102i | w234 | 11101010 | −0.3929 − 1.3102i |
| w171 | 10101011 | −0.3160 + 1.0913i | w235 | 11101011 | −0.3160 − 1.0913i |
| w172 | 10101100 | +1.2742 + 0.3922i | w236 | 11101100 | +1.2742 − 0.3922i |
| w173 | 10101101 | +1.0441 + 0.3296i | w237 | 11101101 | +1.0441 − 0.3296i |

-continued

| | | A4) 256-QAM NUC | | | |
|---|---|---|---|---|---|
| w174 | 10101110 | +0.3929 + 1.3102i | w238 | 11101110 | +0.3929 − 1.3102i |
| w175 | 10101111 | +0.3160 + 1.0913i | w239 | 11101111 | +0.3160 − 1.0913i |
| w176 | 10110000 | −0.4582 + 0.1123i | w240 | 11110000 | −0.4582 − 0.1123i |
| w177 | 10110001 | −0.6473 + 0.1138i | w241 | 11110001 | −0.6473 − 0.1138i |
| w178 | 10110010 | −0.0928 + 0.3970i | w242 | 11110010 | −0.0928 − 0.3970i |
| w179 | 10110011 | −0.1054 + 0.5979i | w243 | 11110011 | −0.1054 − 0.5979i |
| w180 | 10110100 | +0.4582 + 0.1123i | w244 | 11110100 | +0.4582 − 0.1123i |
| w181 | 10110101 | +0.6473 + 0.1138i | w245 | 11110101 | +0.6473 − 0.1138i |
| w182 | 10110110 | +0.0928 + 0.3970i | w246 | 11110110 | +0.0928 − 0.3970i |
| w183 | 10110111 | +0.1054 + 0.5979i | w247 | 11110111 | +0.1054 − 0.5979i |
| w184 | 10111000 | −0.4545 + 0.1251i | w248 | 11111000 | −0.4545 − 0.1251i |
| w185 | 10111001 | −0.6339 + 0.1702i | w249 | 11111001 | −0.6339 − 0.1702i |
| w186 | 10111010 | −0.0937 + 0.3973i | w250 | 11111010 | −0.0937 − 0.3973i |
| w187 | 10111011 | −0.1230 + 0.5949i | w251 | 11111011 | −0.1230 − 0.5949i |
| w188 | 10111100 | +0.4545 + 0.1251i | w252 | 11111100 | +0.4545 − 0.1251i |
| w189 | 10111101 | +0.6339 + 0.1702i | w253 | 11111101 | +0.6339 − 0.1702i |
| w190 | 10111110 | +0.0937 + 0.3973i | w254 | 11111110 | +0.0937 − 0.3973i |
| w191 | 10111111 | +0.1230 + 0.5949i | w255 | 11111111 | +0.1230 − 0.5949i |
| | | for R = 5/8 (or R = 1/2, 3/4 or 13/16): | | | |
| w128 | 10000000 | −1.0508 + 0.8392i | w192 | 11000000 | −1.1844 + 0.6172i |
| w129 | 10000001 | −0.3516 + 0.3079i | w193 | 11000001 | −0.3812 + 0.2673i |
| w130 | 10000010 | −0.8852 + 0.7128i | w194 | 11000010 | −0.9957 + 0.5259i |
| w131 | 10000011 | −0.4734 + 0.4145i | w195 | 11000011 | −0.5340 + 0.3230i |
| w132 | 10000100 | −1.3158 + 0.1269i | w196 | 11000100 | −1.2728 + 0.3773i |
| w133 | 10000101 | −0.4512 + 0.0729i | w197 | 11000101 | −0.4434 + 0.1145i |
| w134 | 10000110 | −1.1073 + 0.1093i | w198 | 11000110 | −1.0701 + 0.3230i |
| w135 | 10000111 | −0.6187 + 0.0756i | w199 | 11000111 | −0.5946 + 0.1815i |
| w136 | 10001000 | +1.0508 + 0.8392i | w200 | 11001000 | +1.1844 + 0.6172i |
| W37 | 10001001 | +0.3516 + 0.3079i | w201 | 11001001 | +0.3812 + 0.2673i |
| w138 | 10001010 | +0.8852 + 0.7128i | w202 | 11001010 | +0.9957 + 0.5259i |
| w139 | 10001011 | +0.4734 + 0.4145i | w203 | 11001011 | +0.5340 + 0.3230i |
| w140 | 10001100 | +1.3158 + 0.1269i | w204 | 11001100 | +1.2728 + 0.3773i |
| w141 | 10001101 | +0.4512 + 0.0729i | w205 | 11001101 | +0.4434 + 0.1145i |
| w142 | 10001110 | +1.1073 + 0.1093i | w206 | 11001110 | +1.0701 + 0.3230i |
| w143 | 10001111 | +0.6187 + 0.0756i | w207 | 11001111 | +0.5946 + 0.1815i |
| w144 | 10010000 | −1.0508 − 0.8392i | w208 | 11010000 | −1.1844 − 0.6172i |
| w145 | 10010001 | −0.3516 − 0.3079i | w209 | 11010001 | −0.3812 − 0.2673i |
| w146 | 10010010 | −0.8852 − 0.7128i | w210 | 11010010 | −0.9957 − 0.5259i |
| w147 | 10010011 | −0.4734 − 0.4145i | w211 | 11010011 | −0.5340 − 0.3230i |
| w148 | 10010100 | −1.3158 − 0.1269i | w212 | 11010100 | −1.2728 − 0.3773i |
| w149 | 10010101 | −0.4512 − 0.0729i | w213 | 11010101 | −0.4434 − 0.1145i |
| w150 | 10010110 | −1.1073 − 0.1093i | w214 | 11010110 | −1.0701 − 0.3230i |
| w151 | 10010111 | −0.6187 − 0.0756i | w215 | 11010111 | −0.5946 − 0.1815i |
| w152 | 10011000 | +1.0508 − 0.8392i | w216 | 11011000 | +1.1844 − 0.6172i |
| w153 | 10011001 | +0.3516 − 0.3079i | w217 | 11011001 | +0.3812 − 0.2673i |
| w154 | 10011010 | +0.8852 − 0.7128i | w218 | 11011010 | +0.9957 − 0.5259i |
| w155 | 10011011 | +0.4734 − 0.4145i | w219 | 11011011 | +0.5340 − 0.3230i |
| w156 | 10011100 | +1.3158 − 0.1269i | w220 | 11011100 | +1.2728 − 0.3773i |
| w157 | 10011101 | +0.4512 − 0.0729i | w221 | 11011101 | +0.4434 − 0.1145i |
| w158 | 10011110 | +1.1073 − 0.1093i | w222 | 11011110 | +1.0701 − 0.3230i |
| w159 | 10011111 | +0.6187 − 0.0756i | w223 | 11011111 | +0.5946 − 0.1815i |
| w160 | 10100000 | −0.8734 + 1.0335i | w224 | 11100000 | −0.6562 + 1.1905i |
| w161 | 10100001 | −0.2145 + 0.4159i | w225 | 11100001 | −0.1928 + 0.4287i |
| w162 | 10100010 | −0.7384 + 0.8777i | w226 | 11100010 | −0.5570 + 1.0128i |
| w163 | 10100011 | −0.3752 + 0.5265i | w227 | 11100011 | −0.3076 + 0.5885i |
| w164 | 10100100 | −0.1381 + 1.3596i | w228 | 11100100 | −0.4076 + 1.3018i |
| w165 | 10100101 | −0.0693 + 0.5212i | w229 | 11100101 | −0.0896 + 0.5118i |
| w166 | 10100110 | −0.1180 + 1.1596i | w230 | 11100110 | −0.3468 + 1.1091i |
| w167 | 10100111 | −0.0788 + 0.6933i | w231 | 11100111 | −0.1793 + 0.6649i |
| w168 | 10101000 | +0.8734 + 1.0235i | w232 | 11101000 | +0.6562 + 1.1905i |
| w169 | 10101001 | +0.2145 + 0.4159i | w233 | 11101001 | +0.1928 + 0.4287i |
| w170 | 10101010 | +0.7384 + 0.8777i | w234 | 11101010 | +0.5570 + 1.0128i |
| w171 | 10101011 | +0.3752 + 0.5265i | w235 | 11101011 | +0.3076 + 0.5885i |
| w172 | 10101100 | +0.1381 + 1.3596i | w236 | 11101100 | +0.4076 + 1.3018i |
| w173 | 10101101 | +0.0693 + 0.5212i | w237 | 11101101 | +0.0896 + 0.5118i |
| w174 | 10101110 | +0.1180 + 1.1596i | w238 | 11101110 | +0.3468 + 1.1091i |
| w175 | 10101111 | +0.0788 + 0.6933i | w239 | 11101111 | +0.1793 + 0.6649i |
| w176 | 10110000 | −0.8734 − 1.0835i | w240 | 11110000 | −0.6562 − 1.1905i |
| w177 | 10110001 | −0.2145 − 0.4159i | w241 | 11110001 | −0.1928 − 0.4287i |
| w178 | 10110010 | −0.7384 − 0.8777i | w242 | 11110010 | −0.5570 − 1.0128i |
| w179 | 10110011 | −0.3752 − 0.5265i | w243 | 11110011 | −0.3076 − 0.5885i |
| w180 | 10110100 | −0.1381 − 1.3596i | w244 | 11110100 | −0.4076 − 1.3018i |
| w181 | 10110101 | −0.0693 − 0.5212i | w245 | 11110101 | −0.0896 − 0.5118i |
| w182 | 10110110 | −0.1180 − 1.1596i | w246 | 11110110 | −0.3468 − 1.1091i |
| w183 | 10110111 | −0.0788 − 0.6933i | w247 | 11110111 | −0.1793 − 0.6649i |
| w184 | 10111000 | +0.8734 − 1.0335i | w248 | 11111000 | +0.6562 − 1.1905i |

A4) 256-QAM NUC

| | | | | | |
|---|---|---|---|---|---|
| w185 | 10111001 | +0.2145 − 0.4159i | w249 | 11111001 | +0.1928 − 0.4287i |
| w186 | 10111010 | +0.7384 − 0.8777i | w250 | 11111010 | +0.5570 − 1.0128i |
| w187 | 10111011 | +0.3752 − 0.5265i | w251 | 11111011 | +0.3076 − 0.5885i |
| w188 | 10111100 | +0.1381 − 1.3596i | w252 | 11111100 | +0.4076 − 1.3018i |
| w189 | 10111101 | +0.0693 − 0.5212i | w253 | 11111101 | +0.0896 − 0.5118i |
| w190 | 10111110 | +0.1180 − 1.1596i | w254 | 11111110 | +0.3468 − 1.1091i |
| w191 | 10111111 | +0.0788 − 0.6933i | w255 | 11111111 | +0.1793 − 0.6649i | for R = 3/4 (or R = 1/2, 5/8 or 13/16):

| | | | | | |
|---|---|---|---|---|---|
| w128 | 10000000 | −0.5901 + 1.4171i | w192 | 11000000 | −0.8131 + 0.0729i |
| w129 | 10000001 | −0.5901 − 1.4171i | w193 | 11000001 | −0.8131 − 0.0729i |
| w130 | 10000010 | −0.3511 + 1.4584i | w194 | 11000010 | −0.3658 + 0.0625i |
| w131 | 10000011 | −0.3511 − 1.4584i | w195 | 11000011 | −0.3658 − 0.0625i |
| w132 | 10000100 | +0.5901 + 1.4171i | w196 | 11000100 | +0.8131 + 0.0729i |
| w133 | 10000101 | +0.5901 − 1.4171i | w197 | 11000101 | +0.8131 − 0.0729i |
| w134 | 10000110 | +0.3511 + 1.4584i | w198 | 11000110 | +0.3658 + 0.0625i |
| w135 | 10000111 | +0.3511 − 1.4584i | w199 | 11000111 | +0.3658 − 0.0625i |
| w136 | 10001000 | −0.6935 + 1.0466i | w200 | 11001000 | −0.8246 + 0.2158i |
| W137 | 10001001 | −0.6935 − 1.0466i | w201 | 11001001 | −0.8246 − 0.2158i |
| w138 | 10001010 | −0.2608 + 0.9107i | w202 | 11001010 | −0.3642 + 0.1899i |
| w139 | 10001011 | −0.2608 − 0.9107i | w203 | 11001011 | −0.3642 − 0.1899i |
| w140 | 10001100 | +0.6935 + 1.0466i | w204 | 11001100 | +0.8246 + 0.2158i |
| w141 | 10001101 | +0.6935 − 1.0466i | w205 | 11001101 | +0.8246 − 0.2158i |
| w142 | 10001110 | +0.2603 + 0.9107i | w206 | 11001110 | +0.3642 + 0.1899i |
| w143 | 10001111 | +0.2603 − 0.9107i | w207 | 11001111 | +0.3642 − 0.1899i |
| w144 | 10010000 | −0.8039 + 1.2957i | w208 | 11010000 | −0.9801 + 0.0651i |
| w145 | 10010001 | −0.8039 − 1.2957i | w209 | 11010001 | −0.9801 − 0.0651i |
| w146 | 10010010 | −0.1167 + 1.4782i | w210 | 11010010 | −0.2198 + 0.0612i |
| w147 | 10010011 | −0.1167 − 1.4782i | w211 | 11010011 | −0.2198 − 0.0612i |
| w148 | 10010100 | +0.8039 + 1.2957i | w212 | 11010100 | +0.9801 + 0.0651i |
| w149 | 10010101 | +0.8039 − 1.2957i | w213 | 11010101 | +0.9801 − 0.0651i |
| w150 | 10010110 | +0.1167 + 1.4782i | w214 | 11010110 | +0.2198 + 0.0612i |
| w151 | 10010111 | +0.1167 − 1.4782i | w215 | 11010111 | +0.2198 − 0.0612i |
| w152 | 10011000 | −0.8956 + 1.0881i | w216 | 11011000 | −1.0115 + 0.2009i |
| w153 | 10011001 | −0.8956 − 1.0881i | w217 | 11011001 | −1.0115 − 0.2009i |
| w154 | 10011010 | −0.0882 + 0.8981i | w218 | 11011010 | −0.2192 + 0.1815i |
| w155 | 10011011 | −0.0882 − 0.8981i | w219 | 11011011 | −0.2192 − 0.1815i |
| w156 | 10011100 | +0.8956 + 1.0881i | w220 | 11011100 | +1.0115 + 0.2009i |
| w157 | 10011101 | +0.8956 − 1.0881i | w221 | 11011101 | +1.0115 − 0.2009i |
| w158 | 10011110 | +0.0882 + 0.8981i | w222 | 11011110 | +0.2192 + 0.1815i |
| w159 | 10011111 | +0.0882 − 0.8981i | w223 | 11011111 | +0.2192 − 0.1815i |
| w160 | 10100000 | −0.8022 + 0.6879i | w224 | 11100000 | −0.8086 + 0.5185i |
| w161 | 10100001 | −0.8022 − 0.6879i | w225 | 11100001 | −0.8086 − 0.5185i |
| w162 | 10100010 | −0.3274 + 0.6045i | w226 | 11100010 | −0.3499 + 0.4571i |
| w163 | 10100011 | −0.3274 − 0.6045i | w227 | 11100011 | −0.3499 − 0.4571i |
| w164 | 10100100 | +0.8022 + 0.6879i | w228 | 11100100 | +0.8086 + 0.5185i |
| w165 | 10100101 | +0.8022 − 0.6879i | w229 | 11100101 | +0.8086 − 0.5185i |
| w166 | 10100110 | +0.3274 + 0.6045i | w230 | 11100110 | +0.3499 + 0.4571i |
| w167 | 10100111 | +0.3274 − 0.6045i | w231 | 11100111 | +0.3499 − 0.4571i |
| w168 | 10101000 | −0.7622 + 0.8634i | w232 | 11101000 | −0.8245 + 0.3593i |
| w169 | 10101001 | −0.7622 − 0.8634i | w233 | 11101001 | −0.8245 − 0.3593i |
| w170 | 10101010 | −0.2965 + 0.7629i | w234 | 11101010 | −0.3599 + 0.3216i |
| w171 | 10101001 | −0.2965 − 0.7629i | w235 | 11101011 | −0.3599 − 0.3216i |
| w172 | 10101100 | +0.7622 + 0.8634i | w236 | 11101100 | +0.8245 + 0.3593i |
| w173 | 10101101 | +0.7622 − 0.8634i | w237 | 11101101 | +0.8245 − 0.3593i |
| w174 | 10101110 | +0.2965 + 0.7629i | w238 | 11101110 | +0.3599 + 0.3216i |
| w175 | 10101111 | +0.2965 − 0.7629i | w239 | 11101111 | +0.3599 − 0.3216i |
| w176 | 10110000 | −1.0082 + 0.6930i | w240 | 11110000 | −0.9814 + 0.5205i |
| w177 | 10110001 | −1.0082 − 0.6930i | w241 | 11110001 | −0.9814 − 0.5205i |
| w178 | 10110010 | −0.1987 + 0.5742i | w242 | 11110010 | −0.2115 + 0.4337i |
| w179 | 10110011 | −0.1987 − 0.5742i | w243 | 11110011 | −0.2115 − 0.4337i |
| w180 | 10110100 | +1.0082 + 0.6930i | w244 | 11110100 | +0.9814 + 0.5205i |
| w181 | 10110101 | +1.0082 − 0.6930i | w245 | 11110101 | +0.9814 − 0.5205i |
| w182 | 10110110 | +0.1987 + 0.5742i | w246 | 11110110 | +0.2115 + 0.4337i |
| w183 | 10110111 | +0.1987 − 0.5742i | w247 | 11110111 | +0.2115 − 0.4337i |
| w184 | 10111000 | −0.9647 + 0.8849i | w248 | 11111000 | −1.0163 + 0.3615i |
| w185 | 10111001 | −0.9647 − 0.8849i | w249 | 11111001 | −1.0163 − 0.3615i |
| w186 | 10111010 | −0.1564 + 0.7374i | w250 | 11111010 | −0.2167 + 0.3057i |
| w187 | 10111011 | −0.1564 − 0.7374i | w251 | 11111011 | −0.2157 − 0.3057i |
| w188 | 10111100 | +0.9647 + 0.8849i | w252 | 11111100 | +1.0163 + 0.3615i |
| w189 | 10111101 | +0.9647 − 0.8849i | w253 | 11111101 | +1.0163 − 0.3615i |
| w190 | 10111110 | +0.1564 + 0.7374i | w254 | 11111110 | +0.2167 + 0.3057i |
| w191 | 10111111 | +0.1564 − 0.7374i | w255 | 11111111 | +0.2167 − 0.3057i | for R = 13/16 (or R = 1/2, 5/8 or 3/4):

| | | | | | |
|---|---|---|---|---|---|
| w128 | 10000000 | +0.4934 + 1.1976i | w192 | 11000000 | +0.4934 − 1.1976i |
| w129 | 10000001 | +0.6474 + 0.6881i | w193 | 11000001 | +0.6474 − 0.6881i |

| A4) 256-QAM NUC | | | | | |
|---|---|---|---|---|---|
| w130 | 10000010 | +0.6614 + 0.0730i | w194 | 11000010 | +0.6614 − 0.0730i |
| w131 | 10000011 | +0.6545 + 0.5220i | w195 | 11000011 | +0.6545 − 0.5220i |
| w132 | 10000100 | +0.4787 + 1.0113i | w196 | 11000100 | +0.4787 − 1.0113i |
| w133 | 10000101 | +0.6010 + 0.8566i | w197 | 11000101 | +0.6010 − 0.8566i |
| w134 | 10000110 | +0.6676 + 0.2192i | w198 | 11000110 | +0.6676 − 0.2192i |
| w135 | 10000111 | +0.6674 + 0.3672i | w199 | 11000111 | +0.6674 − 0.3672i |
| w136 | 10001000 | +1.1592 + 1.0404i | w200 | 11001000 | +1.1592 − 1.0404i |
| W137 | 10001001 | +1.1898 + 0.5538i | w201 | 11001001 | +1.1898 − 0.5538i |
| w138 | 10001010 | +1.3908 + 0.1102i | w202 | 11001010 | +1.3908 − 0.1102i |
| w139 | 10001011 | +1.4081 + 0.3370i | w203 | 11001011 | +1.4081 − 0.3370i |
| w140 | 10001100 | +1.2410 + 0.8061i | w204 | 11001100 | +1.2410 − 0.8061i |
| w141 | 10001101 | +1.3911 + 0.5975i | w205 | 11001101 | +1.3911 − 0.5975i |
| w142 | 10001110 | +1.1855 + 0.1041i | w206 | 11001110 | +1.1855 − 0.1041i |
| w143 | 10001111 | +1.2043 + 0.3138i | w207 | 11001111 | +1.2043 − 0.3138i |
| w144 | 10010000 | +0.2985 + 1.2655i | w208 | 11010000 | +0.2985 − 1.2655i |
| w145 | 10010001 | +0.4920 + 0.6512i | w209 | 11010001 | +0.4920 − 0.6512i |
| w146 | 10010010 | +0.5130 + 0.0697i | w210 | 11010010 | +0.5130 − 0.0697i |
| w147 | 10010011 | +0.5045 + 0.4981i | w211 | 11010011 | +0.5045 − 0.4981i |
| w148 | 10010100 | +0.2876 + 1.0856i | w212 | 11010100 | +0.2876 − 1.0856i |
| w149 | 10010101 | +0.4556 + 0.8064i | w213 | 11010101 | +0.4556 − 0.8064i |
| w150 | 10010110 | +0.5147 + 0.2097i | w214 | 11010110 | +0.5147 − 0.2097i |
| w151 | 10010111 | +0.5132 + 0.3515i | w215 | 11010111 | +0.5132 − 0.3515i |
| w152 | 10011000 | +0.0980 + 1.2511i | w216 | 11011000 | +0.0980 − 1.2511i |
| w153 | 10011001 | +0.0701 + 0.5794i | w217 | 11011001 | +0.0701 − 0.5794i |
| w154 | 10011010 | +0.0734 + 0.0629i | w218 | 11011010 | +0.0734 − 0.0629i |
| w155 | 10011011 | +0.0724 + 0.4460i | w219 | 11011011 | +0.0724 − 0.4460i |
| w156 | 10011100 | +0.0934 + 1.0735i | w220 | 11011100 | +0.0934 − 1.0735i |
| w157 | 10011101 | +0.0582 + 0.7208i | w221 | 11011101 | +0.0582 − 0.7208i |
| w158 | 10011110 | +0.0734 + 0.1890i | w222 | 11011110 | +0.0734 − 0.1890i |
| w159 | 10011111 | +0.0731 + 0.3164i | w223 | 11011111 | +0.0731 − 0.3164i |
| w160 | 10100000 | +0.5534 + 1.3936i | w224 | 11100000 | +0.5534 − 1.3936i |
| w161 | 10100001 | +0.8188 + 0.7082i | w225 | 11100001 | +0.8188 − 0.7082i |
| w162 | 10100010 | +0.8139 + 0.0752i | w226 | 11100010 | +0.8139 − 0.0752i |
| w163 | 10100011 | +0.8096 + 0.5376i | w227 | 11100011 | +0.8096 − 0.5376i |
| w164 | 10100100 | +0.6787 + 1.0583i | w228 | 11100100 | +0.6787 − 1.0583i |
| w165 | 10100101 | +0.7729 + 0.8860i | w229 | 11100101 | +0.7729 − 0.8860i |
| w166 | 10100110 | +0.8305 + 0.2250i | w230 | 11100110 | +0.8305 − 0.2250i |
| w167 | 10100111 | +0.8315 + 0.3759i | w231 | 11100111 | +0.8315 − 0.3759i |
| w168 | 10101000 | +0.7567 + 1.2808i | w232 | 11101000 | +0.7567 − 1.2808i |
| w169 | 10101001 | +1.0161 + 0.7012i | w233 | 11101001 | +1.0161 − 0.7012i |
| w170 | 10101010 | +0.9757 + 0.0702i | w234 | 11101010 | +0.9757 − 0.0702i |
| w171 | 10101011 | +0.9739 + 0.5345i | w235 | 11101011 | +0.9739 − 0.5345i |
| w172 | 10101100 | +0.8952 + 1.0953i | w236 | 11101100 | +0.8952 − 1.0953i |
| w173 | 10101101 | +0.9646 + 0.8865i | w237 | 11101101 | +0.9646 − 0.8865i |
| w174 | 10101110 | +1.0091 + 0.2141i | w238 | 11101110 | +1.0091 − 0.2141i |
| w175 | 10101111 | +1.0164 + 0.3745i | w239 | 11101111 | +1.0164 − 0.3745i |
| w176 | 10110000 | +0.3350 + 1.4701i | w240 | 11110000 | +0.3350 − 1.4701i |
| w177 | 10110001 | +0.3446 + 0.6254i | w241 | 11110001 | +0.3446 − 0.6254i |
| w178 | 10110010 | +0.3664 + 0.0666i | w242 | 11110010 | +0.3664 − 0.0666i |
| w179 | 10110011 | +0.3586 + 0.4775i | w243 | 11110011 | +0.3586 − 0.4775i |
| w180 | 10110100 | +0.2713 + 0.9300i | w244 | 11110100 | +0.2713 − 0.9300i |
| w181 | 10110101 | +0.3149 + 0.7791i | w245 | 11110101 | +0.3149 − 0.7791i |
| w182 | 10110110 | +0.3666 + 0.2005i | w246 | 11110110 | +0.3666 − 0.2005i |
| w183 | 10110111 | +0.3649 + 0.3365i | w247 | 11110111 | +0.3649 − 0.3365i |
| w184 | 10111000 | +0.1095 + 1.4559i | w248 | 11111000 | +0.1095 − 1.4559i |
| w185 | 10111001 | +0.2067 + 0.6018i | w249 | 11111001 | +0.2067 − 0.6018i |
| w186 | 10111010 | +0.2200 + 0.0642i | w250 | 11111010 | +0.2200 − 0.0642i |
| w187 | 10111011 | +0.2160 + 0.4587i | w251 | 11111011 | +0.2160 − 0.4587i |
| w188 | 10111100 | +0.0910 + 0.9104i | w252 | 11111100 | +0.0910 − 0.9104i |
| w189 | 10111101 | +0.1761 + 0.7590i | w253 | 11111101 | +0.1761 − 0.7590i |
| w190 | 10111110 | +0.2199 + 0.1932i | w254 | 11111110 | +0.2199 − 0.1932i |
| w191 | 10111111 | +0.2191 + 0.3239i | w255 | 11111111 | +0.2191 − 0.3239i |

If SC is used as PHY mode and if M=16, 32, 64, 128 or 256, a non-uniform constellation and bit labeling is used from a group B, the group B comprising constellations as defined in:

sub-group B1 for 16-QAM with M=16 and code rates of 1/2, 5/8 or 3/4, sub-group B2 for 32-QAM with M=32 and code rates of 1/2, 5/8, 3/4 or 13/16, sub-group B3 for 64-QAM with M=64 and code rates of 1/2, 5/8, 3/4 or 13/16, sub-group B4 for 128-QAM with M=128 and code rates of 1/2, 5/8, 3/4 or 13/16, and sub-group B5 for 256-QAM with M=256 and code rates of 1/2, 5/8, 3/4 or 13/16, wherein the constellation points are defined by a constellation position vector $w_0 \ldots w_{M-1}$ and wherein the constellation position vectors of the different constellations are defined as follows:

B) M-QAM non-uniform constellations of group B for single carrier mode as PHY mode:

| | | B1) 16-QAM NUC | | |
|---|---|---|---|---|
| w | bit label | R = 1/2 (MCS = 10) (or R = 5/8, 3/4 or 13/16) | R = 5/8 (MCS = 11) (or R = 1/2, 3/4, or 13/16) | R = 3/4 (MCS = 12) (or R = 5/8, 1/2 or 13/16) |
| w0 | 0000 | +0.4925 + 1.2040i | +0.2173 + 0.4189i | +0.2949 − 0.2949i |
| w1 | 0001 | +0.4925 − 1.2040i | +0.4326 + 1.1445i | +0.9555 − 0.2949i |
| w2 | 0010 | +0.2530 + 0.4936i | −0.2173 + 0.4189i | −0.2949 − 0.2949i |
| w3 | 0011 | +0.2530 − 0.4936i | −0.4326 + 1.1445i | −0.9555 − 0.2949i |
| w4 | 0100 | −0.4925 + 1.2040i | +0.2173 − 0.4189i | +0.2949 − 0.9555i |
| w5 | 0101 | −0.4925 − 1.2040i | +0.4326 − 1.1445i | +0.9555 − 0.9555i |
| w6 | 0110 | −0.2530 + 0.4936i | −0.2173 − 0.4189i | −0.2949 − 0.9555i |
| w7 | 0111 | −0.2530 − 0.4936i | −0.4326 − 1.1445i | −0.9555 − 0.9555i |
| w8 | 1000 | +1.2040 + 0.4925i | +0.6578 + 0.2571i | +0.2949 + 0.2949i |
| w9 | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

| | | B2) 32-QAM NUC | | | |
|---|---|---|---|---|---|
| w/MCS index | bit label | R = 1/2 (or R = 5/8, 3/4 or 13/16) | R = 5/8 (or R = 1/2, 3/4 or 13/16) | R = 3/4 (or R = 1/2, 5/8 or 13/16) | R = 13/16 (or R = 1/2, 5/8 or 3/4) |
| w0 | 00000 | +0.1929 + 0.1744i | +0.2187 + 0.1559i | +0.2113 + 0.1819i | +0.2082 + 0.1996i |
| w1 | 00001 | +0.2283 + 0.5036i | +0.2225 + 0.5103i | +0.6163 + 1.2930i | +0.6964 + 1.2272i |
| w2 | 00010 | +0.6963 + 0.1782i | +0.2187 − 0.1559i | +0.2113 − 0.1819i | +0.2041 + 0.6147i |
| w3 | 00011 | +0.6364 + 0.4437i | +0.2225 − 0.5103i | +0.6163 − 1.2930i | +0.2297 + 1.0778i |
| w4 | 00100 | +0.1929 − 0.1744i | −0.2187 + 0.1559i | +0.6590 + 0.1934i | +0.6409 + 0.2027i |
| w5 | 00101 | +0.2283 − 0.5036i | −0.2225 + 0.5103i | +1.1691 + 0.2524i | +1.1236 + 0.2383i |
| w6 | 00110 | +0.6963 − 0.1782i | −0.2187 − 0.1559i | +0.6590 − 0.1934i | +0.6262 + 0.6234i |
| w7 | 00111 | +0.6364 − 0.4437i | −0.2225 − 0.5103i | +1.1691 − 0.2524i | +1.0921 + 0.7399i |
| w8 | 01000 | +0.3541 + 1.4168i | +0.7211 + 0.1755i | −0.2113 + 0.1819i | +0.2082 − 0.1996i |
| w9 | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1934i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

| | | B3) 64-QAM NUC | | | |
|---|---|---|---|---|---|
| w/MCS index | bit label | R = 1/2 (or R = 5/8, 3/4 or 13/16) | R = 5/8 (or R = 1/2, 3/4 or 13/16) | R = 3/4 (or R = 1/2, 5/8 or 13/16) | R = 13/16 (or R = 1/2, 5/8 or 3/4) |
| w0 | 000000 | +0.4732 + 0.2920i | +0.4730 + 0.3019i | +1.0501 − 0.1676i | +1.0414 − 0.1712i |
| w1 | 000001 | +1.2487 + 0.8348i | −0.4730 + 0.3019i | +1.4380 − 0.2294i | +0.7230 − 0.1517i |
| w2 | 000010 | +0.4732 − 0.2920i | +1.0895 + 0.2172i | +0.1398 − 0.1309i | +1.0997 − 0.5419i |
| w3 | 000011 | +1.2487 − 0.8348i | −1.0895 + 0.2172i | +0.1680 − 1.0338i | +0.7484 − 0.4663i |
| w4 | 000100 | +1.0283 + 0.2071i | +0.1419 + 0.1122i | +1.0725 − 0.5328i | −1.0414 − 0.1712i |
| w5 | 000101 | +0.8760 + 0.5811i | −0.1419 + 0.1122i | +0.0771 − 0.9315i | −0.7230 − 0.1517i |
| w6 | 000110 | +1.0283 − 0.2071i | +0.7863 + 0.1337i | +0.1361 − 0.4023i | −1.0997 − 0.5419i |
| w7 | 000111 | +0.8760 − 0.5811i | −0.7863 + 0.1337i | +0.1373 − 0.7043i | −0.7484 − 0.4663i |
| w8 | 001000 | −0.4732 + 0.2920i | +0.4730 − 0.3019i | +1.0501 + 0.1676i | +1.0414 + 0.1712i |
| w9 | 001001 | −1.2487 + 0.8348i | −0.4730 − 0.3019i | +1.4380 + 0.2294i | +0.7230 + 0.1517i |
| w10 | 001010 | −0.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.5328i | −1.0414 + 0.1712i |
| w13 | 001101 | −0.8760 + 0.5811i | −0.1419 − 0.1122i | +0.0771 + 0.9315i | −0.7230 + 0.1517i |

-continued

B3) 64-QAM NUC

| w/MCS index | bit label | R = 1/2 (or R = 5/8, 3/4 or 13/16) | R = 5/8 (or R = 1/2, 3/4 or 13/16) | R = 3/4 (or R = 1/2, 5/8 or 13/16) | R = 13/16 (or R = 1/2, 5/8 or 3/4) |
|---|---|---|---|---|---|
| w14 | 001110 | −1.0283 − 0.2071i | +0.7863 − 0.1337i | +0.1361 + 0.4023i | −1.0997 + 0.5419i |
| w15 | 001111 | −0.8760 − 0.5811i | −0.7863 − 0.1337i | +0.1373 + 0.7043i | −0.7484 + 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 − 0.1498i | +0.7267 − 0.4592i | −0.1414 − 0.1379i |
| w21 | 010101 | +0.5811 + 0.8760i | −0.3733 − 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1680 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −0.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 − 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −0.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |
| w52 | 110100 | +0.1720 + 0.7004i | +0.2891 + 0.3110i | −0.7267 − 0.4592i | −0.1695 − 1.0298i |
| w53 | 110101 | +0.3741 + 0.6174i | −0.2891 + 0.3110i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6056 − 0.8481i | −0.2326 + 1.3986i | +0.4351 + 0.7394i |
| w60 | 111100 | −0.1720 + 0.7004i | +0.2891 − 0.3110i | −0.7267 + 0.4592i | −0.1695 + 1.0298i |
| w61 | 111101 | −0.3741 + 0.6174i | −0.2891 − 0.3110i | −0.6956 + 0.8095i | −0.2236 + 1.3784i |
| w62 | 111110 | −0.1720 − 0.7004i | +0.4397 − 0.5853i | −0.4198 + 0.4151i | −0.1426 + 0.7102i |
| w63 | 111111 | −0.3741 − 0.6174i | −0.4397 − 0.5853i | −0.4114 + 0.7109i | −0.4351 + 0.7394i |

B4) 128-QAM NUC for R = 1/2 (or R =+ 0 5/8, 3/4 or 13/16):

| w index | bit label | Constellation point | w index | bit label | Constellation point |
|---|---|---|---|---|---|
| w0 | 0000000 | +0.7383 − 1.3947i | w64 | 01000000 | +1.5779 − 0.2230i |
| w1 | 0000000 | +0.2726 − 1.6070i | w65 | 01000001 | +1.2114 − 0.1662i |
| w2 | 0000001 | +0.7383 + 1.3947i | w66 | 01000010 | +1.5779 + 0.2230i |
| w3 | 0000001 | +0.2726 + 1.6070i | w67 | 01000011 | +1.2114 + 0.1662i |
| w4 | 0000010 | −0.7383 − 1.3947i | w68 | 01000100 | −1.5779 − 0.2230i |
| w5 | 0000010 | −0.2726 − 1.6070i | w69 | 01000101 | −1.2114 − 0.1662i |
| w6 | 0000011 | −0.7383 + 1.3947i | w70 | 01000110 | −1.5779 + 0.2230i |
| w7 | 0000011 | −0.2726 + 1.6070i | w71 | 01000111 | −1.2114 + 0.1662i |
| w8 | 0000100 | +1.0680 − 1.0753i | w72 | 01001000 | +1.4915 − 0.6927i |
| w9 | 0000100 | +1.0389 − 0.7336i | w73 | 01001001 | +1.1447 − 0.4719i |
| w10 | 0000101 | +1.0680 + 1.0753i | w74 | 01001010 | +1.4915 + 0.6927i |
| w11 | 0000101 | +1.0389 + 0.7336i | w75 | 01001011 | +1.1447 + 0.4719i |
| w12 | 0000110 | −1.0680 − 1.0753i | w76 | 01001100 | −1.4915 − 0.6927i |
| w13 | 0000110 | −1.0389 − 0.7336i | w77 | 01001101 | −1.1447 − 0.4719i |
| w14 | 0000111 | −1.0680 + 1.0753i | w78 | 01001110 | −1.4915 + 0.6927i |
| w15 | 0000111 | −1.0389 + 0.7336i | w79 | 01001111 | −1.1447 + 0.4719i |
| w16 | 0001000 | +0.5286 − 1.0997i | w80 | 01010000 | +0.7620 − 0.1121i |
| w17 | 0001000 | +0.1915 − 1.2689i | w81 | 01010001 | +0.9103 − 0.1272i |
| w18 | 0001001 | +0.5286 + 1.0997i | w82 | 01010010 | +0.7620 + 0.1121i |
| w19 | 0001001 | +0.1915 + 1.2689i | w83 | 01010011 | +0.9103 + 0.1272i |
| w20 | 0001010 | −0.5286 − 1.0997i | w84 | 01010100 | −0.7620 − 0.1121i |
| w21 | 0001010 | −0.1915 − 1.2689i | w85 | 01010101 | −0.9103 − 0.1272i |
| w22 | 0001011 | −0.5286 + 1.0997i | w86 | 01010110 | −0.7620 + 0.1121i |
| w23 | 0001011 | −0.1915 + 1.2689i | w87 | 01010111 | −0.9103 + 0.1272i |
| w24 | 0001100 | +0.6878 − 0.8578i | w88 | 01011000 | +0.7359 − 0.3230i |

B4) 128-QAM NUC

| w index | bit label | Constellation point | w index | bit label | Constellation point | w index | bit label | Constellation point | w index | bit label | Constellation point |
|---|---|---|---|---|---|---|---|---|---|---|---|
| w25 | 0001100 | +0.7725 − 0.6723i | w89 | 01011001 | +0.8236 − 0.3936i | w33 | 0010000 | +0.1121 + 0.6749i | w97 | 01100001 | +0.1121 − 0.6749i |
| w26 | 0001101 | +0.6878 + 0.8578i | w90 | 01011010 | +0.7359 + 0.3230i | w34 | 0010001 | −1.1837 + 0.8001i | w98 | 01100010 | −1.1837 − 0.8001i |
| w27 | 0001101 | +0.7725 + 0.6723i | w91 | 01011011 | +0.8236 + 0.3936i | w35 | 0010001 | −0.1121 + 0.6749i | w99 | 01100011 | −0.1121 − 0.6749i |
| w28 | 0001110 | −0.6878 − 0.8578i | w92 | 01011100 | −0.7359 − 0.3230i | w36 | 0010010 | +0.9008 + 0.6972i | w100 | 01100100 | +0.9008 − 0.6972i |
| w29 | 0001110 | −0.7725 − 0.6723i | w93 | 01011101 | −0.8236 − 0.3936i | w37 | 0010010 | +0.1179 + 0.8955i | w101 | 01100101 | +0.1179 − 0.8955i |
| w30 | 0001111 | −0.6878 + 0.8578i | w94 | 01011110 | −0.7359 + 0.3230i | w38 | 0010011 | −0.9008 + 0.6972i | w102 | 01100110 | −0.9008 − 0.6972i |
| w31 | 0001111 | −0.7725 + 0.6723i | w95 | 01011111 | −0.8236 + 0.3936i | w39 | 0010011 | −0.1179 + 0.8955i | w103 | 01100111 | −0.1179 − 0.8955i |
| w32 | 0010000 | +0.1315 − 0.7332i | w96 | 01100000 | +0.1461 − 0.1146i | w40 | 0010100 | +1.4855 + 0.1793i | w104 | 01101000 | +1.4855 − 0.1793i |
| w33 | 0010000 | +0.1038 − 0.7670i | w97 | 01100001 | +0.1573 − 0.1142i | w41 | 0010100 | +0.1933 + 1.4991i | w105 | 01101001 | +0.1933 − 1.4991i |
| w34 | 0010001 | +0.1315 + 0.7332i | w98 | 01100010 | +0.1461 + 0.1146i | w42 | 0010101 | −1.4855 + 0.1793i | w106 | 01101010 | −1.4855 − 0.1793i |
| w35 | 0010001 | +0.1038 + 0.7670i | w99 | 01100011 | +0.1573 + 0.1142i | w43 | 0010101 | −0.1933 + 1.4991i | w107 | 01101011 | −0.1933 − 1.4991i |
| w36 | 0010010 | −0.1315 − 0.7332i | w100 | 01100100 | −0.1461 − 0.1146i | w44 | 0010110 | +1.5681 + 0.5636i | w108 | 01101100 | +1.5681 − 0.5636i |
| w37 | 0010010 | −0.1038 − 0.7670i | w101 | 01100101 | −0.1573 − 0.1142i | w45 | 0010110 | +0.1440 + 1.1691i | w109 | 01101101 | +0.1440 − 1.1691i |
| w38 | 0010011 | −0.1315 + 0.7332i | w102 | 01100110 | −0.1461 + 0.1146i | w46 | 0010111 | −1.5681 + 0.5636i | w110 | 01101110 | −1.5681 − 0.5636i |
| w39 | 0010011 | −0.1038 + 0.7670i | w103 | 01100111 | −0.1573 + 0.1142i | w47 | 0010111 | −0.1440 + 1.1691i | w111 | 01101111 | −0.1440 − 1.1691i |
| w40 | 0010100 | +0.1647 − 0.5388i | w104 | 01101000 | +0.1535 − 0.3082i | w48 | 0011000 | +0.5354 + 0.6351i | w112 | 01110000 | +0.5354 − 0.6351i |
| w41 | 0010100 | +0.1629 − 0.5296i | w105 | 01101001 | +0.1629 − 0.3084i | w49 | 0011000 | +0.3342 + 0.6628i | w113 | 01110001 | +0.3342 − 0.6628i |
| w42 | 0010101 | +0.1647 + 0.5388i | w106 | 01101010 | +0.1535 + 0.3082i | w50 | 0011001 | −0.5354 + 0.6351i | w114 | 01110010 | −0.5354 − 0.6351i |
| w43 | 0010101 | +0.1629 + 0.5296i | w107 | 01101011 | +0.1629 + 0.3084i | w51 | 0011001 | −0.3342 + 0.6628i | w115 | 01110011 | −0.3342 − 0.6628i |
| w44 | 0010110 | −0.1647 − 0.5388i | w108 | 01101100 | −0.1535 − 0.3082i | w52 | 0011010 | +0.6549 + 0.7546i | w116 | 01110100 | +0.6549 − 0.7546i |
| w45 | 0010110 | −0.1629 − 0.5296i | w109 | 01101101 | −0.1629 − 0.3084i | w53 | 0011010 | +0.3585 + 0.8699i | w117 | 01110101 | +0.3585 − 0.8699i |
| w46 | 0010111 | −0.1647 + 0.5388i | w110 | 01101110 | −0.1535 + 0.3082i | w54 | 0011011 | −0.6549 + 0.7546i | w118 | 01110110 | −0.6549 − 0.7546i |
| w47 | 0010111 | −0.1629 + 0.5296i | w111 | 01101111 | −0.1629 + 0.3084i | w55 | 0011011 | −0.3585 + 0.8699i | w119 | 01110111 | −0.3585 − 0.8699i |
| w48 | 0011000 | +0.3255 − 0.9067i | w112 | 01110000 | +0.4774 − 0.1074i | w56 | 0011100 | +0.9727 + 1.2109i | w120 | 01111000 | +0.9727 − 1.2109i |
| w49 | 0011000 | +0.1588 − 1.0122i | w113 | 01110001 | +0.4323 − 0.1096i | w57 | 0011100 | +0.5835 + 1.4250i | w121 | 01111001 | +0.5835 − 1.4250i |
| w50 | 0011001 | +0.3255 + 0.9067i | w114 | 01110010 | +0.4774 + 0.1074i | w58 | 0011101 | −0.9727 + 1.2109i | w122 | 01111010 | −0.9727 − 1.2109i |
| w51 | 0011001 | +0.1588 + 1.0122i | w115 | 01110011 | +0.4323 + 0.1096i | w59 | 0011101 | −0.5835 + 1.4250i | w123 | 01111011 | −0.5835 − 1.4250i |
| w52 | 0011010 | −0.3255 − 0.9067i | w116 | 01110100 | −0.4774 − 0.1074i | w60 | 0011110 | +0.7102 + 1.0171i | w124 | 01111100 | +0.7102 − 1.0171i |
| w53 | 0011010 | −0.1588 − 1.0122i | w117 | 01110101 | −0.4323 − 0.1096i | w61 | 0011110 | +0.4344 + 1.1140i | w125 | 01111101 | +0.4344 − 1.1140i |
| w54 | 0011011 | −0.3255 + 0.9067i | w118 | 01110110 | −0.4774 + 0.1074i | w62 | 0011111 | −0.7102 + 1.0171i | w126 | 01111110 | −0.7102 − 1.0171i |
| w55 | 0011011 | −0.1588 + 1.0122i | w119 | 01110111 | −0.4323 + 0.1096i | w63 | 0011111 | −0.4344 + 1.1140i | w127 | 01111111 | −0.4344 − 1.1140i |
| w56 | 0011100 | +0.4535 − 0.6452i | w120 | 01111000 | +0.4853 − 0.3237i | | | | | | |
| w57 | 0011100 | +0.4645 − 0.5898i | w121 | 01111001 | +0.4637 − 0.3425i | | | R = 3/4 (or R = 1/2, 5/8 or 13/16): | | | |
| w58 | 0011101 | +0.4535 + 0.6452i | w122 | 01111010 | +0.4853 + 0.3237i | | | | | | |
| w59 | 0011101 | +0.4645 + 0.5898i | w123 | 01111011 | +0.4637 + 0.3425i | w0 | 0000000 | +1.0837 + 0.3878i | w64 | 01000000 | +1.0605 + 0.1271i |
| w60 | 0011110 | −0.4535 − 0.6452i | w124 | 01111100 | −0.4853 − 0.3237i | w1 | 0000000 | +0.5568 + 0.5351i | w65 | 01000001 | +0.5216 + 0.0747i |
| w61 | 0011110 | −0.4645 − 0.5898i | w125 | 01111101 | −0.4637 − 0.3425i | w2 | 0000001 | +1.0837 − 0.3878i | w66 | 01000010 | +1.0605 − 0.1271i |
| w62 | 0011111 | −0.4535 + 0.6452i | w126 | 01111110 | −0.4853 + 0.3237i | w3 | 0000001 | +0.5568 − 0.5351i | w67 | 01000011 | +0.5216 − 0.0747i |
| w63 | 0011111 | −0.4645 + 0.5898i | w127 | 01111111 | −0.4637 + 0.3425i | w4 | 0000010 | +0.8372 + 0.4015i | w68 | 01000100 | +0.8209 + 0.1292i |
| | | for R = 5/8, (or R = 1/2, 3/4 or 13/16) | | | | w5 | 0000010 | +0.5992 + 0.3732i | w69 | 01000101 | +0.6018 + 0.1929i |
| | | | | | | w6 | 0000011 | +0.8372 − 0.4015i | w70 | 01000110 | +0.8209 − 0.1292i |
| w0 | 0000000 | +1.1438 + 0.4323i | w64 | 01000000 | +1.1438 − 0.4323i | w7 | 0000011 | +0.5992 − 0.3732i | w71 | 01000111 | +0.6018 − 0.1929i |
| w1 | 0000000 | +0.1045 + 0.4578i | w65 | 01000001 | +0.1045 − 0.4578i | w8 | 0000100 | +1.1795 + 0.6737i | w72 | 01001000 | +1.3525 + 0.1471i |
| w2 | 0000001 | −1.1438 + 0.4323i | w66 | 01000010 | −1.1438 − 0.4323i | w9 | 0000100 | +0.5823 + 0.7120i | w73 | 01001001 | +1.0702 + 1.0357i |
| w3 | 0000001 | −0.1045 + 0.4578i | w67 | 01000011 | −0.1045 − 0.4578i | w10 | 0000101 | +1.1795 − 0.6737i | w74 | 01001010 | +1.3525 − 0.1471i |
| w4 | 0000010 | +0.9006 + 0.4173i | w68 | 01000100 | +0.9006 − 0.4173i | w11 | 0000101 | +0.5823 − 0.7120i | w75 | 01001011 | +1.0702 − 1.0357i |
| w5 | 0000010 | +0.1067 + 0.3515i | w69 | 01000101 | +0.1067 − 0.3515i | w12 | 0000110 | +0.8934 + 0.6718i | w76 | 01001100 | +1.4799 + 0.4422i |
| w6 | 0000011 | −0.9006 + 0.4173i | w70 | 01000110 | −0.9006 − 0.4173i | w13 | 0000110 | +0.7091 + 0.8942i | w77 | 01001101 | +0.7653 + 1.1720i |
| w7 | 0000011 | −0.1067 + 0.3515i | w71 | 01000111 | −0.1067 − 0.3515i | w14 | 0000111 | +0.8934 − 0.6718i | w78 | 01001110 | +1.4799 − 0.4422i |
| w8 | 0000100 | +1.1598 + 0.1437i | w72 | 01001000 | +1.1598 − 0.1437i | w15 | 0000111 | +0.7091 − 0.8942i | w79 | 01001111 | +0.7653 − 1.1720i |
| w9 | 0000100 | +0.1075 + 0.0988i | w73 | 01001001 | +0.1075 − 0.0988i | w16 | 0001000 | +0.1125 + 0.5652i | w80 | 01010000 | +0.1054 + 0.0790i |
| w10 | 0000101 | −1.1598 + 0.1437i | w74 | 01001010 | −1.1598 − 0.1437i | w17 | 0001000 | +0.3356 + 0.5485i | w81 | 01010001 | +0.3169 + 0.0841i |
| w11 | 0000101 | −0.1075 + 0.0988i | w75 | 01001011 | −0.1075 − 0.0988i | w18 | 0001001 | +0.1125 − 0.5652i | w82 | 01010010 | +0.1054 − 0.0790i |
| w12 | 0000110 | +0.9102 + 0.1324i | w76 | 01001100 | +0.9102 − 0.1324i | w19 | 0001001 | +0.3356 − 0.5485i | w83 | 01010011 | +0.3169 − 0.0841i |
| w13 | 0000110 | +0.1136 + 0.1402i | w77 | 01001101 | +0.1136 − 0.1402i | w20 | 0001010 | +0.1063 + 0.3959i | w84 | 01010100 | +0.1042 + 0.2345i |
| w14 | 0000111 | −0.9102 + 0.1324i | w78 | 01001110 | −0.9102 − 0.1324i | w21 | 0001010 | +0.3354 + 0.3801i | w85 | 01010101 | +0.3223 + 0.2346i |
| w15 | 0000111 | −0.1336 + 0.1402i | w79 | 01001111 | −0.1336 − 0.1402i | w22 | 0001011 | +0.1063 − 0.3959i | w86 | 01010110 | +0.1042 − 0.2345i |
| w16 | 0001000 | +0.5578 + 0.4216i | w80 | 01010000 | +0.5578 − 0.4216i | w23 | 0001011 | +0.3354 − 0.3801i | w87 | 01010111 | +0.3223 − 0.2346i |
| w17 | 0001000 | +0.3411 + 0.4189i | w81 | 01010001 | +0.3411 − 0.4189i | w24 | 0001100 | +0.1174 + 0.7565i | w88 | 01011000 | +0.1687 + 1.4929i |
| w18 | 0001001 | −0.5578 + 0.4216i | w82 | 01010010 | −0.5578 − 0.4216i | w25 | 0001100 | +0.3498 + 0.7450i | w89 | 01011001 | +0.5173 + 1.4708i |
| w19 | 0001001 | −0.3411 + 0.4189i | w83 | 01010011 | −0.3411 − 0.4189i | w26 | 0001101 | +0.1174 − 0.7565i | w90 | 01011010 | +0.1687 − 1.4929i |
| w20 | 0001010 | +0.6797 + 0.3850i | w84 | 01010100 | +0.6797 − 0.3850i | w27 | 0001101 | +0.3498 − 0.7450i | w91 | 01011011 | +0.5173 − 1.4708i |
| w21 | 0001010 | +0.3088 + 0.3456i | w85 | 01010101 | +0.3088 − 0.3456i | w28 | 0001110 | +0.1285 + 0.9672i | w92 | 01011100 | +0.1455 + 1.2047i |
| w22 | 0001011 | −0.6797 + 0.3850i | w86 | 01010110 | −0.6797 − 0.3850i | w29 | 0001110 | +0.3973 + 0.9520i | w93 | 01011101 | +0.4442 + 1.1814i |
| w23 | 0001011 | −0.3088 + 0.3456i | w87 | 01010111 | −0.3088 − 0.3456i | w30 | 0001111 | +0.1285 − 0.9672i | w94 | 01011110 | +0.1455 − 1.2047i |
| w24 | 0001100 | +0.5755 + 0.1222i | w88 | 01011000 | +0.5755 − 0.1222i | w31 | 0001111 | +0.3973 − 0.9520i | w95 | 01011111 | +0.4442 − 1.1814i |
| w25 | 0001100 | +0.3700 + 0.1151i | w89 | 01011001 | +0.3700 − 0.1151i | w32 | 0010000 | −1.0837 + 0.3878i | w96 | 01100000 | −1.0605 + 0.1271i |
| w26 | 0001101 | −0.5755 + 0.1222i | w90 | 01011010 | −0.5755 − 0.1222i | w33 | 0010000 | −0.5568 + 0.5351i | w97 | 01100001 | −0.5216 + 0.0747i |
| w27 | 0001101 | −0.3700 + 0.1151i | w91 | 01011011 | −0.3700 − 0.1151i | w34 | 0010001 | −1.0837 − 0.3878i | w98 | 01100010 | −1.0605 − 0.1271i |
| w28 | 0001110 | +0.6787 + 0.1401i | w92 | 01011100 | +0.6787 − 0.1401i | w35 | 0010001 | −0.5568 − 0.5351i | w99 | 01100011 | −0.5216 − 0.0747i |
| w29 | 0001110 | +0.3294 + 0.1448i | w93 | 01011101 | +0.3294 − 0.1448i | w36 | 0010010 | −0.8372 + 0.4015i | w100 | 01100100 | −0.8209 + 0.1292i |
| w30 | 0001111 | −0.6787 + 0.1401i | w94 | 01011110 | −0.6787 − 0.1401i | w37 | 0010010 | −0.5992 + 0.3732i | w101 | 01100101 | −0.6018 + 0.1929i |
| w31 | 0001111 | −0.3294 + 0.1448i | w95 | 01011111 | −0.3294 − 0.1448i | w38 | 0010011 | −0.8372 − 0.4015i | w102 | 01100110 | −0.8209 − 0.1292i |
| w32 | 0010000 | +1.1837 + 0.8001i | w96 | 01100000 | +1.1837 − 0.8001i | w39 | 0010011 | −0.5992 − 0.3732i | w103 | 01100111 | −0.6018 − 0.1929i |
| | | | | | | w40 | 0010100 | −1.1795 + 0.6737i | w104 | 01101000 | −1.3525 + 0.1471i |

B4) 128-QAM NUC

| w index | bit label | Constellation point | w index | bit label | Constellation point |
|---|---|---|---|---|---|
| w41 | 0010100 | −0.5823 + 0.7120i | w105 | 01101001 | −1.0702 + 1.0357i |
| w42 | 0010101 | −1.1795 − 0.6737i | w106 | 01101010 | −1.3525 − 0.1471i |
| w43 | 0010101 | −0.5823 − 0.7120i | w107 | 01101011 | −1.0702 − 1.0357i |
| w44 | 0010110 | −0.8934 + 0.6718i | w108 | 01101100 | −1.4799 + 0.4422i |
| w45 | 0010110 | −0.7091 + 0.8942i | w109 | 01101101 | −0.7653 + 1.1720i |
| w46 | 0010111 | −0.8934 − 0.6718i | w110 | 01101110 | −1.4799 − 0.4422i |
| w47 | 0010111 | −0.7091 − 0.8942i | w111 | 01101111 | −0.7653 − 1.1720i |
| w48 | 0011000 | −0.1125 + 0.5652i | w112 | 01110000 | −0.1054 + 0.0790i |
| w49 | 0011000 | −0.3356 + 0.5485i | w113 | 01110001 | −0.3169 + 0.0841i |
| w50 | 0011001 | −0.1125 − 0.5652i | w114 | 01110010 | −0.1054 − 0.0790i |
| w51 | 0011001 | −0.3356 − 0.5485i | w115 | 01110011 | −0.3169 − 0.0841i |
| w52 | 0011010 | −0.1063 + 0.3959i | w116 | 01110100 | −0.1042 + 0.2345i |
| w53 | 0011010 | −0.3354 + 0.3801i | w117 | 01110101 | −0.3223 + 0.2346i |
| w54 | 0011011 | −0.1063 − 0.3959i | w118 | 01110110 | −0.1042 − 0.2345i |
| w55 | 0011011 | −0.3354 − 0.3801i | w119 | 01110111 | −0.3223 − 0.2346i |
| w56 | 0011100 | −0.1174 + 0.7565i | w120 | 01111000 | −0.1687 + 1.4929i |
| w57 | 0011100 | −0.3498 + 0.7450i | w121 | 01111001 | −0.5173 + 1.4708i |
| w58 | 0011101 | −0.1174 − 0.7565i | w122 | 01111010 | −0.1687 − 1.4929i |
| w59 | 0011101 | −0.3498 − 0.7450i | w123 | 01111011 | −0.5173 − 1.4708i |
| w60 | 0011110 | −0.1285 + 0.9672i | w124 | 01111100 | −0.1455 + 1.2047i |
| w61 | 0011110 | −0.3973 + 0.9520i | w125 | 01111101 | −0.4442 + 1.1814i |
| w62 | 0011111 | −0.1285 − 0.9672i | w126 | 01111110 | −0.1455 − 1.2047i |
| w63 | 0011111 | −0.3973 − 0.9520i | w127 | 01111111 | −0.4442 − 1.1814i | for R = 13/16 (or R = 1/2, 5/8 or 3/4):

| w index | bit label | Constellation point | w index | bit label | Constellation point |
|---|---|---|---|---|---|
| w0 | 0000000 | +1.0422 + 0.3376i | w64 | 01000000 | +1.1154 + 0.5839i |
| w1 | 0000000 | −1.0422 + 0.3376i | w65 | 01000001 | −1.1154 + 0.5839i |
| w2 | 0000001 | +1.0422 − 0.3376i | w66 | 01000010 | +1.1154 − 0.5839i |
| w3 | 0000001 | −1.0422 − 0.3376i | w67 | 01000011 | −1.1154 − 0.5839i |
| w4 | 0000010 | +0.1125 + 0.6269i | w68 | 01000100 | +0.1155 + 0.8217i |
| w5 | 0000010 | −0.1125 + 0.6269i | w69 | 01000101 | −0.1155 + 0.8217i |
| w6 | 0000011 | +0.1125 − 0.6269i | w70 | 01000110 | +0.1155 − 0.8217i |
| w7 | 0000011 | −0.1125 − 0.6269i | w71 | 01000111 | −0.1155 − 0.8217i |
| w8 | 0000100 | +1.0010 + 0.1105i | w72 | 01001000 | +1.2844 + 0.1345i |
| w9 | 0000100 | −1.0010 + 0.1105i | w73 | 01001001 | −1.2844 + 0.1345i |
| w10 | 0000101 | +1.0010 − 0.1105i | w74 | 01001010 | +1.2844 − 0.1345i |
| w11 | 0000101 | −1.0010 − 0.1105i | w75 | 01001011 | −1.2844 − 0.1345i |
| w12 | 0000110 | +0.0978 + 0.0913i | w76 | 01001100 | +0.1646 + 1.5274i |
| w13 | 0000110 | −0.0978 + 0.0913i | w77 | 01001101 | −0.1646 + 1.5274i |
| w14 | 0000111 | +0.0978 − 0.0913i | w78 | 01001110 | +0.1646 − 1.5274i |
| w15 | 0000111 | −0.0978 − 0.0913i | w79 | 01001111 | −0.1646 − 1.5274i |
| w16 | 0001000 | +0.7966 + 0.3496i | w80 | 01010000 | +0.8563 + 0.5705i |
| w17 | 0001000 | −0.7966 + 0.3496i | w81 | 01010001 | −0.8563 + 0.5705i |
| w18 | 0001001 | +0.7966 − 0.3496i | w82 | 01010010 | +0.8563 − 0.5705i |
| w19 | 0001001 | −0.7966 − 0.3496i | w83 | 01010011 | −0.8563 − 0.5705i |
| w20 | 0001010 | +0.1109 + 0.4454i | w84 | 01010100 | +0.1239 + 1.0311i |
| w21 | 0001010 | −0.1109 + 0.4454i | w85 | 01010101 | −0.1239 + 1.0311i |
| w22 | 0001011 | +0.1109 − 0.4454i | w86 | 01010110 | +0.1239 − 1.0311i |
| w23 | 0001011 | −0.1109 − 0.4454i | w87 | 01010111 | −0.1239 − 1.0311i |
| w24 | 0001100 | +0.7613 + 0.1187i | w88 | 01011000 | +1.4001 + 0.4092i |
| w25 | 0001100 | −0.7613 + 0.1187i | w89 | 01011001 | −1.4001 + 0.4092i |
| w26 | 0001101 | +0.7613 − 0.1187i | w90 | 01011010 | +1.4001 − 0.4092i |
| w27 | 0001101 | −0.7613 − 0.1187i | w91 | 01011011 | −1.4001 − 0.4092i |
| w28 | 0001110 | +0.1038 + 0.2705i | w92 | 01011100 | +0.1345 + 1.2611i |
| w29 | 0001110 | −0.1038 + 0.2705i | w93 | 01011101 | −0.1345 + 1.2611i |
| w30 | 0001111 | +0.1038 − 0.2705i | w94 | 01011110 | +0.1345 − 1.2611i |
| w31 | 0001111 | −0.1038 − 0.2705i | w95 | 01011111 | −0.1345 − 1.2611i |
| w32 | 0010000 | +0.5556 + 0.6306i | w96 | 01100000 | +0.5970 + 0.8482i |
| w33 | 0010000 | −0.5556 + 0.6306i | w97 | 01100001 | −0.5970 + 0.8482i |
| w34 | 0010001 | +0.5556 − 0.6306i | w98 | 01100010 | +0.5970 − 0.8482i |
| w35 | 0010001 | −0.5556 − 0.6306i | w99 | 01100011 | −0.5970 − 0.8482i |
| w36 | 0010010 | +0.3351 + 0.6308i | w100 | 01100100 | +0.3510 + 0.8405i |
| w37 | 0010010 | −0.3351 + 0.6308i | w101 | 01100101 | −0.3510 + 0.8405i |
| w38 | 0010011 | +0.3351 − 0.6308i | w102 | 01100110 | +0.3510 − 0.8405i |
| w39 | 0010011 | −0.3351 − 0.6308i | w103 | 01100111 | −0.3510 − 0.8405i |
| w40 | 0010100 | +0.4942 + 0.0780i | w104 | 01101000 | +1.1670 + 0.8997i |
| w41 | 0010100 | −0.4942 + 0.0780i | w105 | 01101001 | −1.1670 + 0.8997i |
| w42 | 0010101 | +0.4942 − 0.0780i | w106 | 01101010 | +1.1670 − 0.8997i |
| w43 | 0010101 | −0.4942 − 0.0780i | w107 | 01101011 | −1.1670 − 0.8997i |
| w44 | 0010110 | +0.2935 + 0.0906i | w108 | 01101100 | +0.4543 + 1.3933i |
| w45 | 0010110 | −0.2935 + 0.0906i | w109 | 01101101 | −0.4543 + 1.3933i |
| w46 | 0010111 | +0.2935 − 0.0906i | w110 | 01101110 | +0.4543 − 1.3933i |
| w47 | 0010111 | −0.2935 − 0.0906i | w111 | 01101111 | −0.4543 − 1.3933i |
| w48 | 0011000 | +0.5761 + 0.4286i | w112 | 01110000 | +0.8378 + 0.8041i |
| w49 | 0011000 | −0.5761 + 0.4286i | w113 | 01110001 | −0.8378 + 0.8041i |
| w50 | 0011001 | +0.5761 − 0.4286i | w114 | 01110010 | +0.8378 − 0.8041i |
| w51 | 0011001 | −0.5761 − 0.4286i | w115 | 01110011 | −0.8378 − 0.8041i |
| w52 | 0011010 | +0.3383 + 0.4404i | w116 | 01110100 | +0.3850 + 1.0724i |
| w53 | 0011010 | −0.3383 + 0.4404i | w117 | 01110101 | −0.3850 + 1.0724i |
| w54 | 0011011 | +0.3383 − 0.4404i | w118 | 01110110 | +0.3850 − 1.0724i |
| w55 | 0011011 | −0.3383 − 0.4404i | w119 | 01110111 | −0.3850 − 1.0724i |
| w56 | 0011100 | +0.5456 + 0.2367i | w120 | 01111000 | +0.9031 + 1.0698i |
| w57 | 0011100 | −0.5456 + 0.2367i | w121 | 01111001 | −0.9031 + 1.0698i |
| w58 | 0011101 | +0.5456 − 0.2367i | w122 | 01111010 | +0.9031 − 1.0698i |
| w59 | 0011101 | −0.5456 − 0.2367i | w123 | 01111011 | −0.9031 − 1.0698i |
| w60 | 0011110 | +0.3172 + 0.2666i | w124 | 01111100 | +0.6436 + 1.1770i |
| w61 | 0011110 | −0.3172 + 0.2666i | w125 | 01111101 | −0.6436 + 1.1770i |
| w62 | 0011111 | +0.3172 − 0.2666i | w126 | 01111110 | +0.6436 − 1.1770i |
| w63 | 0011111 | −0.3172 − 0.2666i | w127 | 01111111 | −0.6436 − 1.1770i |

B5) 256-QAM NUC

| w index | bit label | Constellation point | w index | bit label | Constellation point |
|---|---|---|---|---|---| for R = 1/2 (or R = 5/8, 3/4 or 13/16):

| w index | bit label | Constellation point | w index | bit label | Constellation point |
|---|---|---|---|---|---|
| w0 | 0000000 | −1.2901 + 1.0495i | w64 | 01000000 | −1.0382 + 0.8623i |
| w1 | 0000000 | −1.6350 + 0.1593i | w65 | 01000001 | −1.3225 + 0.1320i |
| w2 | 0000001 | −0.2844 + 0.1296i | w66 | 01000010 | −0.3734 + 0.2560i |
| w3 | 0000001 | −0.3237 + 0.0849i | w67 | 01000011 | −0.4582 + 0.1123i |
| w4 | 0000010 | −1.4625 + 0.7740i | w68 | 01000100 | −1.1794 + 0.6376i |
| w5 | 0000010 | −1.5776 + 0.4735i | w69 | 01000101 | −1.2742 + 0.3922i |
| w6 | 0000011 | −0.2853 + 0.1309i | w70 | 01000110 | −0.3799 + 0.2517i |
| w7 | 0000011 | −0.3228 + 0.0867i | w71 | 01000111 | −0.4545 + 0.1251i |
| w8 | 0000100 | +1.2901 + 1.0495i | w72 | 01001000 | +1.0382 + 0.8623i |
| w9 | 0000100 | +1.6350 + 0.1593i | w73 | 01001001 | +1.3225 + 0.1320i |
| w10 | 0000101 | +0.2844 + 0.1296i | w74 | 01001010 | +0.3734 + 0.2560i |
| w11 | 0000101 | +0.3237 + 0.0849i | w75 | 01001011 | +0.4582 + 0.1123i |
| w12 | 0000110 | +1.4625 + 0.7740i | w76 | 01001100 | +1.1794 + 0.6376i |
| w13 | 0000110 | +1.5776 + 0.4735i | w77 | 01001101 | +1.2742 + 0.3922i |
| w14 | 0000111 | +0.2853 + 0.1309i | w78 | 01001110 | +0.3799 + 0.2517i |
| w15 | 0000111 | +0.3228 + 0.0867i | w79 | 01001111 | +0.4545 + 0.1251i |
| w16 | 0001000 | −0.7273 + 0.6160i | w80 | 01010000 | −0.8504 + 0.7217i |
| w17 | 0001000 | −0.9430 + 0.1100i | w81 | 01010001 | −1.0854 + 0.1139i |
| w18 | 0001001 | −0.5902 + 0.4857i | w82 | 01010010 | −0.4868 + 0.3947i |

B5) 256-QAM NUC

| | | | | | |
|---|---|---|---|---|---|
| w19 | 0001001 | −0.7502 + 0.1138i | w83 | 01010011 | −0.6473 + 0.1138i |
| w20 | 0001010 | −0.8177 + 0.4841i | w84 | 01010100 | −0.9638 + 0.5407i |
| w21 | 0001010 | −0.9069 + 0.2829i | w85 | 01010101 | −1.0441 + 0.3296i |
| w22 | 0001011 | −0.6355 + 0.4185i | w86 | 01010110 | −0.5231 + 0.3644i |
| w23 | 0001011 | −0.7325 + 0.2088i | w87 | 01010111 | −0.6339 + 0.1702i |
| w24 | 0001100 | +0.7273 + 0.6160i | w88 | 01011000 | +0.8504 + 0.7217i |
| w25 | 0001100 | +0.9430 + 0.1100i | w89 | 01011001 | +1.0854 + 0.1139i |
| w26 | 0001101 | +0.5902 + 0.4857i | w90 | 01011010 | +0.4968 + 0.3947i |
| w27 | 0001101 | +0.7502 + 0.1138i | w91 | 01011011 | +0.6473 + 0.1138i |
| w28 | 0001110 | +0.8177 + 0.4841i | w92 | 01011100 | +0.9638 + 0.5407i |
| w29 | 0001110 | +0.9069 + 0.2829i | w93 | 01011101 | +1.0441 + 0.3296i |
| w30 | 0001111 | +0.6355 + 0.4185i | w94 | 01011110 | +0.5231 + 0.3644i |
| w31 | 0001111 | +0.7325 + 0.2068i | w95 | 01011111 | +0.6339 + 0.1702i |
| w32 | 0010000 | −1.0646 + 1.2876i | w96 | 01100000 | −0.8555 + 1.0542i |
| w33 | 0010000 | −0.1658 + 1.6747i | w97 | 01100001 | −0.1322 + 1.3631i |
| w34 | 0010001 | −0.1053 + 0.1494i | w98 | 01100010 | −0.1938 + 0.3621i |
| w35 | 0010001 | −0.0872 + 0.1390i | w99 | 01100011 | −0.0928 + 0.3970i |
| w36 | 0010010 | −0.7949 + 1.4772i | w100 | 01100100 | −0.6363 + 1.2064i |
| w37 | 0010010 | −0.4907 + 1.6084i | w101 | 01100101 | −0.3929 + 1.3102i |
| w38 | 0010011 | −0.1052 + 0.1495i | w102 | 01100110 | −0.1909 + 0.3627i |
| w39 | 0010011 | −0.0871 + 0.1392i | w103 | 01100111 | −0.0937 + 0.3973i |
| w40 | 0010100 | +1.0646 + 1.2876i | w104 | 01101000 | +0.8555 + 1.0542i |
| w41 | 0010100 | +0.1658 + 1.6747i | w105 | 01101001 | +0.1322 + 1.3631i |
| w42 | 0010101 | +0.1053 + 0.1494i | w106 | 01101010 | +0.1938 + 0.3621i |
| w43 | 0010101 | +0.0872 + 0.1390i | w107 | 01101011 | +0.0928 + 0.3970i |
| w44 | 0010110 | +0.7949 + 1.4772i | w108 | 01101100 | +0.6363 + 1.2064i |
| w45 | 0010110 | +0.4907 + 1.6084i | w109 | 01101101 | +0.3929 + 1.3102i |
| w46 | 0010111 | +0.1052 + 0.1495i | w110 | 01101110 | +0.1909 + 0.3627i |
| w47 | 0010111 | +0.0871 + 0.1392i | w111 | 01101111 | +0.0937 + 0.3973i |
| w48 | 0011000 | −0.5707 + 0.7662i | w112 | 01110000 | −0.6961 + 0.8850i |
| w49 | 0011000 | −0.1088 + 0.9530i | w113 | 01110001 | −0.1124 + 1.1327i |
| w50 | 0011001 | −0.4294 + 0.6363i | w114 | 01110010 | −0.3224 + 0.5236i |
| w51 | 0011001 | −0.1091 + 0.7656i | w115 | 01110011 | −0.1054 + 0.5979i |
| w52 | 0011010 | −0.4490 + 0.8461i | w116 | 01110100 | −0.5229 + 1.0037i |
| w53 | 0011010 | −0.2464 + 0.9270i | w117 | 01110101 | −0.3160 + 1.0913i |
| w54 | 0011011 | −0.3744 + 0.6744i | w118 | 01110110 | −0.3016 + 0.5347i |
| w55 | 0011011 | −0.1699 + 0.7537i | w119 | 01110111 | −0.1230 + 0.5949i |
| w56 | 0011100 | +0.5707 + 0.7662i | w120 | 01111000 | +0.6961 + 0.8850i |
| w57 | 0011100 | +0.1088 + 0.9530i | w121 | 01111001 | +0.1124 + 1.1327i |
| w58 | 0011101 | +0.4294 + 0.6363i | w122 | 01111010 | +0.3224 + 0.5236i |
| w59 | 0011101 | +0.1091 + 0.7656i | w123 | 01111011 | +0.1054 + 0.5979i |
| w60 | 0011110 | +0.4490 + 0.8461i | w124 | 01111100 | +0.5229 + 1.0037i |
| w61 | 0011110 | −0.2464 + 0.9270i | w125 | 01111101 | +0.3160 + 1.0913i |
| w62 | 0011111 | +0.3744 + 0.6744i | w126 | 01111110 | +0.3016 + 0.5347i |
| w63 | 0011111 | +0.1699 + 0.7537i | w127 | 01111111 | +0.1230 + 0.5949i |
| for R = 5/8 (or R = 1/2, 3/4 or 13/16): | | | | | |
| w0 | 0000000 | −1.2639 + 1.0084i | w64 | 01000000 | −0.2459 + 0.2059i |
| w1 | 0000000 | −0.7380 + 0.6059i | w65 | 01000001 | −0.6025 + 0.5077i |
| w2 | 0000001 | −1.0466 + 1.2415i | w66 | 01000010 | −0.0949 + 0.2552i |
| w3 | 0000001 | −0.6190 + 0.7456i | w67 | 01000011 | −0.5005 + 0.6310i |
| w4 | 0000010 | −1.2639 − 1.0084i | w68 | 01000100 | −0.2459 − 0.2059i |
| w5 | 0000010 | −0.7380 − 0.6069i | w69 | 01000101 | −0.6025 − 0.5077i |
| w6 | 0000011 | −1.0466 − 1.2415i | w70 | 01000110 | −0.0949 − 0.2552i |
| w7 | 0000011 | −0.6190 − 0.7456i | w71 | 01000111 | −0.5005 − 0.6310i |
| w8 | 0000100 | −1.4263 + 0.7399i | w72 | 01001000 | −0.2508 + 0.2016i |
| w9 | 0000100 | −0.8292 − 0.4496i | w73 | 01001001 | −0.6756 + 0.3836i |
| w10 | 0000101 | −0.7829 − 1.4275i | w74 | 01001010 | −0.0912 + 0.2556i |
| w11 | 0000101 | −0.4707 − 0.8613i | w75 | 01001011 | −0.3899 + 0.7222i |
| w12 | 0000110 | −1.4263 − 0.7399i | w76 | 01001100 | −0.2508 − 0.2016i |
| w13 | 0000110 | −0.8292 − 0.4496i | w77 | 01001101 | −0.6756 − 0.3836i |
| w14 | 0000111 | −0.7829 − 1.4275i | w78 | 01001110 | −0.0912 − 0.2556i |
| w15 | 0000111 | −0.4707 − 0.8613i | w79 | 01001111 | −0.3899 − 0.7222i |
| w16 | 0001000 | −1.0529 + 0.8398i | w80 | 01010000 | −0.3507 + 0.3002i |
| w17 | 0001000 | −0.8839 + 0.7116i | w81 | 01010001 | −0.4734 + 0.4072i |
| w18 | 0001001 | −0.8751 + 1.0349i | w82 | 01010010 | −0.2035 + 0.4115i |
| w19 | 0001001 | −0.7390 + 0.8761i | w83 | 01010011 | −0.3688 + 0.5265i |
| w20 | 0001010 | −1.0529 − 0.8398i | w84 | 01010100 | −0.3507 − 0.3002i |
| w21 | 0001010 | −0.8839 − 0.7116i | w85 | 01010101 | −0.4734 − 0.4072i |
| w22 | 0001011 | −0.8751 − 1.0349i | w86 | 01010110 | −0.2085 − 0.4116i |
| w23 | 0001011 | −0.7380 − 0.8761i | w87 | 01010111 | −0.3688 − 0.5265i |
| w24 | 0001100 | −1.1857 + 0.6167i | w88 | 01011000 | −0.3739 + 0.2698i |
| w25 | 0001100 | −0.9935 + 0.5250i | w89 | 01011001 | −0.5263 + 0.3281i |
| w26 | 0001101 | −0.6570 + 1.1922i | w90 | 01011010 | −0.1890 + 0.4220i |
| w27 | 0001101 | −0.5568 + 1.0106i | w91 | 01011011 | −0.3094 + 0.5791i |
| w28 | 0001110 | −1.1857 − 0.6167i | w92 | 01011100 | −0.3739 − 0.2698i |
| w29 | 0001110 | −0.9935 − 0.5250i | w93 | 01011101 | −0.5263 − 0.3281i |

| B5) 256-QAM NUC | | | | | |
|---|---|---|---|---|---|
| w30 | 0001111 | −0.6570 − 1.1922i | w94 | 01011110 | −0.1890 − 0.4220i |
| w31 | 0001111 | −0.5568 − 1.0106i | w95 | 01011111 | −0.3094 − 0.5791i |
| w32 | 0010000 | +1.2639 + 1.0084i | w96 | 01100000 | +0.2459 + 0.2059i |
| w33 | 0010000 | +0.7380 + 0.6059i | w97 | 01100001 | +0.6025 + 0.5077i |
| w34 | 0010001 | +1.0466 + 1.2415i | w98 | 01100010 | +0.0949 + 0.2552i |
| w35 | 0010001 | +0.6190 + 0.7456i | w99 | 01100011 | +0.5005 + 0.6310i |
| w36 | 0010010 | +1.2639 − 1.0084i | w100 | 01100100 | +0.2459 − 0.2059i |
| w37 | 0010010 | +0.7380 − 0.6059i | w101 | 01100101 | +0.6025 − 0.5077i |
| w38 | 0010011 | +1.0466 − 1.2415i | w102 | 01100110 | +0.0949 − 0.2552i |
| w39 | 0010011 | +0.6190 − 0.7456i | w103 | 01100111 | +0.5005 − 0.6310i |
| w40 | 0010100 | +1.4263 + 0.7399i | w104 | 01101000 | +0.2508 + 0.2016i |
| w41 | 0010100 | +0.8292 + 0.4496i | w105 | 01101001 | +0.6756 + 0.3836i |
| w42 | 0010101 | +0.7829 + 1.4275i | w106 | 01101010 | +0.0912 + 0.2566i |
| w43 | 0010101 | +0.4707 + 0.8613i | w107 | 01101011 | +0.3899 + 0.7222i |
| w44 | 0010110 | +1.4263 − 0.7399i | w108 | 01101100 | +0.2508 − 0.2016i |
| w45 | 0010110 | +0.8292 − 0.4496i | w109 | 01101101 | +0.6756 − 0.3836i |
| w46 | 0010111 | +0.7829 − 1.4275i | w110 | 01101110 | +0.0912 − 0.2556i |
| w47 | 0010111 | +0.4707 − 0.8613i | w111 | 01101111 | +0.3899 − 0.7222i |
| w48 | 0011000 | +1.0529 + 0.8398i | w112 | 01110000 | +0.3507 + 0.3002i |
| w49 | 0011000 | +0.8839 + 0.7116i | w113 | 01110001 | +0.4734 + 0.4072i |
| w50 | 0011001 | +0.8751 + 1.0349i | w114 | 01110010 | +0.2035 + 0.4116i |
| w51 | 0011001 | +0.7380 + 0.8761i | w115 | 01110011 | +0.3688 + 0.5265i |
| w52 | 0011010 | +1.0529 − 0.8398i | w116 | 01110100 | +0.3507 − 0.3002i |
| w53 | 0011010 | +0.8839 − 0.7116i | w117 | 01110101 | +0.4734 − 0.4072i |
| w54 | 0011011 | +0.8751 − 1.0349i | w118 | 01110110 | +0.2085 − 0.4116i |
| w55 | 0011011 | +0.7380 − 0.8761i | w119 | 01110111 | +0.3688 − 0.5265i |
| w56 | 0011100 | +1.1857 + 0.6167i | w120 | 01111000 | +0.3739 + 0.2698i |
| w57 | 0011100 | +0.9935 + 0.5250i | w121 | 01111001 | +0.5263 + 0.3281i |
| w58 | 0011101 | +0.6570 + 1.1922i | w122 | 01111010 | +0.1890 + 0.4220i |
| w59 | 0011101 | +0.5568 + 1.0106i | w123 | 01111011 | +0.3094 + 0.5791i |
| w60 | 0011110 | +1.1857 − 0.6167i | w124 | 01111100 | +0.3739 − 0.2698i |
| w61 | 0011110 | +0.9935 − 0.5250i | w125 | 01111101 | +0.5263 − 0.6281i |
| w62 | 0011111 | +0.6570 − 1.1922i | w126 | 01111110 | +0.1890 − 0.4220i |
| w63 | 0011111 | +0.5568 − 1.0106i | w127 | 01111111 | +0.3094 − 0.5791i |
| for R = 3/4 (or R = 1/2, 5/8 or 13/16): | | | | | |
| w0 | 0000000 | −0.5207 + 1.2132i | w64 | 01000000 | −0.4992 + 1.0060i |
| w1 | 0000000 | −0.3108 + 1.2359i | w65 | 01000001 | −0.3097 + 1.0437i |
| w2 | 0000001 | −1.1610 + 1.1297i | w66 | 01000010 | −1.2435 + 0.8749i |
| w3 | 0000001 | −0.1051 + 1.2649i | w67 | 01000011 | −0.0961 + 1.0730i |
| w4 | 0000010 | −0.6193 + 0.6523i | w68 | 01000100 | −0.5761 + 0.8259i |
| w5 | 0000010 | −0.4633 + 0.6225i | w69 | 01000101 | −0.4319 + 0.7814i |
| w6 | 0000011 | −1.2194 + 0.5861i | w70 | 01000110 | −1.4344 + 0.6815i |
| w7 | 0000011 | −0.0684 + 0.5460i | w71 | 01000111 | −0.0548 + 0.6842i |
| w8 | 0000100 | +0.5207 + 1.2132i | w72 | 01001000 | +0.4992 + 1.0060i |
| w9 | 0000100 | +0.3108 + 1.2359i | w73 | 01001001 | +0.3097 + 1.0437i |
| w10 | 0000101 | +1.1610 + 1.1297i | w74 | 01001010 | +1.2435 + 0.8749i |
| w11 | 0000101 | +0.1051 + 1.2649i | w75 | 01001011 | +0.0961 + 1.0730i |
| w12 | 0000110 | +0.6193 + 0.6523i | w76 | 01001100 | +0.5761 + 0.8259i |
| w13 | 0000110 | +0.4633 + 0.6225i | w77 | 01001101 | +0.4319 + 0.7814i |
| w14 | 0000111 | +1.2194 + 0.5861i | w78 | 01001110 | +1.4344 + 0.6815i |
| w15 | 0000111 | +0.0684 + 0.5460i | w79 | 01001111 | +0.0548 + 0.6842i |
| w16 | 0001000 | −0.6089 + 1.4273i | w80 | 01010000 | −0.6956 + 1.0381i |
| w17 | 0001000 | −0.3588 + 1.4645i | w81 | 01010001 | −0.2552 + 0.9082i |
| w18 | 0001001 | −0.8292 + 1.2973i | w82 | 01010010 | −0.8938 + 1.0757i |
| w19 | 0001001 | −0.1197 + 1.4960i | w83 | 01010011 | −0.0867 + 0.8997i |
| w20 | 0001010 | −0.7956 + 0.6768i | w84 | 01010100 | −0.7562 + 0.8504i |
| w21 | 0001010 | −0.3209 + 0.5978i | w85 | 01010101 | −0.2908 + 0.7608i |
| w22 | 0001011 | −1.0079 + 0.6851i | w86 | 01010110 | −0.9633 + 0.8762i |
| w23 | 0001011 | −0.1960 + 0.5676i | w87 | 01010111 | −0.1482 + 0.7338i |
| w24 | 0001100 | +0.6089 + 1.4273i | w88 | 01011000 | +0.6956 + 1.0381i |
| w25 | 0001100 | +0.3588 + 1.4645i | w89 | 01011001 | +0.2552 + 0.9082i |
| w26 | 0001101 | +0.8292 + 1.2973i | w90 | 01011010 | +0.8938 + 1.0757i |
| w27 | 0001101 | +0.1197 + 1.4960i | w91 | 01011011 | +0.0867 + 0.8997i |
| w28 | 0001110 | +0.7956 + 0.6768i | w92 | 01011100 | +0.7562 + 0.8504i |
| w29 | 0001110 | +0.3209 + 0.5978i | w93 | 01011101 | +0.2903 + 0.7608i |
| w30 | 0001111 | +1.0079 + 0.6851i | w94 | 01011110 | +0.9633 + 0.8762i |
| w31 | 0001111 | +0.1960 + 0.5676i | w95 | 01011111 | +0.1482 + 0.7338i |
| w32 | 0010000 | −0.5207 − 1.2132i | w96 | 01100000 | −0.4992 − 1.0060i |
| w33 | 0010000 | −0.3103 − 1.2359i | w97 | 01100001 | −0.3097 − 1.0437i |
| w34 | 0010001 | −1.1610 − 1.1297i | w98 | 01100010 | −1.2435 − 0.8749i |
| w35 | 0010001 | −0.1051 − 1.2649i | w99 | 01100011 | −0.0961 − 1.0730i |
| w36 | 0010010 | −0.6193 − 0.6523i | w100 | 01100100 | −0.5761 − 0.8259i |
| w37 | 0010010 | −0.4633 − 0.6225i | w101 | 01100101 | −0.4319 − 0.7814i |
| w38 | 0010011 | −1.2194 − 0.5861i | w102 | 01100110 | −1.4344 − 0.6815i |
| w39 | 0010011 | −0.0684 − 0.5460i | w103 | 01100111 | −0.0548 − 0.6842i |
| w40 | 0010100 | +0.5207 − 1.2132i | w104 | 01101000 | +0.4992 − 1.0060i |

B5) 256-QAM NUC

| | | | | | |
|---|---|---|---|---|---|
| w41 | 0010100 | +0.3103 − 1.2359i | w105 | 01101001 | +0.3097 − 1.0437i |
| w42 | 0010101 | +1.1610 − 1.1297i | w106 | 01101010 | +1.2435 − 0.8749i |
| w43 | 0010101 | +0.1051 − 1.2649i | w107 | 01101011 | +0.0961 − 1.0730i |
| w44 | 0010110 | +0.6193 − 0.6623i | w108 | 01101100 | +0.5761 − 0.8259i |
| w45 | 0010110 | +0.4633 − 0.6225i | w109 | 01101101 | +0.4319 − 0.7814i |
| w46 | 0010111 | +1.2194 − 0.5861i | w110 | 01101110 | +1.4344 − 0.6815i |
| w47 | 0010111 | +0.0684 − 0.5460i | w111 | 01101111 | +0.0548 − 0.6842i |
| w48 | 0011000 | −0.6089 − 1.4273i | w112 | 01110000 | −0.6956 − 1.0381i |
| w49 | 0011000 | −0.3588 − 1.4645i | w113 | 01110001 | −0.2552 − 0.9082i |
| w50 | 0011001 | −0.8292 − 1.2973i | w114 | 01110010 | −0.8938 − 1.0757i |
| w51 | 0011001 | −0.1197 − 1.4960i | w115 | 01110011 | −0.0867 − 0.8997i |
| w52 | 0011010 | −0.7956 − 0.6768i | w116 | 01110100 | −0.7562 − 0.8504i |
| w53 | 0011010 | −0.3209 − 0.5978i | w117 | 01110101 | −0.2903 − 0.7608i |
| w54 | 0011011 | −1.0079 − 0.6851i | w118 | 01110110 | −0.9633 − 0.8762i |
| w55 | 0011011 | −0.1960 − 0.5676i | w119 | 01110111 | −0.1482 − 0.7338i |
| w56 | 0011100 | +0.6089 − 1.4273i | w120 | 01111000 | +0.6956 − 1.0381i |
| w57 | 0011100 | +0.3588 − 1.4645i | w121 | 01111001 | +0.2552 − 0.9082i |
| w58 | 0011101 | +0.8292 − 1.2973i | w122 | 01111010 | +0.8938 − 1.0757i |
| w59 | 0011101 | +0.1197 − 1.4960i | w123 | 01111011 | +0.0867 − 0.8997i |
| w60 | 0011110 | +0.7956 − 0.6768i | w124 | 01111100 | +0.7562 − 0.8504i |
| w61 | 0011110 | +0.3209 − 0.5978i | w125 | 01111101 | +0.2908 − 0.7608i |
| w62 | 0011111 | +1.0079 − 0.6851i | w126 | 01111110 | +0.9633 − 0.8762i |
| w63 | 0011111 | +0.1960 − 0.5676i | w127 | 01111111 | +0.1482 − 0.7338i | for R = 13/16 (or R = 1/2, 5/8 or 3/4):

| | | | | | |
|---|---|---|---|---|---|
| w0 | 0000000 | −0.4976 + 1.2018i | w64 | 01000000 | −0.5648 + 1.4015i |
| w1 | 0000000 | +0.4976 + 1.2018i | w65 | 01000001 | +0.5648 + 1.4015i |
| w2 | 0000001 | −0.4976 − 1.2018i | w66 | 01000010 | −0.5648 − 1.4015i |
| w3 | 0000001 | +0.4976 − 1.2018i | w67 | 01000011 | +0.5648 − 1.4015i |
| w4 | 0000010 | −0.4821 + 1.0103i | w68 | 01000100 | −0.6826 + 1.0558i |
| w5 | 0000010 | +0.4821 + 1.0103i | w69 | 01000101 | +0.6826 + 1.0558i |
| w6 | 0000011 | −0.4821 − 1.0103i | w70 | 01000110 | −0.6826 − 1.0558i |
| w7 | 0000011 | +0.4821 − 1.0103i | w71 | 01000111 | +0.6826 − 1.0558i |
| w8 | 0000100 | −1.1616 + 1.0595i | w72 | 01001000 | −0.7696 + 1.2863i |
| w9 | 0000100 | +1.1616 + 1.0595i | w73 | 01001001 | +0.7696 + 1.2863i |
| w10 | 0000101 | −1.1616 − 1.0595i | w74 | 01001010 | −0.7696 − 1.2863i |
| w11 | 0000101 | +1.1616 − 1.0595i | w75 | 01001011 | +0.7696 − 1.2863i |
| w12 | 0000110 | −1.2384 + 0.8218i | w76 | 01001100 | −0.8965 + 1.0947i |
| w13 | 0000110 | +1.2384 + 0.8218i | w77 | 01001101 | +0.8965 + 1.0947i |
| w14 | 0000111 | −1.2384 − 0.8218i | w78 | 01001110 | −0.8965 − 1.0947i |
| w15 | 0000111 | +1.2384 − 0.8218i | w79 | 01001111 | +0.8965 − 1.0947i |
| w16 | 0001000 | −0.6618 + 0.0721i | w80 | 01010000 | −0.8148 + 0.0743i |
| w17 | 0001000 | +0.6618 + 0.0721i | w81 | 01010001 | +0.8148 + 0.0743i |
| w18 | 0001001 | −0.6618 − 0.0721i | w82 | 01010010 | −0.8148 − 0.0743i |
| w19 | 0001001 | +0.6618 − 0.0721i | w83 | 01010011 | +0.8148 − 0.0743i |
| w20 | 0001010 | −0.6653 + 0.2161i | w84 | 01010100 | −0.8285 + 0.2219i |
| w21 | 0001010 | +0.6653 + 0.2161i | w85 | 01010101 | +0.8285 + 0.2219i |
| w22 | 0001011 | −0.6653 − 0.2161i | w86 | 01010110 | −0.8285 − 0.2219i |
| w23 | 0001011 | +0.6653 − 0.2161i | w87 | 01010111 | +0.8285 − 0.2219i |
| w24 | 0001100 | −1.4070 + 0.1153i | w88 | 01011000 | −0.9784 + 0.0686i |
| w25 | 0001100 | +1.4070 + 0.1153i | w89 | 01011001 | +0.9784 + 0.0686i |
| w26 | 0001101 | −1.4070 − 0.1153i | w90 | 01011010 | −0.9784 − 0.0686i |
| w27 | 0001101 | +1.4070 − 0.1153i | w91 | 01011011 | +0.9784 − 0.0686i |
| w28 | 0001110 | −1.1945 + 0.1045i | w92 | 01011100 | −1.0093 + 0.2102i |
| w29 | 0001110 | +1.1945 + 0.1045i | w93 | 01011101 | +1.0093 + 0.2102i |
| w30 | 0001111 | −1.1945 − 0.1045i | w94 | 01011110 | −1.0093 − 0.2102i |
| w31 | 0001111 | +1.1945 − 0.1045i | w95 | 01011111 | +1.0093 − 0.2102i |
| w32 | 0010000 | −0.2993 + 1.2594i | w96 | 01100000 | −0.3403 + 1.4686i |
| w33 | 0010000 | +0.2993 + 1.2504i | w97 | 01100001 | +0.3403 + 1.4686i |
| w34 | 0010001 | −0.2993 − 1.2594i | w98 | 01100010 | −0.3403 − 1.4686i |
| w35 | 0010001 | +0.2993 − 1.2594i | w99 | 01100011 | +0.3403 − 1.4686i |
| w36 | 0010010 | −0.2996 + 1.0772i | w100 | 01100100 | −0.2690 + 0.9234i |
| w37 | 0010010 | +0.2906 + 1.0772i | w101 | 01100101 | +0.2690 + 0.9234i |
| w38 | 0010011 | −0.2906 − 1.0772i | w102 | 01100110 | −0.2690 − 0.9234i |
| w39 | 0010011 | +0.2906 − 1.0772i | w103 | 01100111 | +0.2690 − 0.9234i |
| w40 | 0010100 | −0.0985 + 1.2520i | w104 | 01101000 | −0.1114 + 1.4628i |
| w41 | 0010100 | +0.0985 + 1.2520i | w105 | 01101001 | +0.1114 + 1.4628i |
| w42 | 0010101 | −0.0985 − 1.2520i | w106 | 01101010 | −0.1114 − 1.4628i |
| w43 | 0010101 | +0.0985 − 1.2520i | w107 | 01101011 | +0.1114 − 1.4628i |
| w44 | 0010110 | −0.0938 + 1.0710i | w108 | 01101100 | −0.0905 + 0.9054i |
| w45 | 0010110 | +0.0938 + 1.0710i | w109 | 01101101 | +0.0905 + 0.9054i |
| w46 | 0010111 | −0.0938 − 1.0710i | w110 | 01101110 | −0.0905 − 0.9054i |
| w47 | 0010111 | +0.0938 − 1.0710i | w111 | 01101111 | +0.0905 − 0.9054i |
| w48 | 0011000 | −0.5134 + 0.0686i | w112 | 01110000 | −0.3668 + 0.0653i |
| w49 | 0011000 | +0.5134 + 0.0686i | w113 | 01110001 | +0.3668 + 0.0653i |
| w50 | 0011001 | −0.5134 − 0.0686i | w114 | 01110010 | −0.3668 − 0.0653i |
| w51 | 0011001 | +0.5134 − 0.0686i | w115 | 01110011 | +0.3668 − 0.0653i |

-continued

| B5) 256-QAM NUC | | | | | |
|---|---|---|---|---|---|
| w52 | 0011010 | −0.5133 + 0.2063i | w116 | 01110100 | −0.3660 + 0.1965i |
| w53 | 0011010 | +0.5133 + 0.2063i | w117 | 01110101 | +0.3660 + 0.1965i |
| w54 | 0011011 | −0.5133 − 0.2063i | w118 | 01110110 | −0.3660 − 0.1965i |
| w55 | 0011011 | +0.5133 − 0.2063i | w119 | 01110111 | +0.3660 − 0.1965i |
| w56 | 0011100 | −0.0735 + 0.0614i | w120 | 01111000 | −0.2204 + 0.0628i |
| w57 | 0011100 | +0.0735 + 0.0614i | w121 | 01111001 | +0.2204 + 0.0628i |
| w58 | 0011101 | −0.0735 − 0.0614i | w122 | 01111010 | −0.2204 − 0.0628i |
| w59 | 0011101 | +0.0735 − 0.0614i | w123 | 01111011 | +0.2204 − 0.0628i |
| w60 | 0011110 | −0.0734 + 0.1846i | w124 | 01111100 | −0.2198 + 0.1888i |
| w61 | 0011110 | +0.0734 + 0.1846i | w125 | 01111101 | +0.2198 + 0.1888i |
| w62 | 0011111 | −0.0734 − 0.1846i | w126 | 01111110 | −0.2198 − 0.1888i |
| w63 | 0011111 | +0.0734 − 0.1846i | w127 | 01111111 | +0.2198 − 0.1888i |

| w index | bit label | Constellation point | w index | bit label | Constellation point |
|---|---|---|---|---|---|
| for R = 1/2 (or R = 5/8, 3/4 or 13/16): | | | | | |
| w128 | 10000000 | −1.2901 − 1.0495i | w192 | 11000000 | −1.0382 − 0.8623i |
| w129 | 10000001 | −1.6350 − 0.1593i | w193 | 11000001 | −1.3225 − 0.1320i |
| w130 | 10000010 | −0.2844 − 0.1296i | w194 | 11000010 | −0.3734 − 0.2560i |
| w131 | 10000011 | −0.3237 − 0.0849i | w195 | 11000011 | −0.4582 − 0.1123i |
| w132 | 10000100 | −1.4625 − 0.7740i | w196 | 11000100 | −1.1794 − 0.6376i |
| w133 | 10000101 | −1.5776 − 0.4735i | w197 | 11000101 | −1.2742 − 0.3922i |
| w134 | 10000110 | −0.2853 − 0.1309i | w198 | 11000110 | −0.3799 − 0.2517i |
| w135 | 10000111 | −0.3228 − 0.0867i | w199 | 11000111 | −0.4545 − 0.1251i |
| w136 | 10001000 | +1.2901 − 1.0495i | w200 | 11001000 | +1.0882 − 0.8623i |
| W137 | 10001001 | +1.6350 − 0.1593i | w201 | 11001001 | +1.3225 − 0.1320i |
| w138 | 10001010 | +0.2844 − 0.1296i | w202 | 11001010 | +0.3734 − 0.2560i |
| w139 | 10001011 | +0.3237 − 0.0849i | w203 | 11001011 | +0.4582 − 0.1123i |
| w140 | 10001100 | +1.4625 − 0.7740i | w204 | 11001100 | +1.1794 − 0.6376i |
| w141 | 10001101 | +1.5776 − 0.4735i | w205 | 11001101 | +1.2742 − 0.3922i |
| w142 | 10001110 | +0.2853 − 0.1309i | w206 | 11001110 | +0.3799 − 0.2517i |
| w143 | 10001111 | +0.3228 − 0.0867i | w207 | 11001111 | +0.4545 − 0.1251i |
| w144 | 10010000 | −0.7273 − 0.6160i | w208 | 11010000 | −0.8504 − 0.7217i |
| w145 | 10010001 | −0.9430 − 0.1100i | w209 | 11010001 | −1.0854 − 0.1139i |
| w146 | 10010010 | −0.5902 − 0.4857i | w210 | 11010010 | −0.4968 − 0.3947i |
| w147 | 10010011 | −0.7502 − 0.1138i | w211 | 11010011 | −0.6473 − 0.1138i |
| w148 | 10010100 | −0.8177 − 0.4841i | w212 | 11010100 | −0.9638 − 0.5407i |
| w149 | 10010101 | −0.9069 − 0.2829i | w213 | 11010101 | −1.0441 − 0.3296i |
| w150 | 10010110 | −0.6355 − 0.4185i | w214 | 11010110 | −0.5231 − 0.3644i |
| w151 | 10010111 | −0.7325 − 0.2088i | w215 | 11010111 | −0.6339 − 0.1702i |
| w152 | 10011000 | +0.7273 − 0.6160i | w216 | 11011000 | +0.8504 − 0.7217i |
| w153 | 10011001 | +0.9430 − 0.1100i | w217 | 11011001 | +1.0854 − 0.1139i |
| w154 | 10011010 | +0.5902 − 0.4857i | w218 | 11011010 | +0.4968 − 0.3947i |
| w155 | 10011011 | +0.7502 − 0.1138i | w219 | 11011011 | +0.6473 − 0.1138i |
| w156 | 10011100 | +0.8177 − 0.4841i | w220 | 11011100 | +0.9638 − 0.5407i |
| w157 | 10011101 | +0.9069 − 0.2829i | w221 | 11011101 | +1.0441 − 0.3296i |
| w158 | 10011110 | +0.6355 − 0.4185i | w222 | 11011110 | +0.5231 − 0.3644i |
| w159 | 10011111 | +0.7325 − 0.2088i | w223 | 11011111 | +0.6339 − 0.1702i |
| w160 | 10100000 | −1.0646 − 1.2876i | w224 | 11100000 | −0.8555 − 1.0542i |
| w161 | 10100001 | −0.1658 − 1.6747i | w225 | 11100001 | −0.1322 − 1.3631i |
| w162 | 10100010 | −0.1053 − 0.1494i | w226 | 11100010 | −0.1938 − 0.3621i |
| w163 | 10100011 | −0.0872 − 0.1390i | w227 | 11100011 | −0.0928 − 0.3970i |
| w164 | 10100100 | −0.7949 − 1.4772i | w228 | 11100100 | −0.6363 − 1.2064i |
| w165 | 10100101 | −0.4907 − 1.6064i | w229 | 11100101 | −0.3929 − 1.3102i |
| w166 | 10100110 | −0.1052 − 0.1495i | w230 | 11100110 | −0.1909 − 0.3627i |
| w167 | 10100111 | −0.0871 − 0.1392i | w231 | 11100111 | −0.0937 − 0.3973i |
| w168 | 10101000 | +1.0646 − 1.2876i | w232 | 11101000 | +0.8555 − 1.0542i |
| w169 | 10101001 | +0.1658 − 1.6747i | w233 | 11101001 | +0.1322 − 1.3631i |
| w170 | 10101010 | +0.1053 − 0.1494i | w234 | 11101010 | +0.1938 − 0.3621i |
| w171 | 10101011 | +0.0872 − 0.1390i | w235 | 11101011 | +0.0928 − 0.3970i |
| w172 | 10101100 | +0.7949 − 1.4772i | w236 | 11101100 | +0.6363 − 1.2064i |
| w173 | 10101101 | −0.4907 − 1.6084i | w237 | 11101101 | +0.3929 − 1.3102i |
| w174 | 10101110 | +0.1052 − 0.1495i | w238 | 11101110 | +0.1909 − 0.3627i |
| w175 | 10101111 | +0.0871 − 0.1392i | w239 | 11101111 | +0.0937 − 0.3973i |
| w176 | 10110000 | −0.5707 − 0.7662i | w240 | 11110000 | −0.6961 − 0.8850i |
| w177 | 10110001 | −0.1088 − 0.9530i | w241 | 11110001 | −0.1124 − 1.1327i |
| w178 | 10110010 | −0.4294 − 0.6363i | w242 | 11110010 | −0.3224 − 0.5236i |
| w179 | 10110011 | −0.1091 − 0.7656i | w243 | 11110011 | −0.1054 − 0.5979i |
| w180 | 10110100 | −0.4490 − 0.8461i | w244 | 11110100 | −0.5229 − 1.0037i |
| w181 | 10110101 | −0.2464 − 0.9270i | w245 | 11110101 | −0.3160 − 1.0913i |
| w182 | 10110110 | −0.3744 − 0.6744i | w246 | 11110110 | −0.3016 − 0.5347i |
| w183 | 10110111 | −0.1699 − 0.7537i | w247 | 11110111 | −0.1230 − 0.5949i |
| w184 | 10111000 | +0.5707 − 0.7662i | w248 | 11111000 | +0.6961 − 0.8850i |
| w185 | 10111001 | +0.1088 − 0.9530i | w249 | 11111001 | +0.1124 − 1.1327i |
| w186 | 10111010 | +0.4294 − 0.6363i | w250 | 11111010 | +0.3224 − 0.5236i |

| B5) 256-QAM NUC | | | | |
|---|---|---|---|---|
| w187 | 10111011 | +0.1091 − 0.7656i | w251 | 11111011 | +0.1054 − 0.5979i |
| w188 | 10111100 | +0.4490 − 0.8461i | w252 | 11111100 | +0.5229 − 1.0037i |
| w189 | 10111101 | +0.2464 − 0.9270i | w253 | 11111101 | +0.3160 − 1.0913i |
| w190 | 10111110 | +0.3744 − 0.6744i | w254 | 11111110 | +0.3016 − 0.5347i |
| w191 | 10111111 | +0.1699 − 0.7537i | w255 | 11111111 | +0.1230 − 0.5949i |
| for R = 5/8 (or R = 1/2, 3/4 or 13/16): | | | | | |
| w128 | 10000000 | −1.5843 + 0.1512i | w192 | 11000000 | −0.2552 + 0.0725i |
| w129 | 10000001 | −0.9275 + 0.0940i | w193 | 11000001 | −0.7681 + 0.0832i |
| w130 | 10000010 | −0.1639 + 1.6237i | w194 | 11000010 | −0.0726 + 0.0865i |
| w131 | 10000011 | −0.1000 + 0.9905i | w195 | 11000011 | −0.0867 + 0.8378i |
| w132 | 10000100 | −1.5843 − 0.1512i | w196 | 11000101 | −0.2552 − 0.0725i |
| w133 | 10000101 | −0.9275 − 0.0940i | w197 | 11000101 | −0.7681 − 0.0832i |
| w134 | 10000110 | −0.1639 − 1.6237i | w198 | 11000110 | −0.0726 − 0.0865i |
| w135 | 10000111 | −0.1000 − 0.9905i | w199 | 11000111 | −0.0867 − 0.8378i |
| w136 | 10001000 | −1.5329 + 0.4508i | w200 | 11001000 | −0.2567 + 0.0753i |
| W137 | 10001001 | −0.8993 + 0.2781i | w201 | 11001001 | −0.7371 + 0.2323i |
| w138 | 10001010 | −0.4843 + 1.5571i | w202 | 11001010 | −0.0722 + 0.0866i |
| w139 | 10001011 | −0.2959 + 0.9454i | w203 | 11001011 | −0.2417 + 0.8000i |
| w140 | 10001100 | −1.5329 − 0.4505i | w204 | 11001100 | −0.2567 − 0.0753i |
| w141 | 10001101 | −0.8933 − 0.2781i | w205 | 11001101 | −0.7371 − 0.2323i |
| w142 | 10001110 | −0.4843 − 1.5571i | w206 | 11001110 | −0.0722 − 0.0866i |
| w143 | 10001111 | −0.2959 − 0.9454i | w207 | 11001111 | −0.2417 − 0.8000i |
| w144 | 10010000 | −1.3147 + 0.1263i | w208 | 11010000 | −0.4495 + 0.0766i |
| w145 | 10010001 | −1.1029 + 0.1084i | w209 | 11010001 | −0.6140 + 0.0811i |
| w146 | 10010010 | −0.1381 + 1.3595i | w210 | 11010010 | −0.0717 + 0.5169i |
| w147 | 10010011 | −0.1179 + 1.1562i | w211 | 11010011 | −0.0837 + 0.6868i |
| w148 | 10010100 | −1.3147 − 0.1263i | w212 | 11010100 | −0.4495 − 0.0766i |
| w149 | 10010101 | −1.1029 − 0.1084i | w213 | 11010101 | −0.6140 − 0.0811i |
| w150 | 10010110 | −0.1381 − 1.3595i | w214 | 11010110 | −0.0717 − 0.5169i |
| w151 | 10010111 | −0.1179 − 1.1562i | w215 | 11010111 | −0.0837 − 0.6868i |
| w152 | 10011000 | −1.2724 + 0.3763i | w216 | 11011000 | −0.4423 + 0.1097i |
| w153 | 10011001 | −1.0662 + 0.3220i | w217 | 11011001 | −0.5925 + 0.1765i |
| w154 | 10011010 | −0.4077 + 1.3024i | w218 | 11011010 | −0.0883 + 0.5092i |
| w155 | 10011011 | −0.3470 + 1.1060i | w219 | 11011011 | −0.1746 + 0.6612i |
| w156 | 10011100 | −1.2724 − 0.3763i | w220 | 11011100 | −0.4423 − 0.1097i |
| w157 | 10011101 | −1.0662 − 0.3220i | w221 | 11011101 | −0.5925 − 0.1765i |
| w158 | 10011110 | −0.4077 − 1.3024i | w222 | 11011110 | −0.0883 − 0.5092i |
| w159 | 10011111 | −0.3470 − 1.1060i | w223 | 11011111 | −0.1746 − 0.6612i |
| w160 | 10100000 | +1.5843 + 0.1512i | w224 | 11100000 | +0.2552 + 0.0725i |
| w161 | 10100001 | +0.9275 + 0.0940i | w225 | 11100001 | +0.7681 + 0.0832i |
| w162 | 10100010 | +0.1639 + 1.6237i | w226 | 11100010 | +0.0726 + 0.0865i |
| w163 | 10100011 | +0.1000 + 0.9905i | w227 | 11100011 | +0.0867 + 0.8378i |
| w164 | 10100100 | +1.5843 − 0.1512i | w228 | 11100100 | +0.2552 − 0.0725i |
| w165 | 10100101 | +0.9275 − 0.0940i | w229 | 11100101 | +0.7681 − 0.0832i |
| w166 | 10100110 | +0.1639 − 1.6237i | w230 | 11100110 | +0.0726 − 0.0865i |
| w167 | 10100111 | +0.1000 − 0.9905i | w231 | 11100111 | +0.0867 − 0.8378i |
| w168 | 10101000 | +1.5329 + 0.4508i | w232 | 11101000 | +0.2567 + 0.0753i |
| w169 | 10101001 | +0.8933 + 0.2781i | w233 | 11101001 | +0.7371 + 0.2323i |
| w170 | 10101010 | +0.4843 + 1.5571i | w234 | 11101010 | +0.0722 + 0.0866i |
| w171 | 10101011 | +0.2959 + 0.9454i | w235 | 11101011 | +0.2417 + 0.8000i |
| w172 | 10101100 | +1.5329 − 0.4508i | w236 | 11101100 | +0.2567 − 0.0753i |
| w173 | 10101101 | +0.8933 − 0.2781i | w237 | 11101101 | +0.7371 − 0.2323i |
| w174 | 10101110 | +0.4843 − 1.5571i | w238 | 11101110 | +0.0722 − 0.0866i |
| w175 | 10101111 | +0.2959 − 0.9454i | w239 | 11101111 | +0.2417 − 0.8000i |
| w176 | 10110000 | +1.3147 + 0.1263i | w240 | 11110000 | +0.4495 + 0.0766i |
| w177 | 10110001 | +1.1029 + 0.1084i | w241 | 11110001 | +0.6140 + 0.0811i |
| w178 | 10110010 | +0.1381 + 1.3595i | w242 | 11110010 | +0.0717 + 0.5169i |
| w179 | 10110011 | +0.1179 + 1.1562i | w243 | 11110011 | +0.0837 + 0.6868i |
| w180 | 10110100 | +1.3147 − 0.1263i | w244 | 11110100 | +0.4495 − 0.0766i |
| w181 | 10110101 | +1.1029 − 0.1084i | w245 | 11110101 | +0.6140 − 0.0811i |
| w182 | 10110110 | +0.1381 − 1.3595i | w246 | 11110110 | +0.0717 − 0.5169i |
| w183 | 10110111 | +0.1179 − 1.1562i | w247 | 11110111 | +0.0837 − 0.6868i |
| w184 | 10111000 | +1.2724 + 0.3763i | w248 | 11111000 | +0.4423 + 0.1097i |
| w185 | 10111001 | +1.0662 + 0.3220i | w249 | 11111001 | +0.5925 + 0.1765i |
| w186 | 10111010 | +0.4077 + 1.3024i | w250 | 11111010 | +0.0883 + 0.5092i |
| w187 | 10111011 | +0.3470 + 1.1060i | w251 | 11111011 | +0.1746 + 0.6612i |
| w188 | 10111100 | +1.2724 − 0.3763i | w252 | 11111100 | +0.4423 − 0.1097i |
| w189 | 10111101 | +1.0662 − 0.3220i | w253 | 11111101 | +0.5925 − 0.1765i |
| w190 | 10111110 | +0.4077 − 1.3024i | w254 | 11111110 | +0.0883 − 0.5092i |
| w191 | 10111111 | +0.3470 − 1.1060i | w255 | 11111111 | +0.1746 − 0.6612i |
| for R = 3/4 (or R = 1/2, 5/8 or 13/16): | | | | | |
| w128 | 10000000 | −0.6538 + 0.0691i | w192 | 11000000 | −0.6518 + 0.2064i |
| w129 | 10000001 | −0.5051 + 0.0654i | w193 | 11000001 | −0.5023 + 0.1969i |
| w130 | 10000010 | −1.4515 + 0.1246i | w194 | 11000010 | −1.2169 + 0.1086i |
| w131 | 10000011 | −0.0720 + 0.0589i | w195 | 11000011 | −0.0716 + 0.1743i |

| B5) 256-QAM NUC | | | | | |
|---|---|---|---|---|---|
| w132 | 10000100 | −0.6396 + 0.4933i | w196 | 11000100 | −0.6490 + 0.3456i |
| w133 | 10000101 | −0.4850 + 0.4726i | w197 | 11000101 | −0.4967 + 0.3308i |
| w134 | 10000110 | −1.4339 + 0.3828i | w198 | 11000110 | −1.2175 + 0.3244i |
| w135 | 10000111 | −0.0708 + 0.4166i | w199 | 11000111 | −0.0713 + 0.2961i |
| w136 | 10001000 | +0.6538 + 0.0691i | w200 | 11001000 | +0.6518 + 0.2064i |
| W137 | 10001001 | +0.5051 + 0.0654i | w201 | 11001001 | +0.5023 + 0.1959i |
| w138 | 10001010 | +1.4515 + 0.1246i | w202 | 11001010 | +1.2169 + 0.1086i |
| w139 | 10001011 | +0.0720 + 0.0589i | w203 | 11001011 | +0.0716 + 0.1743i |
| w140 | 10001100 | +0.6396 + 0.4933i | w204 | 11001100 | +0.6490 + 0.3456i |
| w141 | 10001101 | +0.4850 + 0.4726i | w205 | 11001101 | +0.4967 + 0.3308i |
| w142 | 10001110 | +1.4339 + 0.3828i | w206 | 11001110 | +1.2175 + 0.3244i |
| w143 | 10001111 | +0.0708 + 0.4156i | w207 | 11001111 | +0.0713 + 0.2951i |
| w144 | 10010000 | −0.8080 + 0.0721i | w208 | 11010000 | −0.8177 + 0.2121i |
| w145 | 10010001 | −0.3608 + 0.0619i | w209 | 11010001 | −0.3587 + 0.1857i |
| w146 | 10010010 | −0.9770 + 0.0640i | w210 | 11010010 | −1.0126 + 0.1946i |
| w147 | 10010011 | −0.2162 + 0.0599i | w211 | 11010011 | −0.2150 + 0.1782i |
| w148 | 10010100 | −0.8066 + 0.5082i | w212 | 11010100 | −0.8186 + 0.3517i |
| w149 | 10010101 | −0.3436 + 0.4483i | w213 | 11010101 | −0.3540 + 0.3139i |
| w150 | 10010110 | −0.9839 + 0.5111i | w214 | 11010110 | −1.0159 + 0.3531i |
| w151 | 10010111 | −0.2091 + 0.4280i | w215 | 11010111 | −0.2130 + 0.3012i |
| w152 | 10011000 | +0.8080 + 0.0721i | w216 | 11011000 | +0.8177 + 0.2121i |
| w153 | 10011001 | +0.3603 + 0.0619i | w217 | 11011001 | +0.3587 + 0.1857i |
| w154 | 10011010 | +0.9770 + 0.0640i | w218 | 11011010 | +1.0126 + 0.1946i |
| w155 | 10011011 | +0.2162 + 0.0599i | w219 | 11011011 | +0.2150 + 0.1782i |
| w156 | 10011100 | +0.8066 + 0.5082i | w220 | 11011100 | +0.8186 + 0.3517i |
| w157 | 10011101 | +0.3436 + 0.4483i | w221 | 11011101 | +0.3540 + 0.3139i |
| w158 | 10011110 | +0.9839 + 0.5111i | w222 | 11011110 | +1.0159 + 0.3531i |
| w159 | 10011111 | +0.2091 + 0.4280i | w223 | 11011111 | +0.2130 + 0.3012i |
| w160 | 10100000 | −0.6538 − 0.0691i | w224 | 11100000 | −0.6518 − 0.2064i |
| w161 | 10100001 | −0.5051 − 0.0654i | w225 | 11100001 | −0.5023 − 0.1959i |
| w162 | 10100010 | −1.4515 − 0.1246i | w226 | 11100010 | −1.2169 − 0.1086i |
| w163 | 10100011 | −0.0720 − 0.0589i | w227 | 11100011 | −0.0716 − 0.1743i |
| w164 | 10100100 | −0.6396 − 0.4933i | w228 | 11100100 | −0.6490 − 0.3456i |
| w165 | 10100101 | −0.4850 − 0.4726i | w229 | 11100101 | −0.4967 − 0.3308i |
| w166 | 10100110 | −1.4339 − 0.3828i | w230 | 11100110 | −1.2175 − 0.3244i |
| w167 | 10100111 | −0.0708 − 0.4166i | w231 | 11100111 | −0.0713 − 0.2951i |
| w168 | 10101000 | +0.6538 − 0.0691i | w232 | 11101000 | +0.6518 − 0.2064i |
| w169 | 10101001 | +0.5051 − 0.0654i | w233 | 11101001 | +0.5623 − 0.1959i |
| w170 | 10101010 | +1.4515 − 0.1246i | w234 | 11101010 | +1.2169 − 0.1086i |
| w171 | 10101011 | +0.0720 − 0.0589i | w235 | 11101011 | +0.0716 − 0.1743i |
| w172 | 10101100 | +0.6396 − 0.4933i | w236 | 11101100 | +0.6490 − 0.3456i |
| w173 | 10101101 | +0.4850 − 0.4726i | w237 | 11101101 | +0.4967 − 0.3308i |
| w174 | 10101110 | +1.4339 − 0.3828i | w238 | 11101110 | +1.2175 − 0.3244i |
| w175 | 10101111 | +0.0708 − 0.4166i | w239 | 11101111 | +0.0713 − 0.2951i |
| w176 | 10110000 | −0.8080 − 0.0721i | w240 | 11110000 | −0.8177 − 0.2121i |
| w177 | 10110001 | −0.3608 − 0.0619i | w241 | 11110001 | −0.3587 − 0.1857i |
| w178 | 10110010 | −0.9770 − 0.0640i | w242 | 11110010 | −1.0126 − 0.1946i |
| w179 | 10110011 | −0.2162 − 0.0599i | w243 | 11110011 | −0.2150 − 0.1782i |
| w180 | 10110100 | −0.8066 − 0.5082i | w244 | 11110100 | −0.8486 − 0.3517i |
| w181 | 10110101 | −0.3436 − 0.4483i | w245 | 11110101 | −0.3540 − 0.3139i |
| w182 | 10110110 | −0.9839 − 0.5111i | w246 | 11110110 | −1.0159 − 0.3531i |
| w183 | 10110111 | −0.2091 − 0.4280i | w247 | 11110111 | −0.2130 − 0.3012i |
| w184 | 10111000 | +0.8080 − 0.0721i | w248 | 11111000 | +0.8177 − 0.2121i |
| w185 | 10111001 | +0.3603 − 0.0619i | w249 | 11111001 | +0.3587 − 0.1857i |
| w186 | 10111010 | +0.9770 − 0.0640i | w250 | 11111010 | +1.0126 − 0.1946i |
| w187 | 10111011 | +0.2162 − 0.0599i | w251 | 11111011 | +0.2150 − 0.1782i |
| w188 | 10111100 | +0.8066 − 0.5082i | w252 | 11111100 | +0.8186 − 0.3517i |
| w189 | 10111101 | +0.3436 − 0.4483i | w253 | 11111101 | +0.3540 − 0.3139i |
| w190 | 10111110 | +0.9839 − 0.5111i | w254 | 11111110 | +1.0159 − 0.3531i |
| w191 | 10111111 | +0.2091 − 0.4280i | w255 | 11111111 | +0.2130 − 0.3012i |
| for R = 13/16 (or R = 1/2, 5/8 or 3/4): | | | | | |
| w128 | 10000000 | −0.6404 + 0.6801i | w192 | 11000000 | −0.8128 + 0.7021i |
| w129 | 10000001 | +0.6404 + 0.6801i | w193 | 11000001 | +0.8128 + 0.7021i |
| w130 | 10000010 | −0.6404 − 0.6801i | w194 | 10000010 | −0.8128 − 0.7021i |
| w131 | 10000011 | +0.6404 − 0.6801i | w195 | 11000011 | +0.8128 − 0.7021i |
| w132 | 10000100 | −0.5954 + 0.8500i | w196 | 11000100 | −0.7699 + 0.8797i |
| w133 | 10000101 | +0.5954 + 0.8500i | w197 | 11000101 | +0.7699 + 0.8797i |
| w134 | 10000110 | −0.5954 − 0.8500i | w198 | 11000110 | −0.7699 + 0.8797i |
| w135 | 10000111 | +0.5954 − 0.8500i | w199 | 11000111 | +0.7699 + 0.8797i |
| w136 | 10001000 | −1.1989 + 0.5582i | w200 | 11001000 | −1.0129 + 0.6976i |
| W137 | 10001001 | +1.1989 + 0.5582i | w201 | 11001001 | +1.0129 + 0.6976i |
| w138 | 10001010 | −1.1989 − 0.5582i | w202 | 11001010 | −1.0129 − 0.6976i |
| w139 | 10001011 | +1.1989 + 0.5582i | w203 | 11001011 | +1.0129 − 0.6976i |
| w140 | 10001100 | −1.4012 + 0.6249i | w204 | 11001100 | −0.9657 + 0.8860i |
| w141 | 10001101 | +1.4012 + 0.6249i | w205 | 11001101 | +0.9657 + 0.8660i |
| w142 | 10001110 | −1.4012 − 0.6249i | w206 | 11001110 | −0.9657 − 0.8860i |

B5) 256-QAM NUC

| | | | | | |
|---|---|---|---|---|---|
| w143 | 10001111 | +1.4012 − 0.6249i | w207 | 11001111 | +0.9657 − 0.8860i |
| w144 | 10010000 | −0.6524 + 0.5156i | w208 | 11010000 | −0.8099 + 0.5313i |
| w145 | 10010001 | +0.6524 + 0.5156i | w209 | 11010001 | +0.8099 + 0.5313i |
| w146 | 10010010 | −0.6524 − 0.5156i | w210 | 11010010 | −0.8099 − 0.5313i |
| w147 | 10010011 | +0.6524 − 0.5156i | w211 | 11010011 | +0.8099 − 0.5313i |
| w148 | 10010100 | −0.6640 + 0.3620i | w212 | 11010100 | −0.8291 + 0.3705i |
| w149 | 10010101 | +0.6640 + 0.3620i | w213 | 11010101 | +0.8291 + 0.3705i |
| w150 | 10010110 | −0.6640 − 0.3620i | w214 | 11010110 | −0.8291 − 0.3705i |
| w151 | 10010111 | +0.6640 − 0.3620i | w215 | 11010111 | +0.8291 − 0.3705i |
| w152 | 10011000 | −1.4123 + 0.3539i | w216 | 11011000 | −0.9768 + 0.5294i |
| w153 | 10011001 | +1.4123 + 0.3539i | w217 | 11011001 | +0.9768 + 0.5294i |
| w154 | 10011010 | −1.4123 − 0.3539i | w218 | 11011010 | −0.9768 − 0.5294i |
| w155 | 1011011 | +1.4123 − 0.3539i | w219 | 11011011 | +0.9768 − 0.5294i |
| w156 | 10011100 | −1.2076 + 0.3137i | w220 | 11011100 | −1.0171 + 0.3701i |
| w157 | 10011101 | +1.2076 + 0.3137i | w221 | 11011101 | +1.0171 + 0.3701i |
| w158 | 10011110 | −1.2076 − 0.3137i | w222 | 11011110 | −1.0171 − 0.3701i |
| w159 | 10011111 | +1.2076 − 0.3137i | w223 | 11011111 | +1.0171 − 0.3701i |
| w160 | 10100000 | −0.4846 + 0.6443i | w224 | 11100000 | −0.3381 + 0.6175i |
| w161 | 10100001 | +0.4846 + 0.6443i | w225 | 11100001 | +0.3381 + 0.6175i |
| w162 | 10100010 | −0.4846 − 0.6443i | w226 | 11100010 | −0.3381 − 0.6175i |
| w163 | 10100011 | +0.4846 − 0.6443i | w227 | 11100011 | +0.3381 − 0.6175i |
| w164 | 10100100 | −0.4495 + 0.7999i | w228 | 11100100 | −0.3079 + 0.7726i |
| w165 | 10100101 | +0.4495 + 0.7999i | w229 | 11100101 | +0.3079 + 0.7726i |
| w166 | 10100110 | −0.4495 − 0.7999i | w230 | 11100110 | −0.3079 − 0.7726i |
| w167 | 10100111 | +0.4495 − 0.7999i | w231 | 11100111 | +0.3079 − 0.7726i |
| w168 | 10101000 | −0.0693 + 0.5689i | w232 | 11101000 | −0.2034 + 0.5915i |
| w169 | 10101001 | +0.0693 + 0.5689i | w233 | 11101001 | +0.2034 + 0.5915i |
| w170 | 10101010 | −0.0693 − 0.5689i | w234 | 11101010 | −0.2034 − 0.5915i |
| w171 | 10101011 | +0.0693 − 0.5689i | w235 | 11101011 | +0.2034 − 0.5915i |
| w172 | 10101100 | −0.0563 + 0.7102i | w236 | 11101100 | −0.1695 + 0.7506i |
| w173 | 10101101 | +0.0563 + 0.7102i | w237 | 11101101 | +0.1695 + 0.7506i |
| w174 | 10101110 | −0.0563 − 0.7102i | w238 | 11101110 | −0.1695 − 0.7506i |
| w175 | 10101111 | +0.0563 − 0.7102i | w239 | 11101111 | +0.1695 − 0.7506i |
| w176 | 10110000 | −0.5011 + 0.4924i | w240 | 11110000 | −0.3558 + 0.4698i |
| w177 | 10110001 | +0.5011 + 0.4924i | w241 | 11110001 | +0.3558 + 0.4698i |
| w178 | 10110010 | −0.5011 − 0.4924i | w242 | 11110010 | −0.3558 − 0.4698i |
| w179 | 10110011 | +0.5011 − 0.4924i | w243 | 11110011 | +0.3558 − 0.4698i |
| w180 | 10110100 | −0.5105 + 0.3465i | w244 | 11110100 | −0.3634 + 0.3304i |
| w181 | 10110101 | +0.5105 + 0.3465i | w245 | 11110101 | +0.3634 + 0.3304i |
| w182 | 10110110 | −0.5105 − 0.3465i | w246 | 11110110 | −0.3634 − 0.3304i |
| w183 | 10110111 | +0.5105 − 0.3465i | w247 | 11110111 | +0.3634 − 0.3304i |
| w184 | 10111000 | −0.0720 + 0.4369i | w248 | 11111000 | −0.2145 + 0.4495i |
| w185 | 10111001 | +0.0720 + 0.4369i | w249 | 11111001 | +0.2145 + 0.4495i |
| w186 | 10111010 | −0.0720 − 0.4369i | w250 | 11111010 | −0.2145 − 0.4495i |
| w187 | 10111011 | +0.0720 − 0.4369i | w251 | 11111011 | +0.2145 − 0.4495i |
| w188 | 10111100 | −0.0730 + 0.3094i | w252 | 11111100 | −0.2184 + 0.3170i |
| w189 | 10111101 | +0.0730 + 0.3094i | w253 | 11111101 | +0.2184 + 0.3170i |
| w190 | 10111110 | −0.0730 − 0.3094i | w254 | 11111110 | −0.2184 − 0.3170i |
| w191 | 10111111 | +0.0730 − 0.3094i | w255 | 11111111 | +0.2184 − 0.3170i |

Still further, a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points may be used by the modulator. Further, the bit labeling indicated in groups A to B may alternatively be inverted for one or more bit labels.

Figure 6:
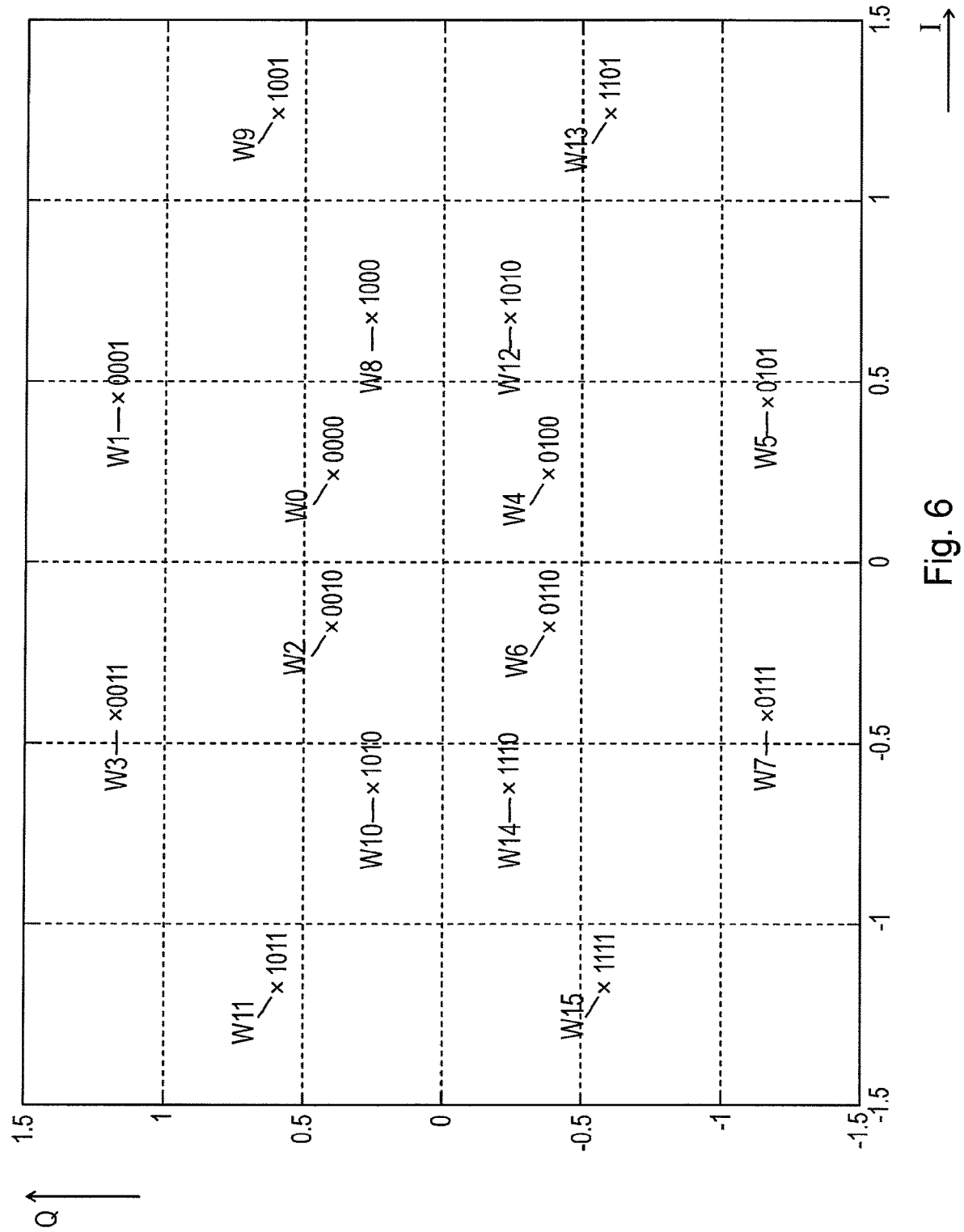
FIG. 6 shows a diagram of an exemplary two-dimensional non-uniform constellation for 16-QAM according to the present disclosure.

As shown above, two-dimensional NUCs are proposed including constellation points and bit labelling. The constellation points, i.e., coordinates in the complex plane, use the notation according to which a first column defines the w vector and the second column describes the bit labelling of the constellation points in the following columns (for different MCS indices). An exemplary diagram showing a constellation for a two-dimensional NUC for 16-QAM is depicted in FIG. 6 for modulation order M=16 and code rate R=5/8 (MCS=11) and SC as PHY mode. The corresponding constellation point vector is w=(+0.2173+0.4189i, +0.4326+1.1445i, −0.2173+0.4189i, −0.4326+1.1445i, +0.2173−0.4189i, +0.4326−1.1445i, −0.2173−0.4189i, −0.4326−1.1445i, +0.6578+0.2571i, +1.2088+0.5659i, −0.6578+0.2571i, −1.2088+0.5659i, +0.6578−0.2571i, +1.2088−0.5659i, −0.6578−0.2571i, −1.2088−0.5659i) for the bit labels from 0000 to 1111, wherein i=sqrt(−1) is the imaginary unit.

It shall be noted that the same NUCs may be used for different MCS indices (e.g. the constellation points defined for MCS 10 might be used for both MCS 10 and MCS 11 to reduce the overall number of NUCs), in particular for different code rates R. Hence, it is indicated in the tables for the NUCs for which MCS indices (representing a code rate R, a modulation order M and PHY mode) or for which code rates R the respective constellations points and bit labels are used. If there are two or more MCS indices or code rates R indicated, it may be predetermined for which MCS index/code rate R the constellations points and bit labels shall be used by a particular communication system or by particular devices. Further, it shall be noted that bit positions might be inverted, i.e. the bits of any bit position of the bit labeling might be flipped, resulting in the same performance.

The bit labelling, (i.e. which bit combination is assigned to which constellation point) is preferably optimized to fit in a best possible way into the existing IEEE 802.11ad or IEEE. 802.11ay architecture, yielding minimum error rates after FEC decoding. I.e. in an embodiment mainly the QAM mapper (modulator) 12 is changed compared to the known layout. In an embodiment the existing interleaving may be used as provided in known systems. Typically, in an optimization of the BICM, first the channel coding (FEC) is designed. In a next step the QAM (NUC) is optimized for the target SNR of the FEC. Here, the bit labelling of the NUC was optimized to optimally match the existing FEC and newly proposed NUC without adding an optimized interleaving between FEC and QAM.

For the bit labelling optimization, for a given FEC code, the error protection of the bits might be unequal (e.g. for irregular LDPC). The LLR values after demapping have different protection levels as well (given by the bit labelling). If the strongest code bits would be matched to the strongest LLR positions, the weak code bits are difficult to decode. A matching of the weakest code bits to the strongest LLR positions is also suboptimal. A optimum bit labelling balances the matching of different LLR robustness levels to code bits with different protection levels.

Obviously, numerous modifications and variations of the present disclosure are possible in light of the above teachings. It is therefore to be understood that within the scope of the appended claims, the disclosure may be practiced otherwise than as specifically described herein e.g., if the NUC position vectors are rounded to a smaller number of digits).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A coding and modulation apparatus comprising
   an encoder configured to encode input data into cell words according to a low density parity check code, LDPC, and
   a modulator configured to modulate said cell words into constellation values of a non-uniform constellation and to assign bit combinations to constellation values of the used non-uniform constellation,
   wherein said modulating is configured to use, based on the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

2. A coding and modulation apparatus as defined in embodiment 1,
   further comprising a selection unit configured to select the total number M of constellation points of the constellation and the code rate based on channel conditions between a transmission apparatus including said coding and modulation apparatus and a receiving apparatus with which said transmission apparatus seeks to communicate.

3. A coding and modulation apparatus as defined in embodiment 2,
   wherein said selection unit is configured to select a constellation with a higher number of M and/or a higher code rate the better the channel conditions are.

4. A coding and modulation apparatus as defined in one of embodiments 1 to 3,
   wherein said coding and modulation apparatus is configured for use in a transmission apparatus according to IEEE 802.11.

5. A coding and modulation method comprising
   encoding input data into cell words according to a low density parity check code, LDPC, and
   modulating said cell words into constellation values of a non-uniform constellation and to assign bit combinations to constellation values of the used non-uniform constellation, wherein said modulating is configured to use, based on the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

6. A transmission apparatus comprising:
   a coding and modulation apparatus as defined in embodiment 1 configured to encode and modulate input data into constellation values, a converter configured to convert said constellation values into one or more transmission streams to be transmitted, and a transmitter configured to transmit said one or more transmission streams.

7. A transmission apparatus as defined in embodiment 6, further comprising a signalling unit configured to embed signalling information into the one or more transmission streams, said signalling information including information about the PHY mode, the total number M of constellation points of the constellation, the location of the constellation points and the code rate.

8. A transmission apparatus as defined in embodiment 6 or 7, wherein said signalling unit is configured to embed signalling information into the one or more transmission streams, said signalling information including a modulation and coding, MCS, index information including information about the PHY mode, the total number M of constellation points of the constellation and the code rate.

9. A transmission apparatus as defined in one of embodiments 6 to 8, wherein said modulation unit is configured to select using a uniform constellation instead of one of said non-uniform constellations for modulating said cell words into constellation values, and wherein said signalling unit is configured to embed signalling information into the one or more transmission streams, said signalling information including constellation information indicating if a non-uniform constellation or a uniform constellation has been used for modulation.

10. A transmission apparatus as defined in one of embodiments 7 to 9, wherein said signalling unit is configured to embed said signalling information at the beginning of frames, in particular of each frame, of a plurality of frames used for transmission of the one or more transmission streams.

11. A transmission apparatus as defined in one of embodiments 7 to 9, wherein said signalling unit is configured to embed said signalling information into a Header field.

12. A transmission method comprising:

a coding and modulation method as defined in embodiment 5 that encodes and modulates input data into constellation values, converting said constellation values into one or more transmission streams to be transmitted, and transmitting said one or more transmission streams.

13. A demodulation and decoding apparatus comprising:

a demodulator configured to demodulate constellation values of a non-uniform constellation into cell words and to assign bit combinations to constellation values of the used non-uniform constellation, and a decoder configured to decode cell words into output data according to a low density parity check code, LDPC, wherein said demodulating is configured to use, based on signalling information indicating the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

14. A demodulation and decoding method comprising:

demodulating constellation values of a non-uniform constellation into cell words and assigning bit combinations to constellation values of the used non-uniform constellation, and decoding cell words into output data according to a low density parity check code, LDPC, wherein said demodulating is configured to use, based on signalling information indicating the PHY mode the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

15. Receiving apparatus comprising:

a receiver configured to receive one or more transmission streams, a deconverter configured to deconvert one or more transmission streams into said constellation values, and a demodulation and decoding apparatus as defined in embodiment 13 configured to demodulate and decode said constellation values into output data.

16. Receiving method comprising:

receiving one or more transmission streams, deconverting one or more transmission streams into said constellation values, and demodulating and decoding said constellation values into output data according to a method as defined in embodiment 14.

17. A non-transitory computer-readable recording medium that stores therein a computer program product, which, when executed by a processor, causes the method according to embodiment 5 or 14 to be performed.

18. A communications system comprising one or more transmission apparatus as defined in embodiment 1 and one or more receiving apparatus as defined in embodiment 15.

19. A computer program comprising program code means for causing a computer to perform the steps of said method according to embodiment 5 or 14 when said computer program is carried out on a computer.

The invention claimed is:

1. A coding and modulation apparatus, comprising:

an encoder configured to encode input data into cell words according to a low density parity check code; and a modulator configured to modulate said cell words into constellation points of a non-uniform constellation and to assign bit combinations to constellation points of the used non-uniform constellation, wherein said modulator is configured to use, if the physical layer (PHY) mode is a single carrier mode and the total number M of constellation points of the constellation is 64, a non-uniform constellation obtained from a group for 64-Quadrature Amplitude Modulation (64-QAM) with code rates of 1/2, 5/8, 3/4 or 13/16, through inversion of a bit label for all constellation points and through interchanging of bit positions, and wherein the constellation points of the non-uniform constellation of the group are defined as follows, and R is a used code rate and, i is equal to square root of −1:

| bit label | R = 13/16 (or R = 1/2, 5/8, or 3/4) |
| --- | --- |
| 000000 | +1.0414 − 0.1712i |
| 000001 | +0.7230 − 0.1517i |
| 000010 | +1.0997 − 0.5419i |
| 000011 | +0.7484 − 0.4663i |
| 000100 | −1.0414 − 0.1712i |
| 000101 | −0.7230 − 0.1517i |
| 000110 | −1.0997 − 0.5419i |
| 000111 | −0.7484 − 0.4663i |
| 001000 | +1.0414 + 0.1712i |
| 001001 | +0.7230 + 0.1517i |
| 001010 | +1.0997 + 0.5419i |
| 001011 | +0.7484 + 0.4663i |
| 001100 | −1.0414 + 0.1712i |
| 001101 | −0.7230 + 0.1517i |
| 001110 | −1.0997 + 0.5419i |
| 001111 | −0.7484 + 0.4663i |
| 010000 | +0.1414 − 0.1379i |
| 010001 | +0.4272 − 0.1421i |
| 010010 | +0.1440 − 0.4167i |
| 010011 | +0.4369 − 0.4317i |
| 010100 | −0.1414 − 0.1379i |
| 010101 | −0.4272 − 0.1421i |
| 010110 | −0.1440 − 0.4167i |
| 010111 | −0.4369 − 0.4317i |
| 011000 | +0.1414 + 0.1379i |
| 011001 | +0.4272 + 0.1421i |
| 011010 | +0.1440 + 0.4167i |
| 011011 | +0.4369 + 0.4317i |
| 011100 | −0.1414 + 0.1379i |
| 011101 | −0.4272 + 0.1421i |
| 011110 | −0.1440 + 0.4167i |
| 011111 | −0.4369 + 0.4317i |
| 100000 | +1.4058 − 0.2115i |
| 100001 | +0.5981 − 1.1597i |
| 100010 | +1.0691 − 0.9443i |
| 100011 | +0.7360 − 0.8042i |
| 100100 | −1.4058 − 0.2115i |
| 100101 | −0.5981 − 1.1597i |
| 100110 | −1.0691 − 0.9443i |
| 100111 | −0.7360 − 0.8042i |
| 101000 | +1.4058 + 0.2115i |
| 101001 | +0.5981 + 1.1597i |
| 101010 | +1.0691 + 0.9443i |
| 101011 | +0.7360 + 0.8042i |
| 101100 | −1.4058 + 0.2115i |
| 101101 | −0.5981 + 1.1597i |
| 101110 | −1.0691 + 0.9443i |
| 101111 | −0.7360 + 0.8042i |
| 110000 | +0.1695 − 1.0298i |
| 110001 | +0.2236 − 1.3784i |
| 110010 | +0.1426 − 0.7102i |
| 110011 | +0.4351 − 0.7394i |
| 110100 | −0.1695 − 1.0298i |
| 110101 | −0.2236 − 1.3784i |
| 110110 | −0.1426 − 0.7102i |
| 110111 | −0.4351 − 0.7394i |
| 111000 | +0.1695 + 1.0298i |
| 111001 | +0.2236 + 1.3784i |
| 111010 | +0.1426 + 0.7102i |
| 111011 | +0.4351 + 0.7394i |
| 111100 | −0.1695 + 1.0298i |
| 111101 | −0.2236 + 1.3784i |
| 111110 | −0.1426 + 0.7102i |
| 111111 | −0.4351 + 0.7394i. |

2. The coding and modulation apparatus as claimed in claim 1, further comprising a selector configured to select the total number M of constellation points of the constellation and the code rate based on channel conditions between a transmission apparatus including said coding and modulation apparatus and a receiving apparatus with which said transmission apparatus seeks to communicate.

3. The coding and modulation apparatus as claimed in claim 2, wherein said selector is configured to select a constellation with a higher number of M and/or a higher code rate the better the channel conditions are.

4. The coding and modulation apparatus as claimed in claim 1, wherein said coding and modulation apparatus is configured for use in a transmission apparatus according to IEEE 802.11.

5. A transmission apparatus, comprising:
a coding and modulation apparatus as claimed in claim 1 configured to encode and modulate input data into constellation points,
a converter configured to convert said constellation points into one or more transmission streams to be transmitted, and
a transmitter configured to transmit said one or more transmission streams.

6. The transmission apparatus as claimed in claim 5, further comprising:
a signaler configured to embed signaling information into the one or more transmission streams, said signaling information including information about the physical layer mode, the total number M of constellation points of the constellation, the location of the constellation points, and the code rate.

7. The transmission apparatus as claimed in claim 6, wherein said signaler is configured to embed said signaling information at the beginning of frames, in particular of each frame, of a plurality of frames used for transmission of the one or more transmission streams.

8. The transmission apparatus as claimed in claim 6, wherein said signaler is configured to embed said signaling information into a Header field.

9. The transmission apparatus as claimed in claim 5, further comprising:
a signaler configured to embed signaling information into the one or more transmission streams, said signaling information including a modulation and coding scheme index information including information about the physical layer mode, the total number M of constellation points of the constellation, and the code rate.

10. The transmission apparatus as claimed in claim 5, wherein said modulator is configured to select using a uniform constellation instead of said non-uniform constellation for modulating said cell words into constellation points, and
wherein a signaler is configured to embed signaling information into the one or more transmission streams, said signaling information including constellation information indicating if the non-uniform constellation or the uniform constellation has been used for modulation.

11. A communications system comprising one or more transmission apparatuses as claimed in claim 5.

12. A coding and modulation method, comprising:
encoding input data into cell words according to a low density parity check code; and
modulating said cell words into constellation points of a non-uniform constellation and to assign bit combinations to constellation points of the used non-uniform constellation,
wherein said modulating is configured to use, if the physical layer mode is a single carrier mode and the total number M of constellation points is 64, a non-uniform constellation obtained from a group for 64-Quadrature Amplitude Modulation (64-QAM) with code rates of 1/2, 5/8, 3/4 or 13/16, through inversion of a bit label for all constellation points and through interchanging of bit positions, and wherein the constellation points of the non-uniform constellation of the group are defined as follows, and R is a used code rate and, i is equal to square root of −1:

| bit label | R = 13/16 (or R = 1/2, 5/8, or 3/4) |
|---|---|
| 000000 | +1.0414 − 0.1712i |
| 000001 | +0.7230 − 0.1517i |
| 000010 | +1.0997 − 0.5419i |
| 000011 | +0.7484 − 0.4663i |
| 000100 | −1.0414 − 0.1712i |
| 000101 | −0.7230 − 0.1517i |
| 000110 | −1.0997 − 0.5419i |
| 000111 | −0.7484 − 0.4663i |
| 001000 | +1.0414 + 0.1712i |
| 001001 | +0.7230 + 0.1517i |
| 001010 | +1.0997 + 0.5419i |
| 001011 | +0.7484 + 0.4663i |
| 001100 | −1.0414 + 0.1712i |
| 001101 | −0.7230 + 0.1517i |
| 001110 | −1.0997 + 0.5419i |
| 001111 | −0.7484 + 0.4663i |
| 010000 | +0.1414 − 0.1379i |
| 010001 | +0.4272 − 0.1421i |
| 010010 | +0.1440 − 0.4167i |
| 010011 | +0.4369 − 0.4317i |
| 010100 | −0.1414 − 0.1379i |
| 010101 | −0.4272 − 0.1421i |
| 010110 | −0.1440 − 0.4167i |
| 010111 | −0.4369 − 0.4317i |
| 011000 | +0.1414 + 0.1379i |
| 011001 | +0.4272 + 0.1421i |
| 011010 | +0.1440 + 0.4167i |
| 011011 | +0.4369 + 0.4317i |
| 011100 | −0.1414 + 0.1379i |
| 011101 | −0.4272 + 0.1421i |
| 011110 | −0.1440 + 0.4167i |
| 011111 | −0.4369 + 0.4317i |
| 100000 | +1.4058 − 0.2115i |
| 100001 | +0.5981 − 1.1597i |
| 100010 | +1.0691 − 0.9443i |
| 100011 | +0.7360 − 0.8042i |
| 100100 | −1.4058 − 0.2115i |
| 100101 | −0.5981 − 1.1597i |
| 100110 | −1.0691 − 0.9443i |
| 100111 | −0.7360 − 0.8042i |
| 101000 | +1.4058 + 0.2115i |
| 101001 | +0.5981 + 1.1597i |
| 101010 | +1.0691 + 0.9443i |
| 101011 | +0.7360 + 0.8042i |
| 101100 | −1.4058 + 0.2115i |
| 101101 | −0.5981 + 1.1597i |
| 101110 | −1.0691 + 0.9443i |
| 101111 | −0.7360 + 0.8042i |
| 110000 | +0.1695 − 1.0298i |
| 110001 | +0.2236 − 1.3784i |
| 110010 | +0.1426 − 0.7102i |
| 110011 | +0.4351 − 0.7394i |
| 110100 | −0.1695 − 1.0298i |
| 110101 | −0.2236 − 1.3784i |
| 110110 | −0.1426 − 0.7102i |
| 110111 | −0.4351 − 0.7394i |
| 111000 | +0.1695 + 1.0298i |
| 111001 | +0.2236 + 1.3784i |
| 111010 | +0.1426 + 0.7102i |
| 111011 | +0.4351 + 0.7394i |
| 111100 | −0.1695 + 1.0298i |
| 111101 | −0.2236 + 1.3784i |
| 111110 | −0.1426 + 0.7102i |
| 111111 | −0.4351 + 0.7394i. |

13. A transmission method, comprising:
a coding and modulation method as claimed in claim 12 that encodes and modulates input data into constellation points,
converting said constellation points into one or more transmission streams to be transmitted, and
transmitting said one or more transmission streams.

14. A non-transitory computer-readable storage medium storing computer-executable instructions therein which, when executed by a processor, causes the method according to claim 12 to be performed.

15. A demodulation and decoding apparatus, comprising:
a demodulator configured to demodulate constellation points of a non-uniform constellation into cell words and to assign bit combinations to constellation points of the used non-uniform constellation, and
a decoder configured to decode cell words into output data according to a low density parity check code,
wherein said demodulator is configured to use, if signaling information indicating the physical layer mode is a single carrier mode and the total number M of constellation points of the constellation is 64, a non-uniform constellation obtained from a group for 64-Quadrature Amplitude Modulation (64-QAM) with code rates of 1/2, 5/8, 3/4 or 13/16, through inversion of a bit label for all constellation points and through interchanging of bit positions,
wherein the constellation points of the non-uniform constellation of the group are defined as follows, and R is a used code rate and, i is equal to square root of −1:

| bit label | R = 13/16 (or R = 1/2, 5/8, or 3/4) |
|---|---|
| 000000 | +1.0414 − 0.1712i |
| 000001 | +0.7230 − 0.1517i |
| 000010 | +1.0997 − 0.5419i |
| 000011 | +0.7484 − 0.4663i |
| 000100 | −1.0414 − 0.1712i |
| 000101 | −0.7230 − 0.1517i |
| 000110 | −1.0997 − 0.5419i |
| 000111 | −0.7484 − 0.4663i |
| 001000 | +1.0414 + 0.1712i |
| 001001 | +0.7230 + 0.1517i |
| 001010 | +1.0997 + 0.5419i |
| 001011 | +0.7484 + 0.4663i |
| 001100 | −1.0414 + 0.1712i |
| 001101 | −0.7230 + 0.1517i |
| 001110 | −1.0997 + 0.5419i |
| 001111 | −0.7484 + 0.4663i |
| 010000 | +0.1414 − 0.1379i |
| 010001 | +0.4272 − 0.1421i |
| 010010 | +0.1440 − 0.4167i |
| 010011 | +0.4369 − 0.4317i |
| 010100 | −0.1414 − 0.1379i |
| 010101 | −0.4272 − 0.1421i |
| 010110 | −0.1440 − 0.4167i |
| 010111 | −0.4369 − 0.4317i |
| 011000 | +0.1414 + 0.1379i |
| 011001 | +0.4272 + 0.1421i |
| 011010 | +0.1440 + 0.4167i |
| 011011 | +0.4369 + 0.4317i |
| 011100 | −0.1414 + 0.1379i |
| 011101 | −0.4272 + 0.1421i |
| 011110 | −0.1440 + 0.4167i |
| 011111 | −0.4369 + 0.4317i |
| 100000 | +1.4058 − 0.2115i |
| 100001 | +0.5981 − 1.1597i |
| 100010 | +1.0691 − 0.9443i |
| 100011 | +0.7360 − 0.8042i |
| 100100 | −1.4058 − 0.2115i |
| 100101 | −0.5981 − 1.1597i |
| 100110 | −1.0691 − 0.9443i |
| 100111 | −0.7360 − 0.8042i |
| 101000 | +1.4058 + 0.2115i |
| 101001 | +0.5981 + 1.1597i |
| 101010 | +1.0691 + 0.9443i |
| 101011 | +0.7360 + 0.8042i |
| 101100 | −1.4058 + 0.2115i |
| 101101 | −0.5981 + 1.1597i |
| 101110 | −1.0691 + 0.9443i |
| 101111 | −0.7360 + 0.8042i |

-continued

| bit label | R = 13/16 (or R = 1/2, 5/8, or 3/4) |
|---|---|
| 110000 | +0.1695 − 1.0298i |
| 110001 | +0.2236 − 1.3784i |
| 110010 | +0.1426 − 0.7102i |
| 110011 | +0.4351 − 0.7394i |
| 110100 | −0.1695 − 1.0298i |
| 110101 | −0.2236 − 1.3784i |
| 110110 | −0.1426 − 0.7102i |
| 110111 | −0.4351 − 0.7394i |
| 111000 | +0.1695 + 1.0298i |
| 111001 | +0.2236 + 1.3784i |
| 111010 | +0.1426 + 0.7102i |
| 111011 | +0.4351 + 0.7394i |
| 111100 | −0.1695 + 1.0298i |
| 111101 | −0.2236 + 1.3784i |
| 111110 | −0.1426 + 0.7102i |
| 111111 | −0.4351 + 0.7394i. |

16. A receiving apparatus, comprising:
a receiver configured to receive one or more transmission streams,
a deconverter configured to deconvert one or more transmission streams into said constellation points, and
the demodulation and decoding apparatus as claimed in claim 15 configured to demodulate and decode said constellation points into output data.

17. A demodulation and decoding method, comprising:
demodulating constellation points of a non-uniform constellation into cell words and assigning bit combinations to constellation points of the used non-uniform constellation; and
decoding cell words into output data according to a low density parity check code,
wherein said demodulating is configured to use, if signaling information indicating the physical layer mode is a single carrier mode and the total number M of constellation points of the constellation is 64, a non-uniform constellation obtained from a group for 64-Quadrature Amplitude Modulation (64-QAM) with code rates of 1/2, 5/8, 3/4 or 13/16, through inversion of a bit label for all constellation points and through interchanging of bit positions,
wherein the constellation points of the non-uniform constellation of the group are defined as follows, and R is a used code rate and, i is equal to square root of −1:

| bit label | R = 13/16 (or R = 1/2, 5/8, or 3/4) |
|---|---|
| 000000 | +1.0414 − 0.1712i |
| 000001 | +0.7230 − 0.1517i |
| 000010 | +1.0997 − 0.5419i |
| 000011 | +0.7484 − 0.4663i |
| 000100 | −1.0414 − 0.1712i |
| 000101 | −0.7230 − 0.1517i |
| 000110 | −1.0997 − 0.5419i |
| 000111 | −0.7484 − 0.4663i |
| 001000 | +1.0414 + 0.1712i |
| 001001 | +0.7230 + 0.1517i |
| 001010 | +1.0997 + 0.5419i |
| 001011 | +0.7484 + 0.4663i |
| 001100 | −1.0414 + 0.1712i |
| 001101 | −0.7230 + 0.1517i |
| 001110 | −1.0997 + 0.5419i |
| 001111 | −0.7484 + 0.4663i |
| 010000 | +0.1414 − 0.1379i |
| 010001 | +0.4272 − 0.1421i |
| 010010 | +0.1440 − 0.4167i |
| 010011 | +0.4369 − 0.4317i |
| 010100 | −0.1414 − 0.1379i |
| 010101 | −0.4272 − 0.1421i |
| 010110 | −0.1440 − 0.4167i |
| 010111 | −0.4369 − 0.4317i |
| 011000 | +0.1414 + 0.1379i |
| 011001 | +0.4272 + 0.1421i |
| 011010 | +0.1440 + 0.4167i |
| 011011 | +0.4369 + 0.4317i |
| 011100 | −0.1414 + 0.1379i |
| 011101 | −0.4272 + 0.1421i |
| 011110 | −0.1440 + 0.4167i |
| 011111 | −0.4369 + 0.4317i |
| 100000 | +1.4058 − 0.2115i |
| 100001 | +0.5981 − 1.1597i |
| 100010 | +1.0691 − 0.9443i |
| 100011 | +0.7360 − 0.8042i |
| 100100 | −1.4058 − 0.2115i |
| 100101 | −0.5981 − 1.1597i |
| 100110 | −1.0691 − 0.9443i |
| 100111 | −0.7360 − 0.8042i |
| 101000 | +1.4058 + 0.2115i |
| 101001 | +0.5981 + 1.1597i |
| 101010 | +1.0691 + 0.9443i |
| 101011 | +0.7360 + 0.8042i |
| 101100 | −1.4058 + 0.2115i |
| 101101 | −0.5981 + 1.1597i |
| 101110 | −1.0691 + 0.9443i |
| 101111 | −0.7360 + 0.8042i |
| 110000 | +0.1695 − 1.0298i |
| 110001 | +0.2236 − 1.3784i |
| 110010 | +0.1426 − 0.7102i |
| 110011 | +0.4351 − 0.7394i |
| 110100 | −0.1695 − 1.0298i |
| 110101 | −0.2236 − 1.3784i |
| 110110 | −0.1426 − 0.7102i |
| 110111 | −0.4351 − 0.7394i |
| 111000 | +0.1695 + 1.0298i |
| 111001 | +0.2236 + 1.3784i |
| 111010 | +0.1426 + 0.7102i |
| 111011 | +0.4351 + 0.7394i |
| 111100 | −0.1695 + 1.0298i |
| 111101 | −0.2236 + 1.3784i |
| 111110 | −0.1426 + 0.7102i |
| 111111 | −0.4351 + 0.7394i. |

18. A receiving method, comprising:
receiving one or more transmission streams,
deconverting one or more transmission streams into said constellation points, and
demodulating and decoding said constellation points into output data according to a method as claimed in claim 17.

\* \* \* \* \*